(12) United States Patent
Honda et al.

(10) Patent No.: US 8,317,258 B2
(45) Date of Patent: Nov. 27, 2012

(54) FRAME STRUCTURE FOR VEHICLE

(75) Inventors: Masanori Honda, Hiroshima (JP);
Takashi Yoshimura, Hiroshima (JP);
Shin Sasaki, Hiroshima (JP); Chikara Tanaka, Hiroshima (JP); Kenichi Yamamoto, Hiroshima (JP)

(73) Assignee: Mazda Motor Corporation (JP)

( * ) Notice: Subject to any disclaimer, the term of this patent is extended or adjusted under 35 U.S.C. 154(b) by 198 days.

(21) Appl. No.: 12/826,517

(22) Filed: Jun. 29, 2010

(65) Prior Publication Data

US 2011/0006560 A1 Jan. 13, 2011

(30) Foreign Application Priority Data

| Jul. 8, 2009 | (JP) | 2009-161363 |
| Jul. 8, 2009 | (JP) | 2009-161365 |
| Jul. 8, 2009 | (JP) | 2009-161366 |
| Mar. 3, 2010 | (JP) | 2010-046163 |

(51) Int. Cl.
*B62D 25/00* (2006.01)
(52) U.S. Cl. .................... 296/205; 52/783.17; 52/783.19
(58) Field of Classification Search .................. 296/209, 296/205; 52/783.17–783.19
See application file for complete search history.

(56) References Cited

U.S. PATENT DOCUMENTS

| 3,171,517 | A | * | 3/1965 | Howell | 52/86 |
| 5,246,264 | A | * | 9/1993 | Yoshii | 296/203.03 |
| 7,010,897 | B1 | * | 3/2006 | Kuppers | 52/793.1 |
| 2003/0131646 | A1 | * | 7/2003 | Herzog et al. | 72/379.2 |
| 2004/0251009 | A1 | * | 12/2004 | Andersson et al. | 165/170 |

FOREIGN PATENT DOCUMENTS

| DE | 196 34 244 A1 | 2/1998 |
| DE | 19651937 A1 * | 6/1998 |
| DE | 199 47 245 A1 | 4/2000 |
| EP | 1 331 160 A1 | 7/2003 |
| JP | 11-208521 | 8/1999 |
| JP | 2008-068759 A | 3/2008 |
| JP | 2009-113766 A | 5/2009 |
| WO | 01/58615 A1 | 8/2001 |
| WO | 2006/036065 A1 | 4/2006 |

OTHER PUBLICATIONS

The Extended European Search Report dated Nov. 15, 2010; Application No. 10006980.6-2425.

* cited by examiner

*Primary Examiner* — Dennis Pedder
(74) *Attorney, Agent, or Firm* — Studebaker & Brackett PC; Donald R. Studebaker

(57) ABSTRACT

A frame body comprises a first face portion on which a compressive force acts in case a load is applied, a second face portion on which a tensional force acts, and third and fourth face portions which connect the first and second face portions. The third and fourth face portions are respectively equipped with a reinforcing member which comprises a base portion which is away from the frame body and plural base portions which project from the base portion and are joined to the frame body. The convex portions have plural convexities which are arranged so as to extend both in the longitudinal and sectional directions of a frame.

7 Claims, 46 Drawing Sheets

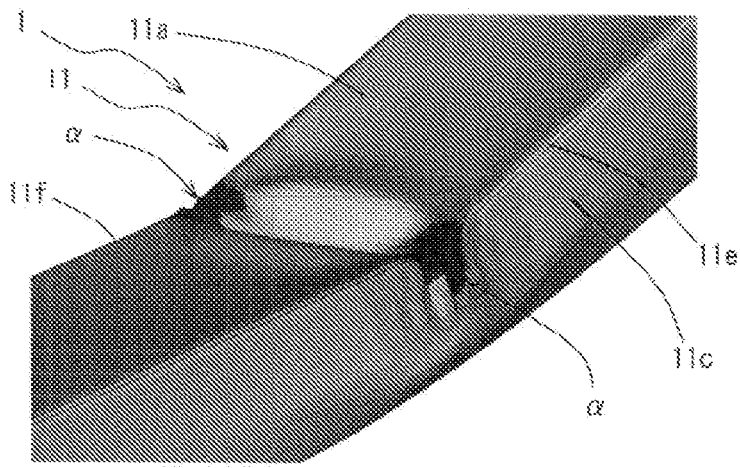
FIG. 6A
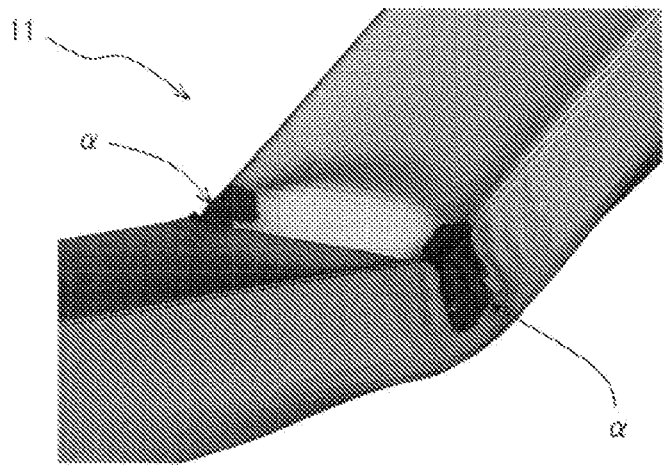
FIG. 6B
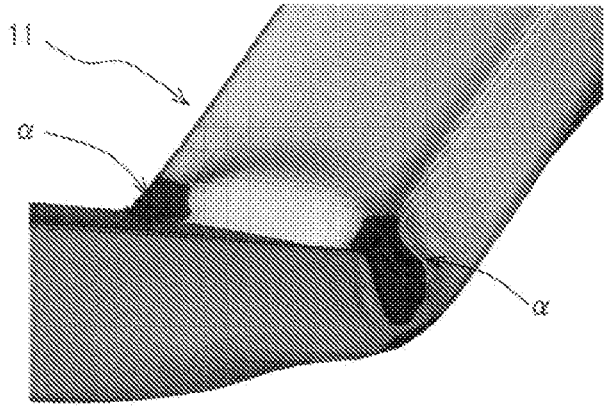
FIG. 6C

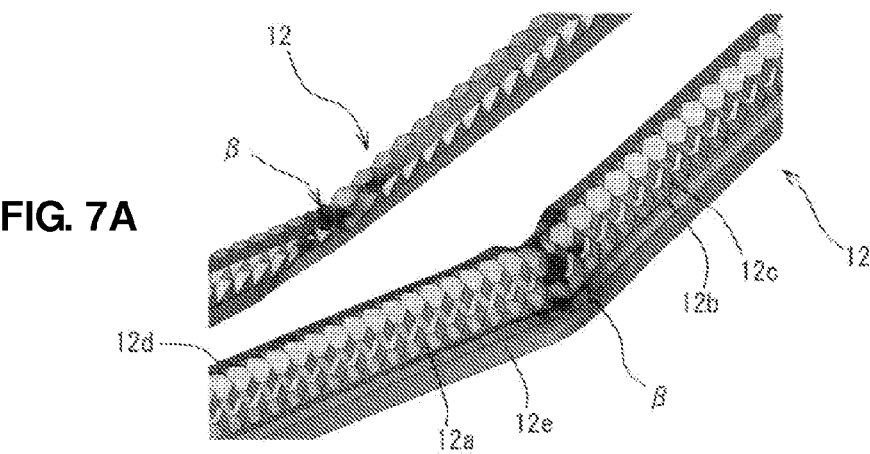
FIG. 7A
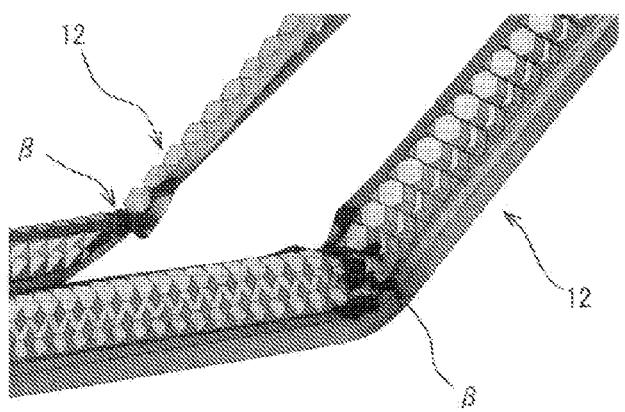
FIG. 7B
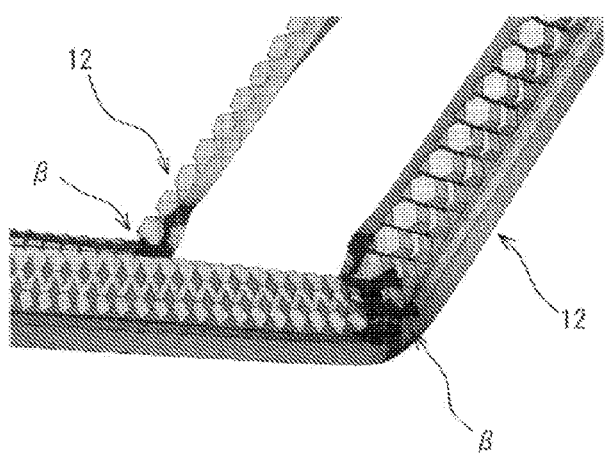
FIG. 7C
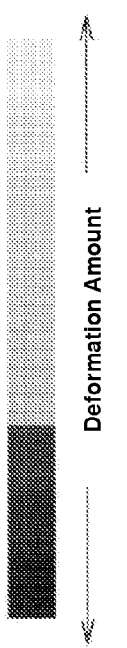

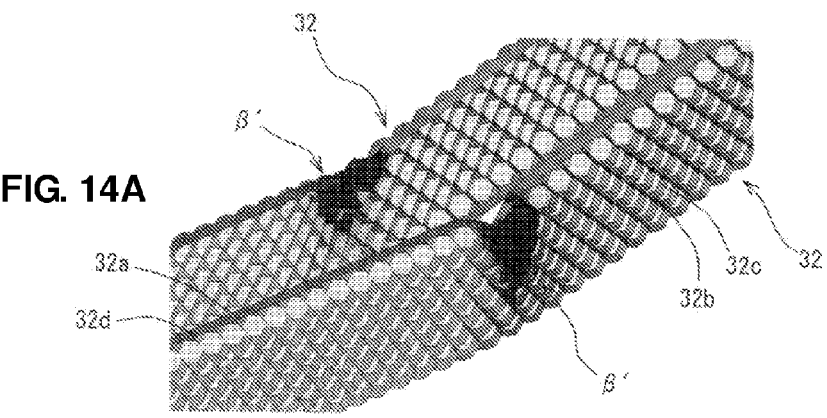
FIG. 14A
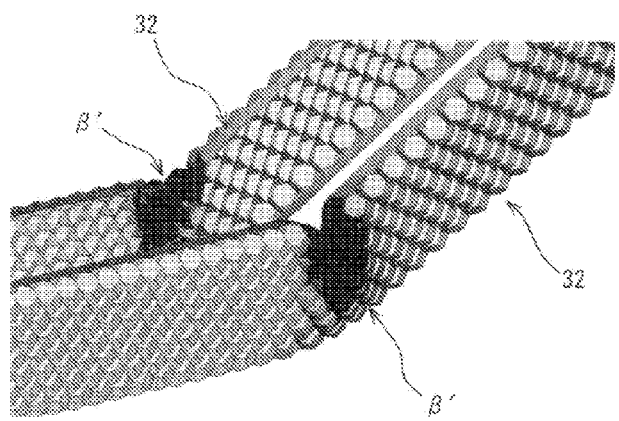
FIG. 14B
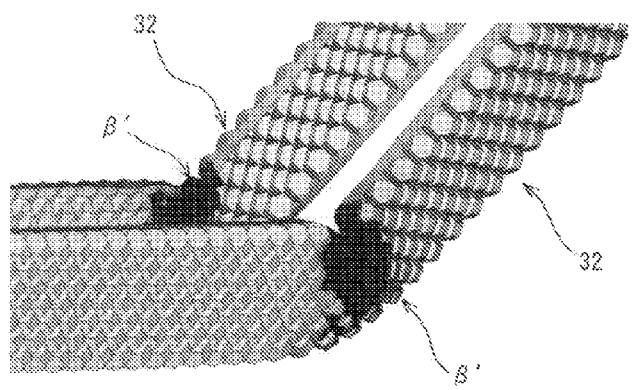
FIG. 14C

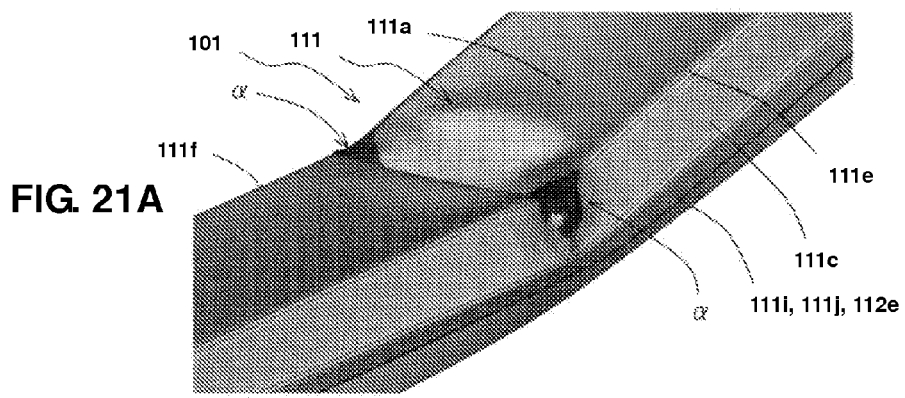
FIG. 21A
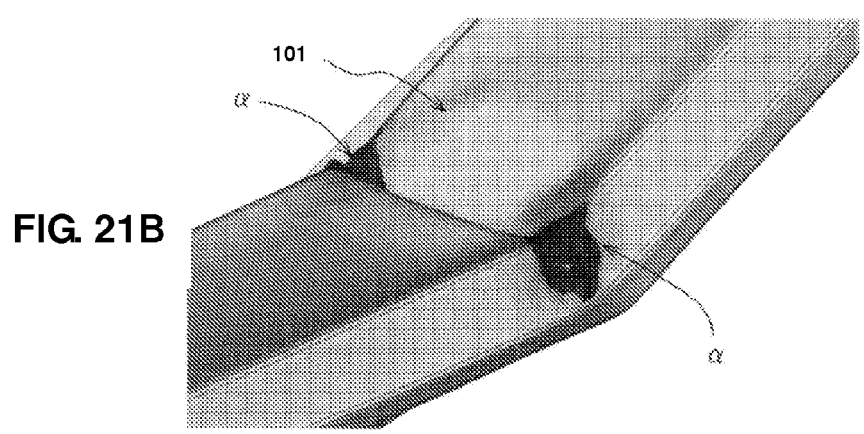
FIG. 21B
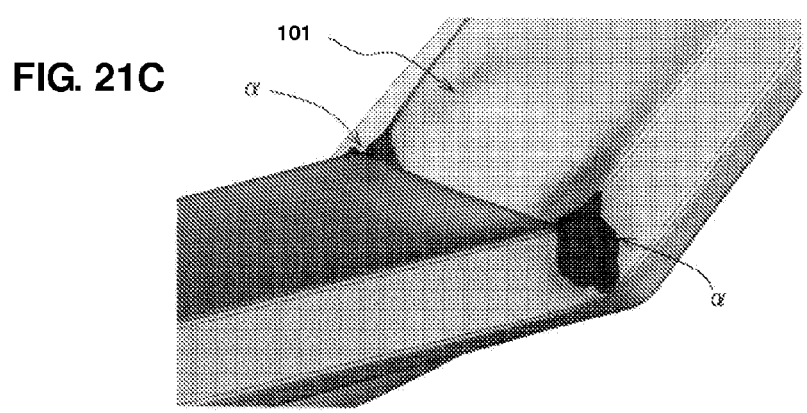
FIG. 21C
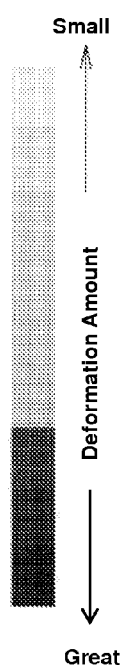

FIG. 22A
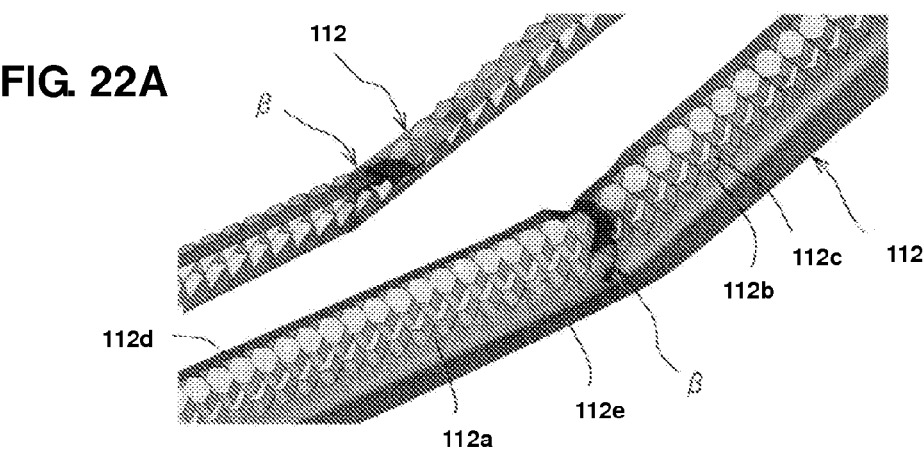
FIG. 22B
(b)
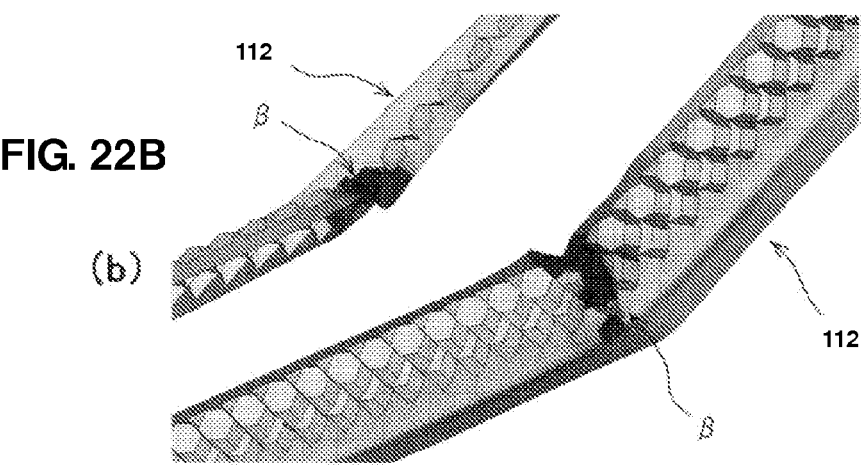
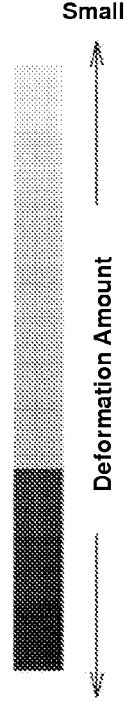
FIG. 22C
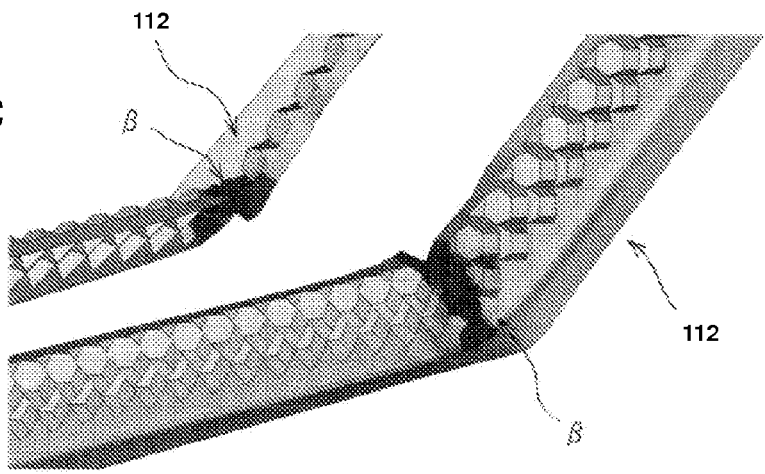

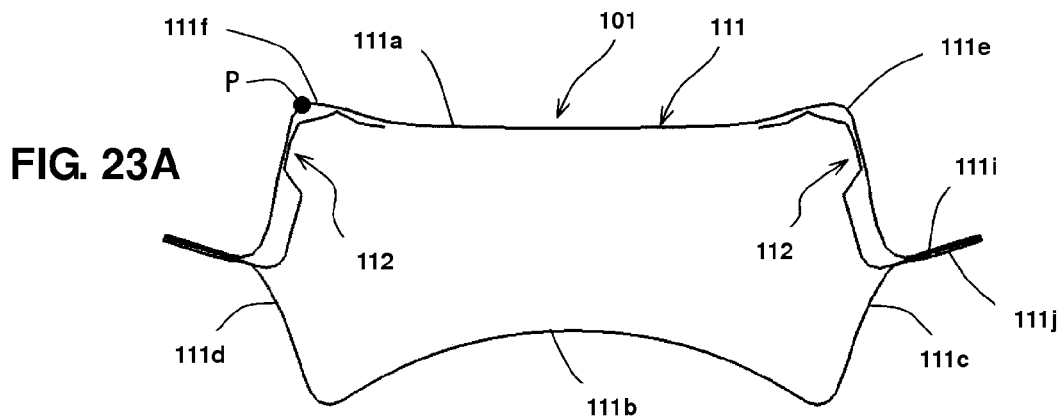
FIG. 23A
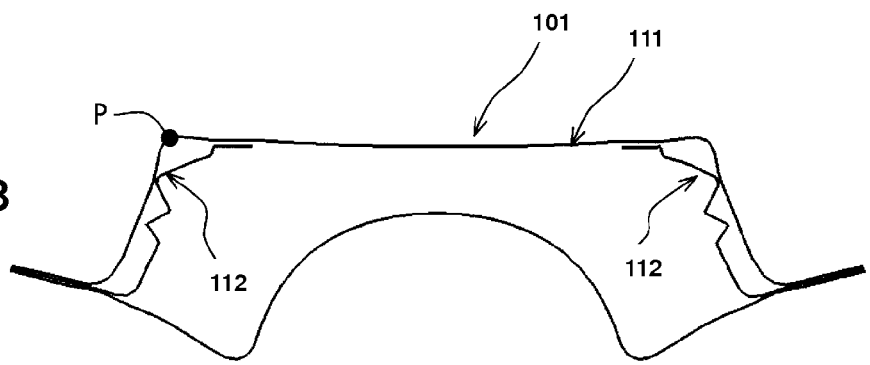
FIG. 23B
FIG. 23C

FIG. 26
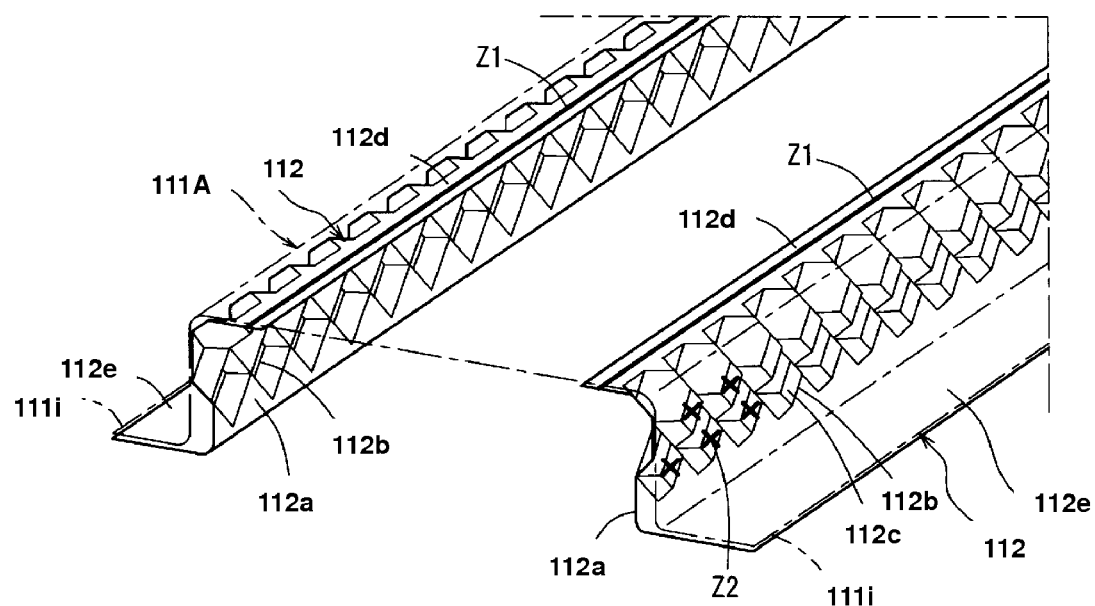
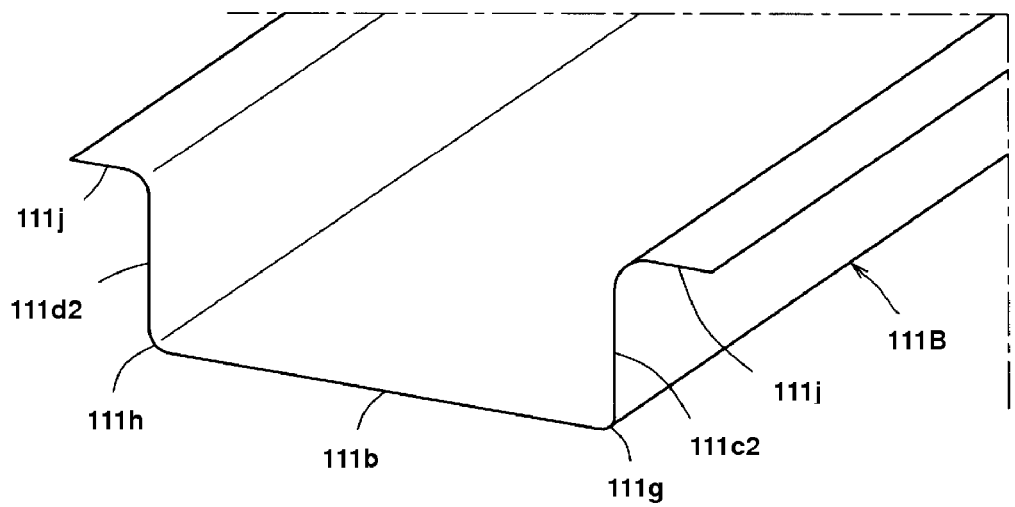

FRAME STRUCTURE FOR VEHICLE

BACKGROUND OF THE INVENTION

The present invention relates to a frame structure for a vehicle equipped with a pipe-shaped frame body which is provided as part of a vehicle body and receives a load acting from the outside so as to have bending deformation at a vehicle collision, for example.

Many frame structures which can provide a properly high bending rigidity and surely protect passengers in the vehicle in case of the load acting at the vehicle collision have been proposed. Japanese Patent Laid-Open Publication No. 2009-113766, for example, discloses a structure in which a reinforcement to form plural closed cross sections together with an inner panel of a pipe-shaped side sill is arranged at a corner portion of a vehicle body. This reinforcement has concave and convex portions (uneven) in a sectional direction of the side sill which is perpendicular to a longitudinal direction of the side sill. Herein, the convex portions are joined to an inner face of the corner portion. The above-described publication discloses results of comparison of a side sill equipped with the above-described reinforcement and a side sill without this reinforcement, by analyzing bending resistance characteristics of these side sills in case they have bending deformation. It also shows that the side sill equipped with the reinforcement can perform the higher bending resistance based on the comparison results.

As shown in the above-described publication, the bending deformation in case of the collision load acting can be restrained effectively without using any thick reinforcing member, by arranging the above-described reinforcement at the corner portion of the frame. Herein, the value of the bending resistance divided by the entire weight of the frame, that is, the so-called performance-weight efficiency, can be increased, so that the frame can be made properly light. The fuel economy (gas mileage) has been recently desired from an environmental protection perspective, and therefore various researches for the light-weight vehicle body have been conducted. For this reason, frames for vehicles which can have the lighter weight but perform the higher bending resistance have been desired. Thus, the above-described performance-weight efficiency must be a substantially important factor in developing the frame for vehicles.

Japanese Patent Laid-Open Publication No. 11-208521 discloses a structure in which a plurality of hollow spaces which extends in the longitudinal direction of the side sill is formed in a surrounding area including the corner portion of the inner panel of the side sill. This structure can perform the higher bending resistance compared with a conventional frame equipped with flat plates simply, like the above-described structure disclosed in the first publication. In this case, since the hollow spaces are formed, the entire weight of the frame can be lighter and the bending resistance of the frame can be improved.

Japanese Patent Laid-Open Publication No. 2008-68759 shows a mechanism of the bending deformation which has been verified by analyzing deformations of the frame in case the frame has the bending deformation. It also shows from the verification results that in case the load acts on the frame, a large outer-face deformation (herein, the outer-face deformation means a general deformation which comprises not only a two-dimensional deformation which occurs on the face but also a three-dimensional deformation which additionally includes a deformation occurring in the direction of thickness of the face) occurs at the corner portion and its surrounding area on which the compressive force acts. In a structure disclosed in this publication, the thickness of the above-described corner portion and its surrounding area is made thinner than any other parts from the above-described perspective, so that the weight reduction of the frame and the improvement of the bending resistance are achieved.

The conventional structures disclosed in the above-described publications, however, simply aimed at performing the higher bending resistance at the initial stage of the bending deformation of the frame for vehicles. In fact, there is a case in which it is preferable at some part of the vehicle body that the impact energy be absorbed more at the middle stage of the frame bending deformation in order to protect passengers properly against the vehicle collision or the like. Thus, in these days, it has been a problem to be solved that the performance-weight efficiency of the frame (the value of the amount of the impact energy absorption divided by the entire weight of the frame) in the impact energy absorption characteristics is increased as well as the impact-energy absorption at the middle stage of the frame bending deformation is improved.

SUMMARY OF THE INVENTION

Accordingly, an object of the present invention is to provide a frame structure for a vehicle which can improve the impact-energy absorption at the middle stage of the frame bending deformation, achieving the high performance-weight efficiency.

According to the present invention, there is provided a frame structure for a vehicle, comprising a pipe-shaped frame body provided so as to receive a load acting from the outside, the frame body comprising a first face portion on which a compressive force acts in case of the load acting, a second face portion on which a tensional force acts in case of the load acting, and a third face portion which is located between the first face portion and the second face portion and connects to the first face portion so as to form a corner portion therebetween, and a reinforcing member provided inside the frame body so as to extend in a longitudinal direction of the frame body, the reinforcing member comprising a base portion which extends along and away from the third face portion of the frame body and plural convex portions which project from the base portion toward the third face portion of the frame member so as to contact the third face portion, at least part of the plural convex portions being joined to the third face portion of the frame body, the convex portions having plural convexities which are arranged so as to extend both in the longitudinal direction of the frame body and in a sectional direction of the frame body which is perpendicular to the longitudinal direction of the frame body.

According to the present invention, the third face portion of the frame body and the reinforcing member can contribute to the impact energy absorption over a wide range covering the frame's bending portion and its surrounding area in case the frame has the bending deformation. Thereby, the impact-energy absorption of the frame at the middle stage of the frame bending deformation can be improved. Further, since the improvement of the impact-energy absorption of the frame can be achieved even with the thin frame itself or reinforcing member, the performance-weight efficiency (the value of the amount of the impact energy absorption divided by the entire weight of the frame) in the impact energy absorption characteristics can be improved.

According to an embodiment of the present invention, the reinforcing member is provided so as to cover a specified area inside the frame body which includes at least the corner portion formed between the first face portion and the third face portion of the frame body. Thereby, the outer-face deformation of the bending portion at the initial stage of the bending deformation can be restrained more effectively. Accordingly, the bending resistance of the frame can be further improved.

According to another embodiment of the present invention, the frame body is comprised of a pair of members which has a U-shaped cross section with a flange, or a flat plate and a member which has a U-shaped cross section with a flange, the reinforcing member further comprises a flange portion which extends along the flange of the member having the U-shaped cross section so as to be arranged between the flanges of the pair of members, or an end portion of the flat plate and the flange of the member, and the flange portion of the reinforcing member and the flanges of the pair of members, or the flange portion of the reinforcing member, the end portion of the flat plate, and the flange of the member are joined together. Thereby, since the flange portion of the reinforcing member is joined together so that it is arranged between the flanges of the pair of frame members or between the end portion of the flat plate and the flange of the frame member, the outer-face deformation of the bending portion at the initial stage of the bending deformation can be restrained more effectively with cooperation of the frame itself and the reinforcing member, so that the bending resistance of the frame can be further improved.

According to another embodiment of the present invention, an adhesive agent is filled in a space formed between the reinforcing member and the third face portion of the frame body. Thereby, since the space filled with the adhesive agent is retrained by the frame body, any outer-face deformation of the frame body can be restrained from occurring effectively, so that the bending resistance of the frame can be further improved.

According to another embodiment of the present invention, the adhesive agent is a thermosetting foaming agent. Thereby, the frame body and the reinforcing member can be joined together surely by making the agent foam between the frame body and the reinforcing member in a heating/drying step.

According to another embodiment of the present invention, the thermosetting foaming agent is made of a sheet-shaped agent originally before foaming through heating, which has plural openings at specific positions thereof which correspond to the plural convex portions of the reinforcing member, the sheet-shaped agent being attached onto the reinforcing member before foaming so as to be arranged in the space between the reinforcing member and the third face portion of the frame body which are joined together. Thereby, the adhesive agent can be attached onto the reinforcing member easily without coating. Further, since the convex portions of the reinforcing member and the frame body can be joined together through the openings of the sheet-shaped agent, the reinforcing member can be arranged precisely at the specified position.

According to another embodiment of the present invention, a gap is formed between the sheet-shaped thermosetting foaming agent attached onto the reinforcing member and the frame body so as to extend continuously along the longitudinal direction of the frame body in a state before the foaming of the agent through heating. Thereby, in case the electrodeposition coating is conducted after the joining of the frame body and part of the convex portions of the reinforcing member, the electrodeposition liquid can be made flow into a space between the frame body and the reinforcing member smoothly and properly. Accordingly, the corrosion resistance can be improved.

According to another embodiment of the present invention, the reinforcing member further comprises a low convex portion which has a lower height than the plural convex portions so as not to contact the third face portion of the frame body so that the adhesive agent can be filled in a space formed between the small convex portion of the reinforcing member and the third face portion of the frame body. Thereby, the joint force of the reinforcing member and the frame body can be further increased effectively.

According to another embodiment of the present invention, the plural convex portions of the reinforcing member are arranged in zigzags so that the adjacent convex portions partially overlap with each other both in the longitudinal direction of the frame body and in the sectional direction which is perpendicular to the longitudinal direction of the frame body. Thereby, it can be restrained that any bending lines (bending causes) which extend in the longitudinal direction or the sectional direction occur at the base portion in case the load acts. Accordingly, the outer-face deformation of the bending portion at the bending deformation can be restrained effectively, so that the bending resistance of the frame can be improved properly.

According to another embodiment of the present invention, the plural convex portions of the reinforcing member have a tip portion joined to the third face portion of the frame body which is of a truncated pyramid shape. Thereby, in case the convex portions are welded to the frame body, a flat portion of the tip portion of the convex portions can be a welding area. Thus, the joint of these members can be properly stable.

According to another embodiment of the present invention, the plural convex portions of the reinforcing member have a tip portion joined to the third face portion of the frame body which is of a truncated cone shape. Thereby, since wider gaps are formed between the convex portions compared to a case of the above-described truncated pyramid shape, the rigidity of the structure of the frame body and the reinforcing member can be increased. Thus, the outer-face deformation of the bending portion at the initial stage of the bending deformation can be restrained effectively, so that the bending resistance of the frame can be improved.

Other features, aspects, and advantages of the present invention will become apparent from the following description which refers to the accompanying drawings.

BRIEF DESCRIPTION OF THE DRAWINGS

FIGS. 6A, 6B and 6C are diagrams showing simulation results of deformations of the frame for a vehicle in case the load is applied vertically toward the center of a first face portion of the frame.

FIGS. 7A, 7B and 7C are diagrams showing simulation results of deformations of the reinforcing member.

FIGS. 14A, 14B and 14C are diagrams showing simulation results of deformations of the reinforcing member.

FIGS. 21A, 21B and 21C are diagrams showing simulation results of deformations of the frame for a vehicle in case the load is applied vertically toward the center of a first face portion of the frame.

FIGS. 22A, 22B and 22C are diagrams showing simulation results of deformations of the reinforcing member.

FIGS. 23A, 23B and 23C are diagrams showing shapes of a closed cross section at a bending portion.

FIG. 26 is an exploded perspective view explaining another step of the manufacturing method of the frame for a vehicle.

DETAILED DESCRIPTION OF THE INVENTION

Hereinafter, preferred embodiments of the present invention will be described referring to the accompanying drawings.

Embodiment 1

Figure 1:
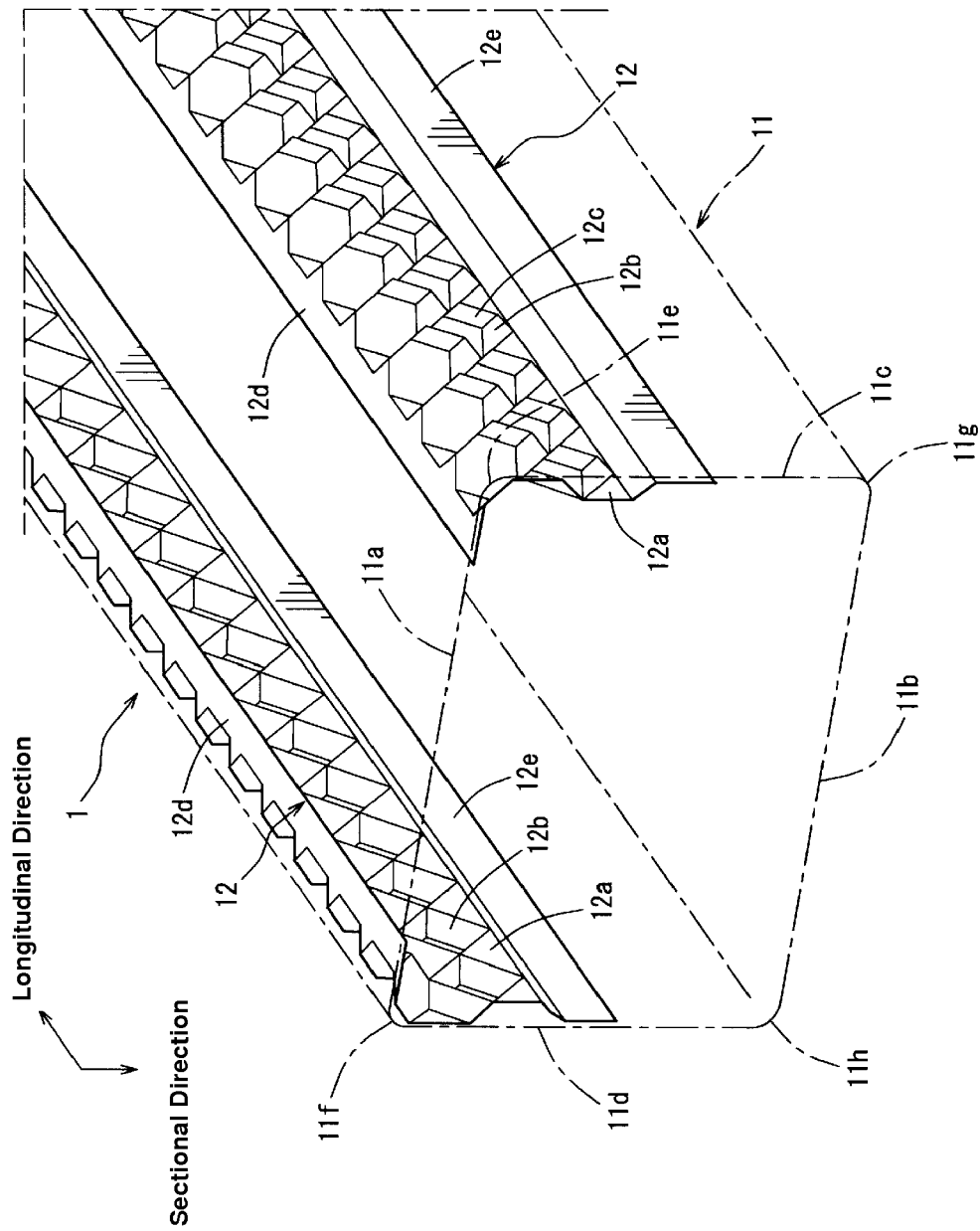
FIG. 1 is a perspective view showing a frame structure for a vehicle according to a first embodiment of the present invention.
Figure 2:
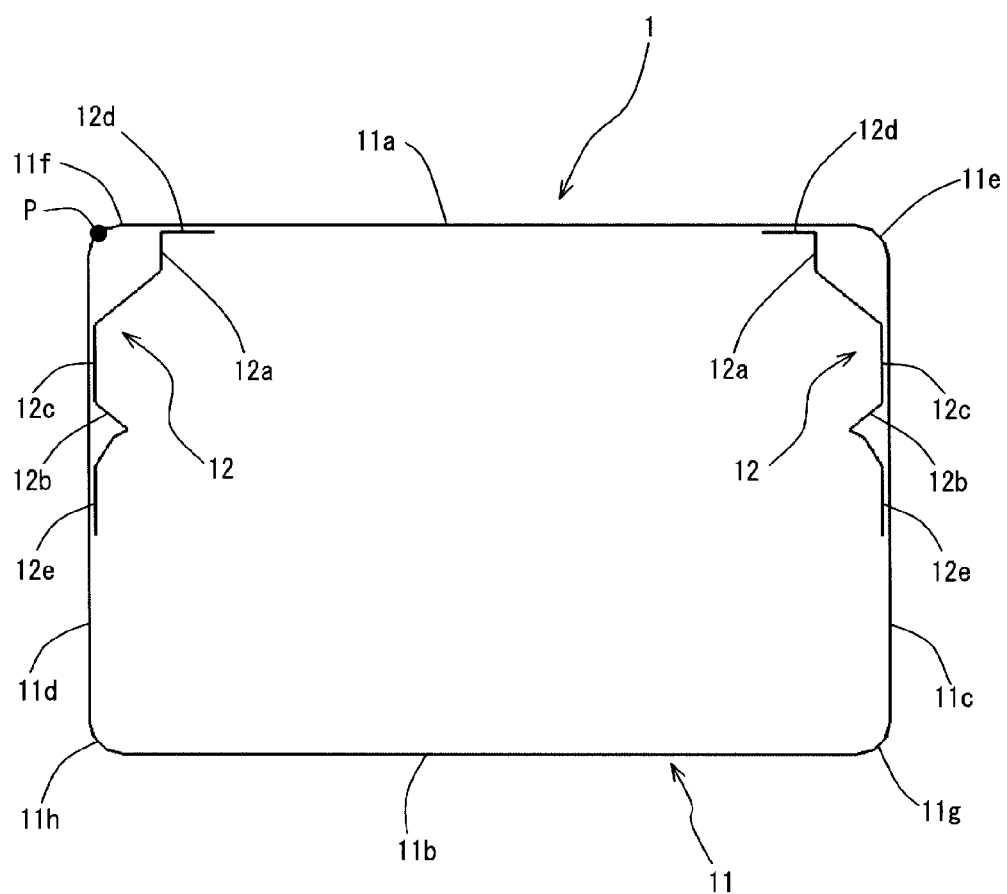
FIG. 2 is a sectional view of a frame for a vehicle along a sectional direction which is perpendicular to a longitudinal direction of the frame.

A first embodiment shown in FIGS. 1 through 9 will be described. FIG. 1 is a perspective view showing a frame structure for a vehicle according to a first embodiment of the present invention. FIG. 2 is a sectional view of a frame 1 for a vehicle along a sectional direction which is perpendicular to a longitudinal direction of the frame 1. As shown in FIG. 1, the frame 1 according to the present embodiment comprises a pipe-shaped frame body 11 and a pair of reinforcing members 12 which extends in the longitudinal direction of the frame 1. Herein, the frame body 11 is illustrated by one-dotted broken lines in its transparent state in FIG. 1.

The frame body 11, as shown in FIG. 2, has a substantially-rectangular cross section which is perpendicular to its longitudinal direction, and comprises a first face portion 11a, a second face portion 11b which is positioned on the opposite side to the first face portion 11a, a third face portion 11e and a fourth face portion 11d ("third face portion" in claims) which are positioned between the first and second face portions 11a, 11b, respectively. Corner portions 11e-11h are formed between the first through fourth face portions 11a-11d. The reinforcing members 12 are arranged in inside areas including the corner portions 11e, 11f, respectively. The reinforcing member 12 extends in the longitudinal direction of and over the almost entire length of the frame 1, and it also extends in its sectional direction over an area including the corner portions 11e, 11f and their surrounding portions located on the third and fourth face portions 11e, 11d. The reinforcing member 12 comprises a base portion 12a which is away from the frame body 11 and plural convex portions 12b which project from the base portion 12a and have flat face portions 12e at their its tips. The reinforcing member 12 further comprises flat-shaped flange portions 12d, 12e at its both ends in the sectional direction. The flat face portions 12e of the projection portion 12b are joined to the third and fourth face portions 11e, 11d near the corner portions 11e, 11f. The flange portions 12d are joined to the first face portion 11a, and the flange portions 12e are joined to the third and fourth face portions 11c, 11d.

Figure 3:
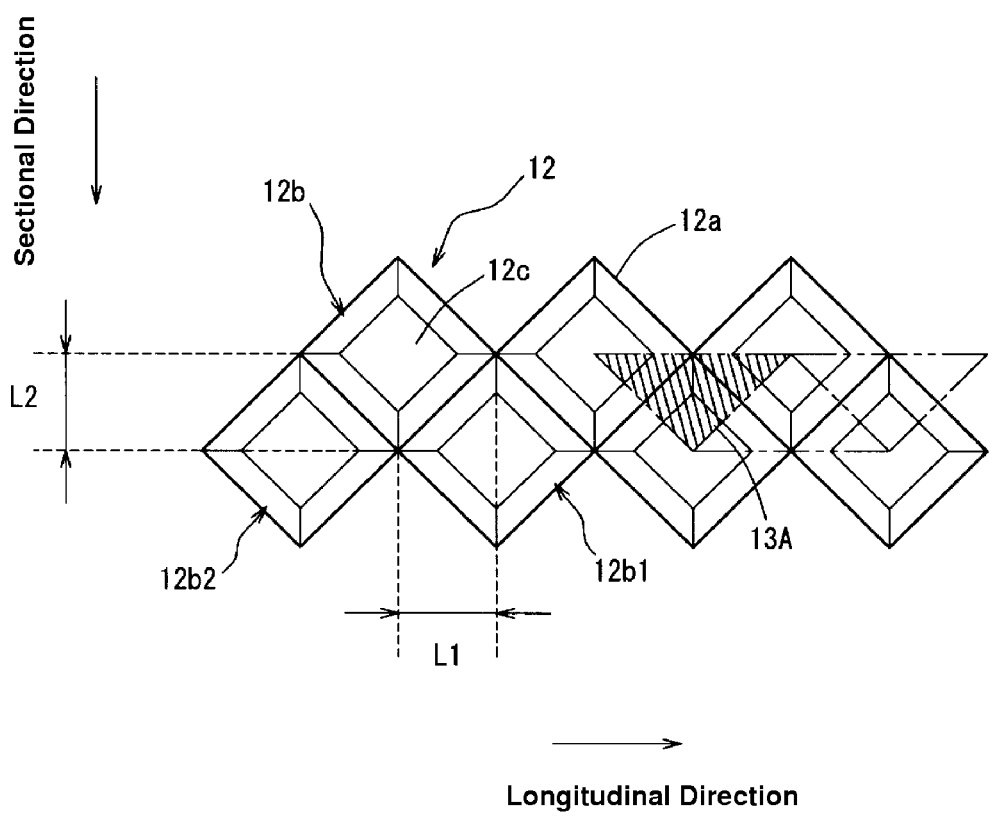
FIG. 3 is an elevation view explaining an arrangement of convex portions of a reinforcing member.

FIG. 3 is an elevation view explaining an arrangement of the convex portions 12b of the reinforcing member 12. The plural convex portions 12b, 12b . . . of the reinforcing member 12 have the flat face portion 12c which is of a truncated pyramid shape and arranged in zigzags both in the longitudinal direction and the sectional direction of the frame 1 as shown in FIGS. 1 and 3. Further, according to the present embodiment, adjacent convex portions 12b1 (12b2) located in the longitudinal direction of the frame partially overlap with each other having an overlap length shown by L1, and adjacent convex portions 12b2 (12b1) located in the sectional direction of the frame partially overlap with each other having an overlap length shown by L2. Thus, the above-described zigzag arrangement of the convex portions 12b, 12b . . . makes a situation where the base portion 12a does not extend continuously straightly in the longitudinal direction or the sectional direction.

Figure 4A:
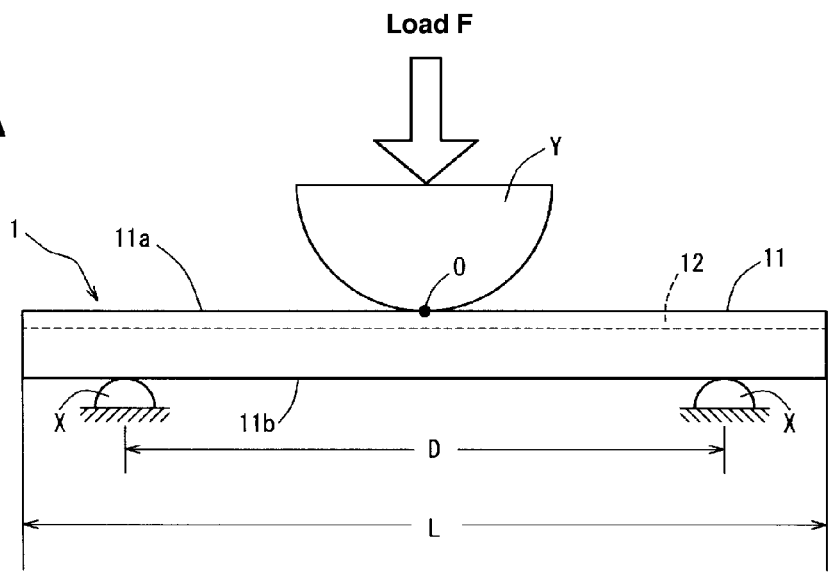
FIG. 4A is a diagram explaining an analysis method of bending resistance characteristics and impact energy absorption characteristics of the frame for a vehicle.
Figure 4B:
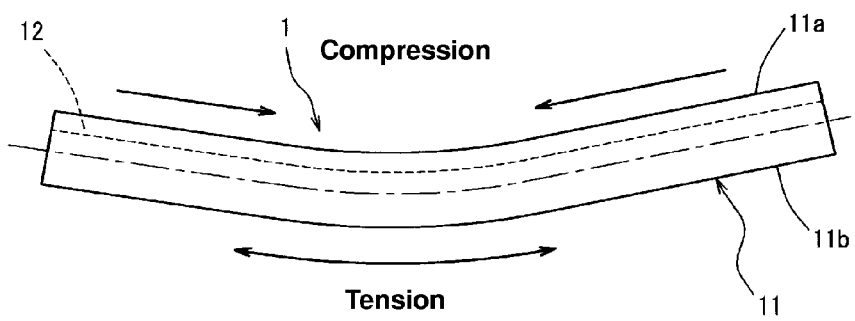
FIG. 4B is a diagram showing a bending state of the frame for a vehicle.

Next, bending resistance characteristics and impact energy absorption characteristics in case the frame 1 is bent by a load applied will be described referring to FIGS. 4 through 9. The inventors of the present invention conducted CAE (Computer Aided Engineering) simulation analysis of changes of the frame 1 in case a load F is applied to the frame 1 for developing the frame 1 shown in FIG. 1. FIG. 4A is a diagram explaining an analysis method of bending resistance characteristics and impact energy absorption characteristics of the frame 1. In this analysis, as shown in FIG. 4A, the frame 1 having a specified length L was supported at fixed points X, X which are way from each other by a specified distance D which is shorter than the length L, and a pressing member Y was lowered from above to its center O which was located at the middle of the fixed points X, X, thereby applying the load F which is equivalent to an impact load at the vehicle collision. FIG. 4 shows a state where the upper face is set to be the first face portion 11a of the frame body 11, and the load F is applied from above in the sectional direction to the surface of the first face portion 11a. Herein, a maximum load (herein, referred to as "the maximum load $F'_{max}$") which can be applied before the frame 1 starts bending and the impact energy (herein, referred to as "the amount of the impact energy absorption") which can be absorbed through bending were calculated, which were considered as parameters to evaluate the bending resistance characteristics and the impact energy absorption characteristics. Herein, in case a long pipe like the frame 1 bends, it curves in its longitudinal direction first as shown in FIG. 4B. Then, in this curve state, a bending inside of the pipe receives a compressive force, while a bending outside of the pipe receives a tensional force. In the case shown in FIG. 4A, 4B, the bending inside receiving the compressive force is the first face portion 11a, and the bending outside receiving the tensional force is the second face portion 11b.

Figure 5:
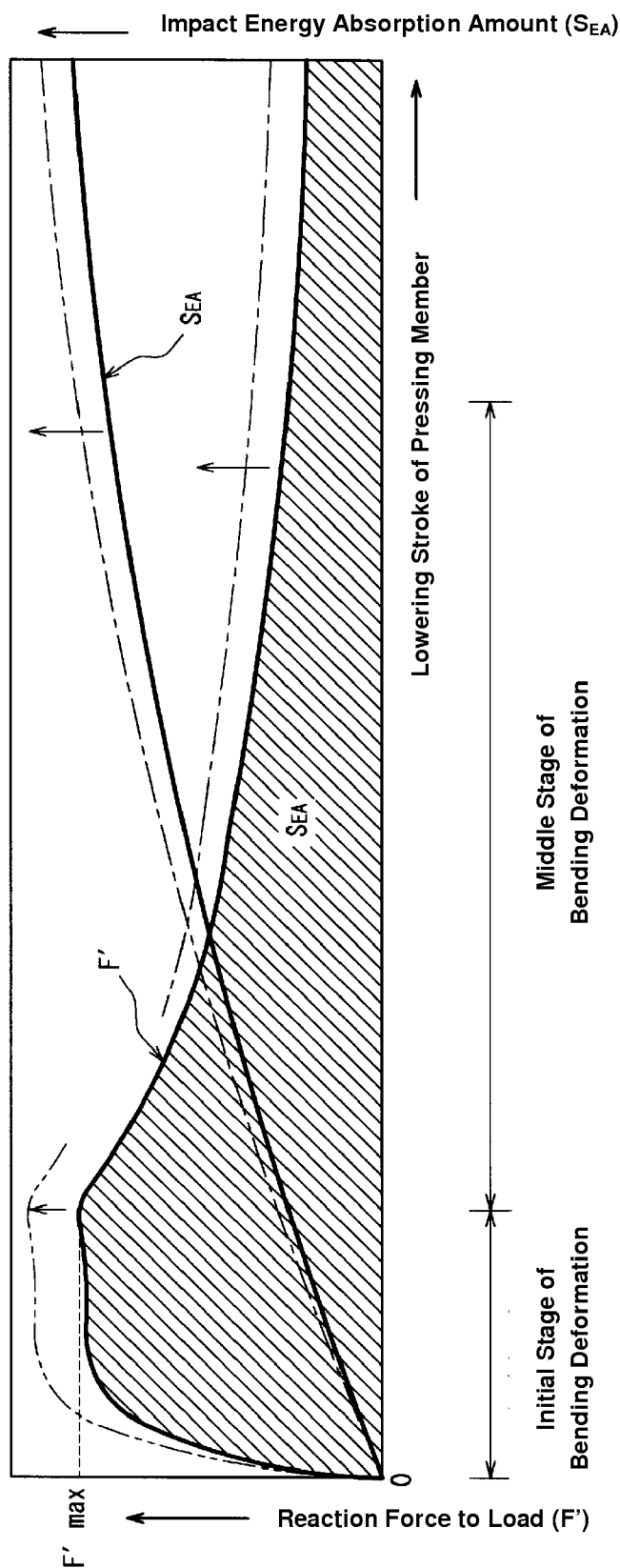
FIG. 5 is a graph showing a relationship of a reaction force to a load applied to the frame for a vehicle and a lowering stroke of a pressing member, and a relationship of the amount of impact energy absorption and the lowering stroke of the pressing member.

FIG. 5 is a graph showing a relationship of a reaction force F' to the load F applied to the frame 1 and a lowering stroke of the pressing member Y, and a relationship of the amount of impact energy absorption and the lowering stroke of the pressing member Y. The present inventors, in the simulation shown in FIG. 4, made a graph showing a relationship of the reaction force F' of the frame 1 to the load F and a stroke of the pressing member Y (herein, referred to as "lowering stroke") which changes depending on the curve and bending of the frame 1. The graph of FIG. 5 shows a tendency that a peak in a value of the reaction force F' appears midway of increase of the lowering stroke of the pressing member Y, and the value of the reaction force F' decreases gradually according to the increase of the lowering stroke. Thus, according to the graph of FIG. 5, gradually increasing the load F causes a gradual increase of the reaction force F' in accordance with the increase of the load F in a state before an appearance of the above-described peak. Meanwhile, in a state after the appearance of the peak, a quick progress of the bending of the frame 1 has started, so that the reaction force F' to the load F decreases. Herein, the value of the peak of the reaction force F' shown in FIG. 5 is the maximum load $F'_{max}$ which can be applied before the bending progresses quickly, which shows the degree of bending resistance. Further, the amount of the impact energy absorbable by the bending of the frame 1 can be obtained from an area $S_{EA}$ which is enclosed by a coordinate axis of the lowering stroke of the pressing member Y and the graph of the reaction force F' according to the graph shown in FIG. 5. In FIG. 5, a graph showing the lowering stroke of the pressing member Y and the area $S_{EA}$ is also shown.

Figure 8A:
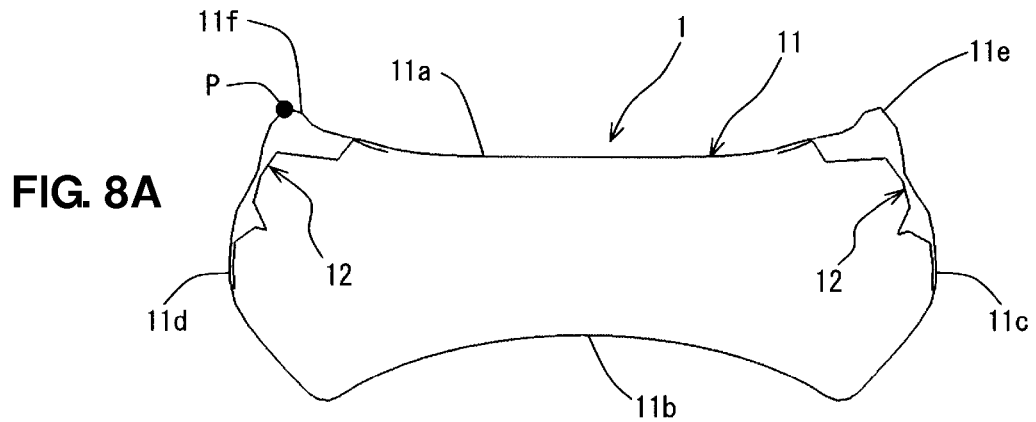
FIGS. 8A, 8B and 8C are diagrams showing shapes of a closed cross section at a bending portion.
Figure 8B:
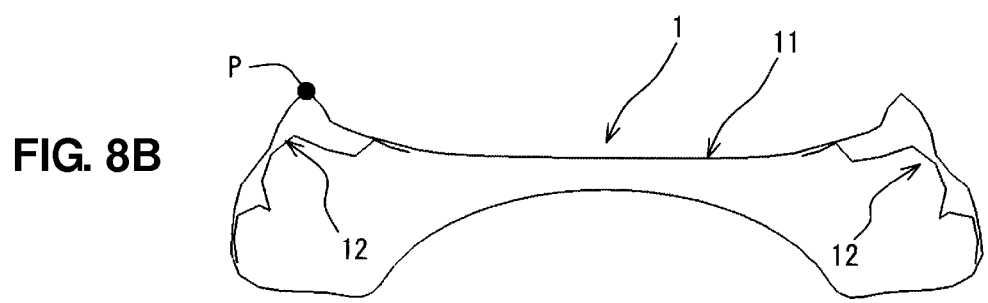
Figure 8C:
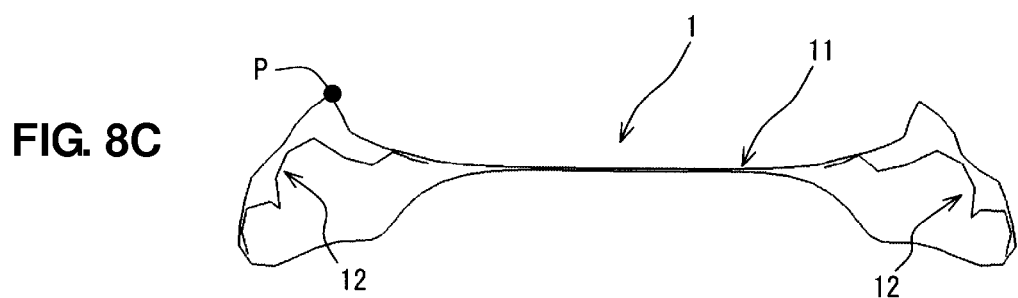

Hereinafter, the change of the frame 1 bent by the applied load F will be described referring to the simulation analysis results shown in FIGS. 6 through 8. FIGS. 6A, 6B and 6C are diagrams showing the simulation results of deformations of the frame for a vehicle in case the load F is applied vertically toward the center O of the first face portion 11a of the frame 1. FIGS. 7A, 7B and 7C are diagrams showing simulation results of deformations of the reinforcing member 12. FIGS. 8A, 8B and 8C are diagrams showing shapes of the closed cross section at the bending portion. Herein, the process of the bending deformation progress of the frame 1 is shown by the order of FIG. 6A, 6B and 6C, and FIGS. 7A-7C and FIGS. 8A-8C correspond to FIGS. 6A-6C. In these figures, the degree of deformation at each portion is illustrated by light and shade (graduation), and the deeper shade shows the greater deformation amount.

The present inventors calculated the deformation amount of each portion of the frame 1 in case the load F was applied as shown in FIG. 4A in evaluating the bending resistance characteristics and the impact energy absorption characteristics of the fame 1 shown in FIG. 1. It is apparent from FIGS. 6 through 8 that the bending portion appeared at the center O which the load F acted on right after the load F was applied to the frame 1, so that the outer-face deformation occurred at this bending portion mainly. For example, at the bending portion, some concaves occurred at the first face portion 11a and the both-side corner portions 11e, 11f, and the outer-face deformation occurred at the third and fourth face portions 11c, 11d (that is, the side face portions 11c, 11d deform outward, respectively) (see a deformation portion a shown in the figures). Further, at the same time as the outer-face deformation of the frame body 11, bending portions also occurred at the reinforcing member 12, and outer-face deformations occurred there, as shown in FIGS. 7A-7C (see a deformation portion β shown in the figures).

Figure 9:
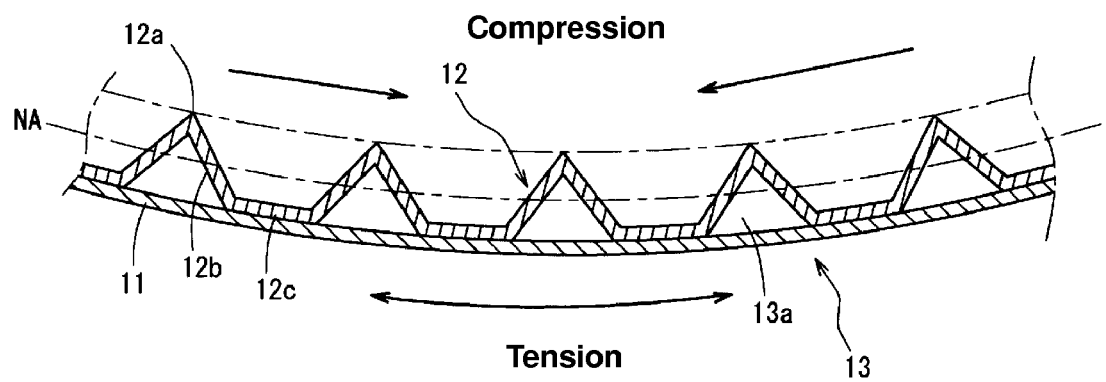
FIG. 9 is a sectional view explaining a function of a structure body comprising a frame body and the reinforcing member.

Herein, according to the frame 1 of the present embodiment, respective apexes P of the corner portions 11e, 11f (see FIG. 8) are restrained from deforming greatly outward, and also the great outer-face deformations of the third and fourth face portions 11c, 11d are restrained. Meanwhile, inward concaves occur newly at the second face portion 11b opposite to the first face portion 11a as shown in FIGS. 8A-8C. The frame body 11 and the reinforcing member 12 form a structure body 13 having plural closed cross sections 13a in both the sectional and longitudinal directions of the frame 1 as shown in FIG. 9. The frame body 11 and the base portion 12a are arranged away from a center axis (face) NA, so that the structure body 13 has an increased second moment of area. Herein, in case the outer-face deformation occurs at the bending portion, the deformation as shown in FIG. 9 occurs at the portion corresponding to the bending portion in the length and sectional directions of the structure body 13. Herein, the high bending resistance can be provided by the increased second moment of area of the structure body 13.

The present inventors found from the analysis results shown in FIGS. 6 through 8 that the outer-face deformation could be properly restrained by the structure body 13 with the increased second moment of area in case of the occurrence of the outer-face deformation at the bending portion. Further, by connecting the plural convex portions 12b to the frame body 11, plural imaginary areas 13A (see hatching portions in FIG. 3) which are partitioned by lines connecting respective connection portions are formed at the structure body 13. The present inventors found that the load F was received at the connecting portions of the imaginary areas 13A through cooperation of the frame body 11 and the reinforcing member 12, so that the ouster-face deformation at the bending portion was restrained more effectively. Further, they found that since the outer-face deformation occurred newly at the second face portion 11b, the outer-face deformations at the corner portions 11e, 11f and their surrounding portions were restrained, and thereby the load F could be received also at the second face portion 11b receiving the tensional force, so that the bending resistance at the entire closed cross section of the bending portion could be improved.

As described above, by arranging the reinforcing member 12 with the plural convex portions 12b in the area including the corner portions 11e, 11f of the first face portion 11a which receives the compressive force in case of the bending deformation of the frame body 11 and by arranging the plural convex portions 12b in the longitudinal and sectional directions of the frame 1, the outer-face deformation at the bending portion at the initial stage of the bending deformation can be restrained effectively. Accordingly, the maximum load $F'_{max}$ shown in FIG. 5 can be increased as shown by a two-dotted broken line, so that the bending resistance characteristics at the initial stage of the bending deformation before the bending deformation of the frame 1 progresses quickly (see FIG. 5) can be increased.

Further, the present inventors found that the third and fourth face portions 11e, 11d and the reinforcing member 12 deformed substantially uniformly at their connecting portions at the bending portion and its surrounding portion at the middle stage (see FIG. 5) of the bending deformation of the frame 1 after the peak of the reaction force F' (the maximum load $F'_{max}$) occurred. In this case, since the plural convex portions 12b are connected to the third and fourth face portions 11e, 11d, the third and fourth face portions 11e, 11d and the reinforcing member 12 can contribute to the impact energy absorption of the load F over the wide range around the bending portion. As a result, the area $S_{EA}$ at the middle stage of the bending deformation can be enlarged, so that the impact energy absorption characteristics of the frame 1 can be improved. Further, in this case, since the bending resistance characteristics and the impact energy absorption characteristics of the frame 1 can be improved, restraining the frame body 11 and the reinforcing member 12 from being improperly thick, the performance-weight efficiency (the maximum load $F'_{max}$/the entire weight of the frame 1, the area $S_{EA}$/the entire weight of the frame 1) in the bending resistance characteristics and the impact energy absorption characteristics can be improved. Herein, from viewpoints of the above-described improvement of the impact energy absorption characteristics of the frame 1, this frame 1 for a vehicle is applicable to a front side frame which absorbs the impact energy through its buckling deformation in the vehicle longitudinal direction at the vehicle frontal collision or the like.

Further, by adopting the structure, as shown in FIG. 3, in which the adjacent convex portions located in the longitudinal direction of the frame partially overlap with each other having the overlap length L1 and the adjacent convex portions located in the sectional direction of the frame partially overlap with each other having the overlap length L2, so that the base portion 12a does not extend continuously straightly in the longitudinal direction or the sectional direction, it can be restrained that any bending lines (bending causes) which extend in the longitudinal direction or the sectional direction occur at the base portion 12a in case the load F acts on the frame 1. Further, since the reinforcing member 12 has the flange portion 12d which is joined to the first face portion 11a receiving the compressive force in case the bending deformation occurs, the reinforcing member 12 can be surely prevented from coming off the frame body 11 in case of the bending deformation of the frame 1. Thus, the deformation restraint function and the impact energy absorption improvement function of the structure body 13 comprising the frame body 11 and the reinforcing member 12 can be stable. Moreover, since the plural convex portions 12b of the reinforcing member 12 have the tip portion joined to the frame body 11 which is of the truncated pyramid shape, in case the convex portions 12b are welded to the frame body 11, the flat portion 12c of the tip portion of the convex portions 12b can be a welding area. Thus, the joint of these members can be properly stable.

Embodiment 2

In improving the bending resistance characteristics by arranging the reinforcing member in the area including the corner portion of the first face portion that receives the compressive force in case of the bending deformation, the forming of the flange portion corresponding to the third and fourth face portions is not necessarily required. For example, the flange portion 12e of the reinforcing member 12 according to the first embodiment may be omitted like a reinforcing member 22 of a frame 2 for a vehicle shown in FIG. 10.

Figure 10:
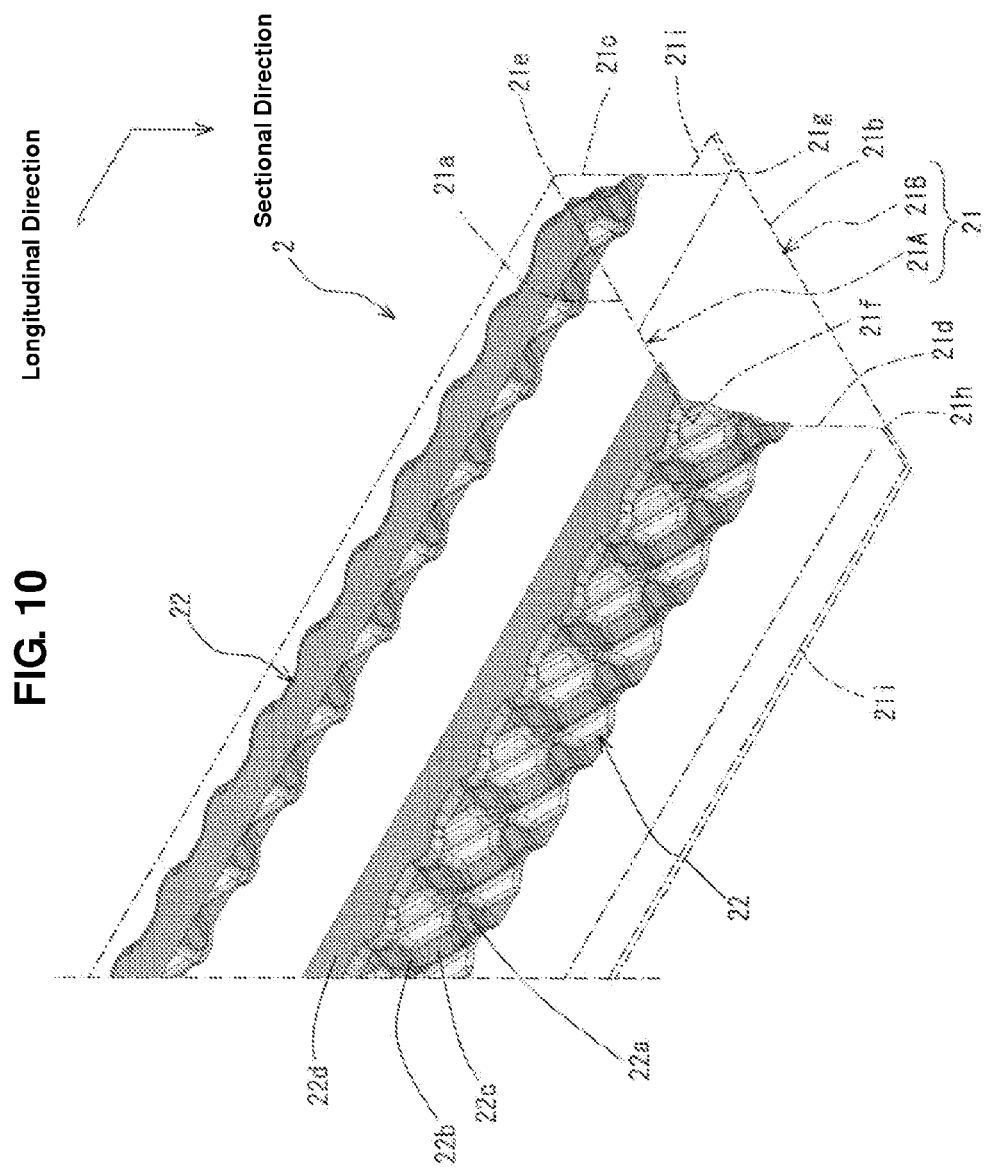
FIG. 10 is a perspective view showing a frame structure for a vehicle according to a second embodiment of the present invention.

The reinforcing member 22 shown in FIG. 10 comprises, likewise, a base portion 22a, convex portions 22b, and a flange portion 22d. The convex portions 22b are joined to third and fourth face portions 21c, 21d ("third face portion" in claims) at their flat face portions 22c, and the flange portion 22d is joined to a first face portion 21a of the frame body 21. Further, in the present invention, a rectangular pipe-shaped tube-shaped frame body 21 may be comprised of a first panel member 21A which has the U-shaped cross section and a flat-shaped second panel member 21B as shown in FIG. 10. The first panel member 21A has a pair of flanges 21i, 21i which project outward at its both end portions. The first panel member 21A and the second panel member 21B are placed so as to face to each other, and the flanges 21i, 21i and both end portions of the second panel member 21B are joined together, thereby forming the rectangular pipe of the frame body 21.

According to the present embodiment, the first panel member 21A comprises the first face portion (central face portion) 21a, the third and fourth face portions (side face portions) 21c, 21d which be continuous from both sides of this portion 21a, and the flange 21i, and corner portions 21e, 21f are formed between the third and fourth face portions 21c, 21d. Further, the second panel member 21B comprises a second face portion 21b, and corner portions 21g, 21h are formed by the joint of the first and second panel members 21A, 21B. Herein, the third and fourth face portions 21c, 21d are arranged between the first and second face portions 41a, 41b in case the members 21A, 21B are joined.

Embodiment 3

Figure 11:
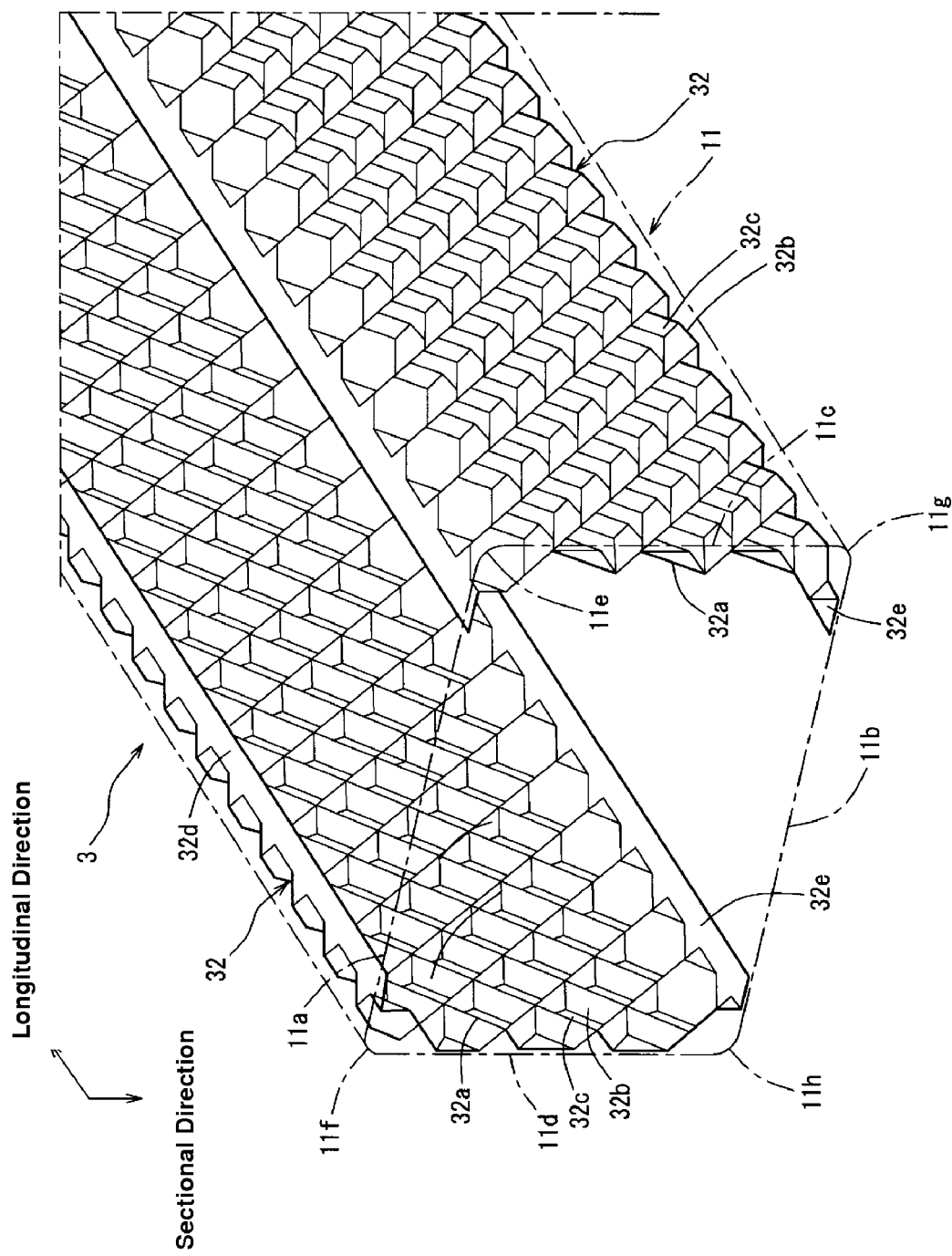
FIG. 11 is a perspective view showing a frame structure for a vehicle according to a third embodiment of the present invention.
Figure 12:
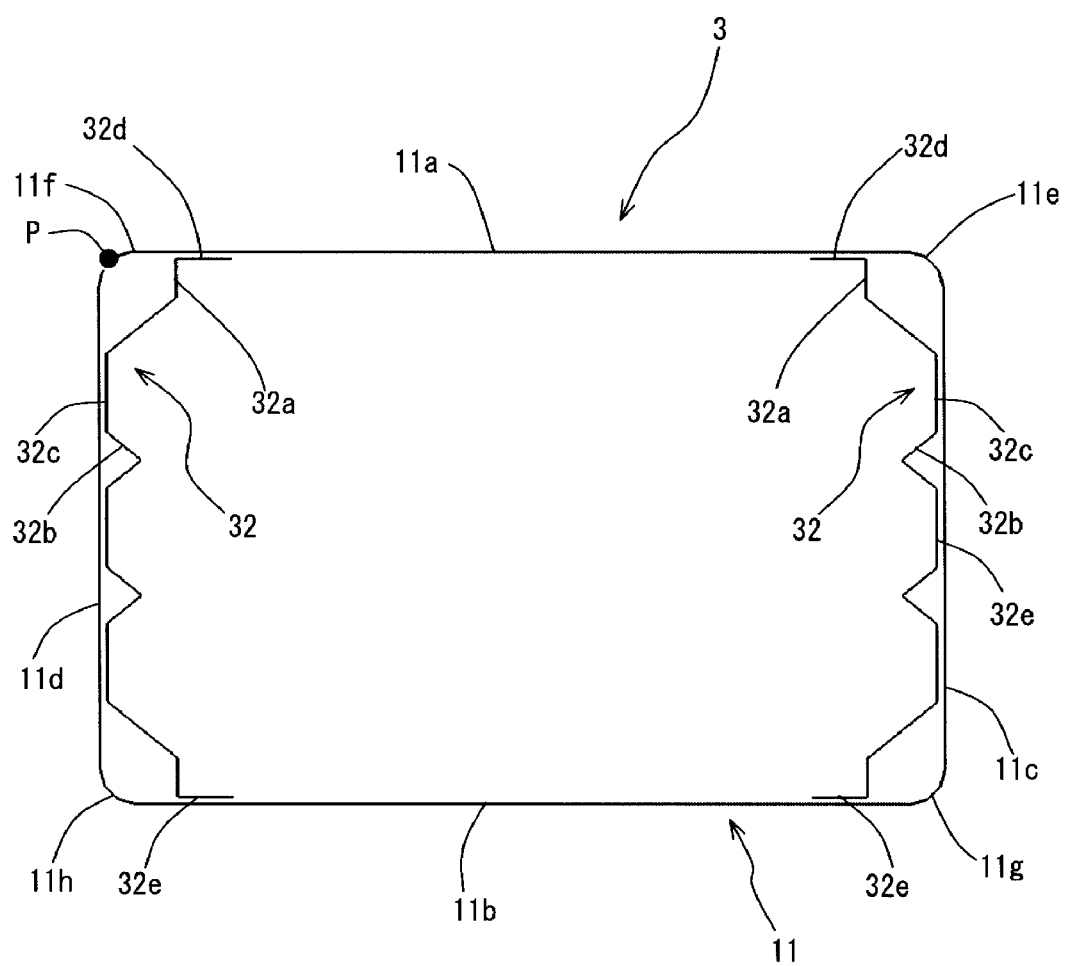
FIG. 12 is a sectional view of the frame for a vehicle along the sectional direction which is perpendicular to the longitudinal direction of the frame.

A third embodiment shown in FIGS. 11 through 15 will be described. FIG. 11 is a perspective view showing a frame structure for a vehicle according to the third embodiment of the present invention. FIG. 12 is a sectional view of a frame 3 for a vehicle along the sectional direction which is perpendicular to the longitudinal direction of the frame 3. As shown in FIG. 11, the frame 3 of the present embodiment comprises the frame body 11 and a pair of reinforcing members 32 which extend along almost entire faces of the third and fourth face portions 11c, 11d. In FIGS. 11 through 15, the same structures/elements as the first embodiment shown in FIGS. 1 through 9 are denoted by the same reference numerals, and their descriptions are omitted here.

According to the present embodiment, the reinforcing members 32 extend from the corner portions 11e, 11f to the corner portions 11g, 11h in the sectional direction so as to cover inside faces of the third and fourth face portions 11c, 11d. The reinforcing member 32 comprises a base portion 32a which is away from the third and fourth face portions 11c, 11d and plural convex portions 32b which project from the base portion 32a and are of the truncated pyramid shape. The reinforcing member 32 further comprises flat-shaped flange portions 32d, 32e at its both ends in the sectional direction of the frame body 11. Respective flat face portions 32c of the convex portions 32b are joined to the third and fourth face portions 11c, 11d, and the flange portion 32d is joined to the first face portion 11a of the frame body 11 and the flange portion 32e is joined to the second face portion 11b in their longitudinal directions. Further, the plural convex portions 32b, 32b . . . of the reinforcing member 32 are arranged in zigzags both in the longitudinal direction and the sectional direction of the frame like the above-described embodiments.

Figure 13A:
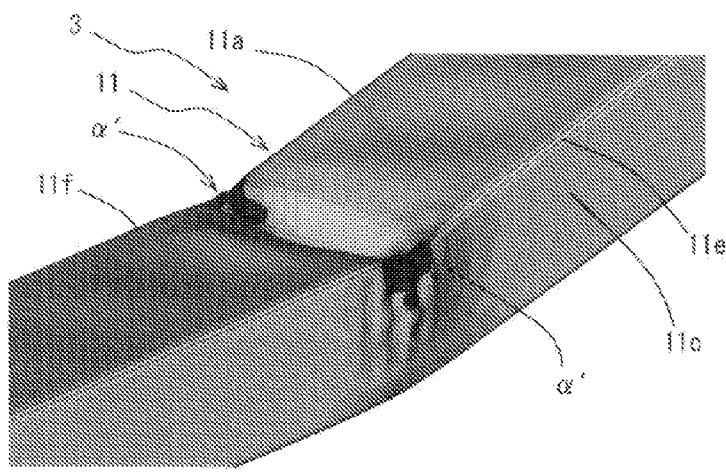
FIGS. 13A, 13B and 13C are diagrams showing simulation results of deformations of the frame for a vehicle in case the load is applied vertically toward the center of a first face portion of the frame.
Figure 13B:
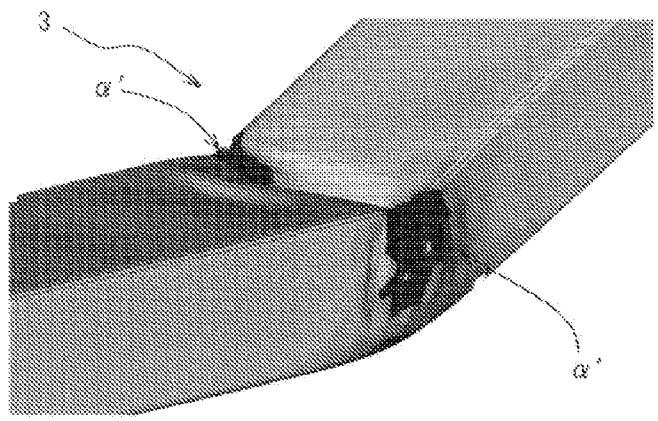
Figure 13C:
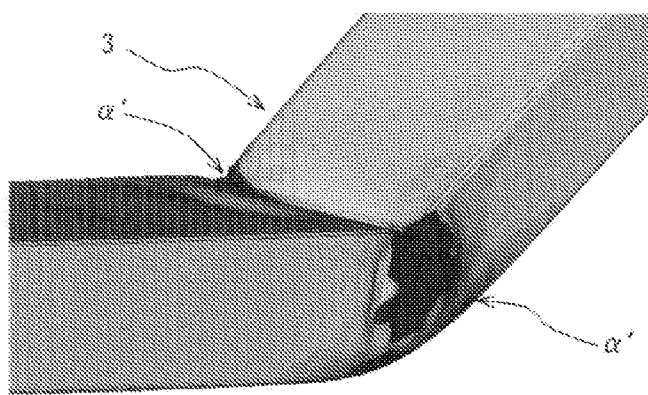

Next, the bending resistance characteristics and the impact energy absorption characteristics in case the frame 3 is bent by a load applied will be described referring to FIGS. 13 through 15. The present inventors conducted the CAE (Computer Aided Engineering) simulation analysis of changes of the frame 3 in case the load F is applied to the frame 3 in the same manner as the case of the frame 1 according to the first embodiment. It is apparent from FIGS. 13 through 15 that the outer-face deformation occurred at the bending portion of the center O which the load F acted on right after the load F was applied to the frame 3 (see a deformation portion α' shown in the figures). Further, at the same time as the outer-face deformation of the frame body 11, bending portions also occurred at the reinforcing member 32, and outer-face deformations occurred there (see a deformation portion β' shown in the figures).

Figure 15A:
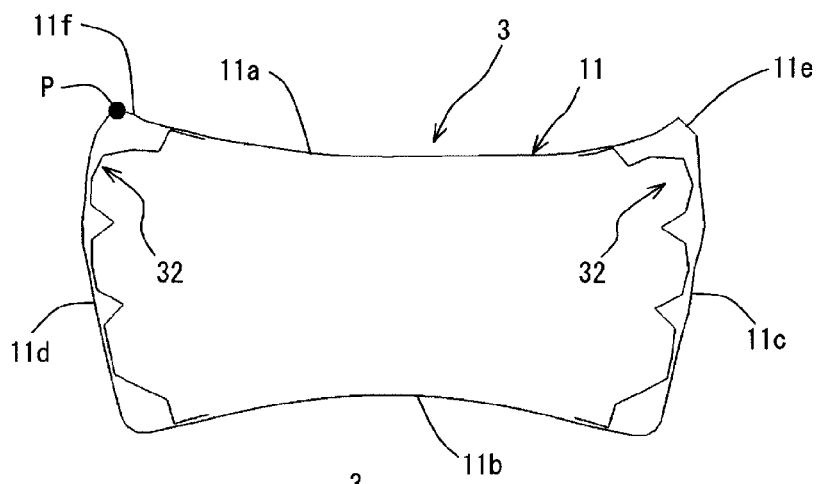
FIGS. 15A, 15B and 15C are diagrams showing shapes of a closed cross section at the bending portion.
Figure 15B:
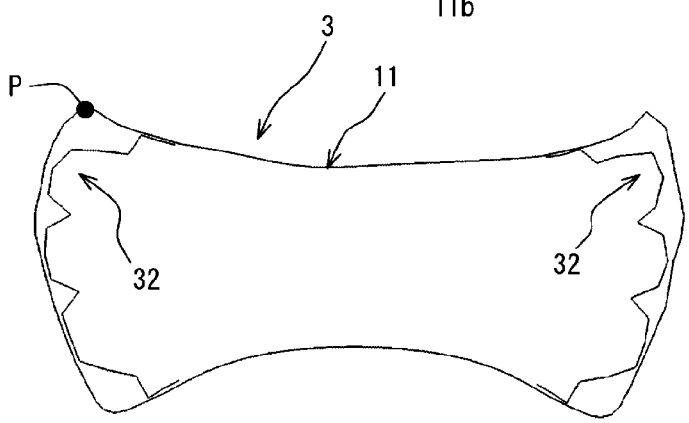
Figure 15C:
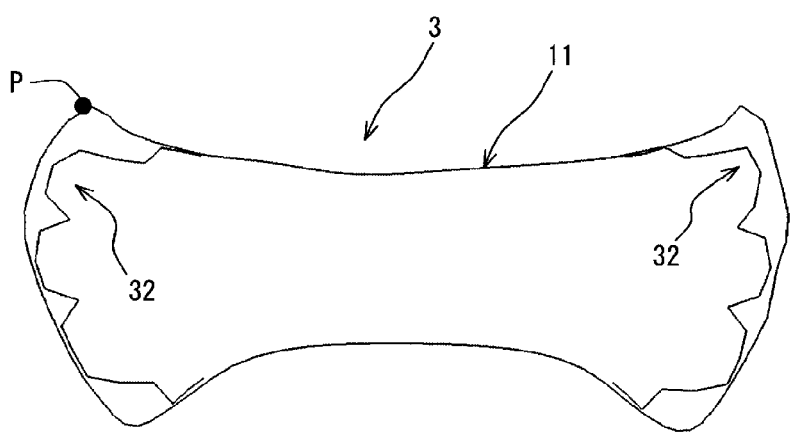

However, according to the present embodiment as well, the apexes P of the corner portions 11e, 11f (see FIGS. 15A-15C) are restrained from deforming greatly outward, and also the great outer-face deformations of the third and fourth face portions 11e, 11d are restrained. Meanwhile, inward concaves occur newly at the second face portion 11b opposite to the first face portion 11a as shown in FIGS. 15A-15C. Thus, according to the present embodiment as well, the outer-face deformation at the bending portion at the initial stage of the bending deformation is restrained effectively by the frame body 11 and the reinforcing member 32, so that the bending resistance at the bending portion is improved.

Herein, the present inventors found that the third and fourth face portions 11e, 11d and the reinforcing member 32 deformed substantially uniformly in a wider range at the middle stage of the bending deformation of the frame 3 by connecting the plural convex portions 32b to the third and fourth face portions 11e, 11d over almost entire range of those. Thus, according to the present embodiment, the third and fourth face portions 11e, 11d and the reinforcing member 32 can contribute to the impact energy absorption of the load F over the wider range. Accordingly, the impact energy absorption characteristics of the frame 3 at the middle stage of the bending deformation can be further improved.

Embodiment 4

Figure 16:
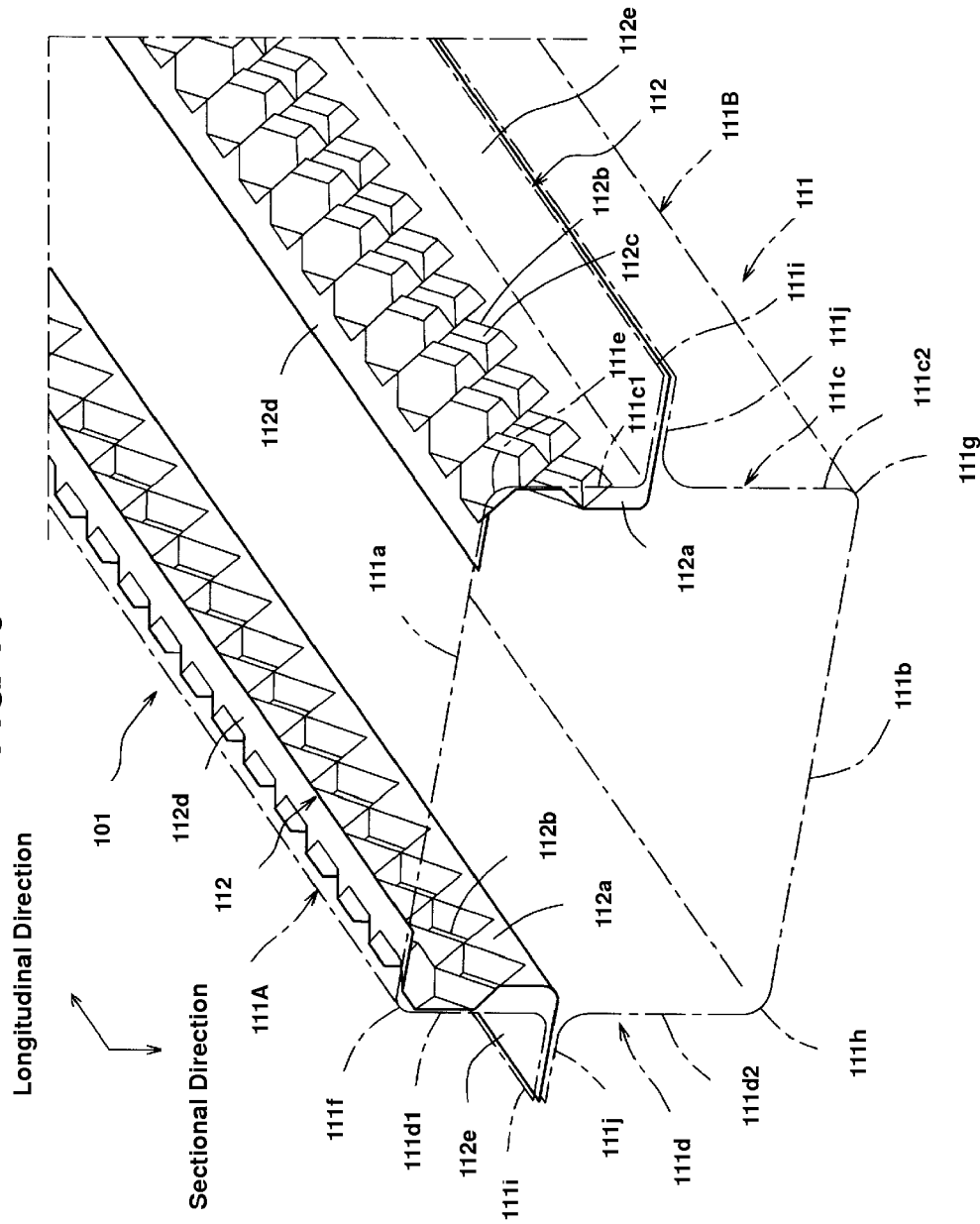
FIG. 16 is a perspective view showing a frame structure for a vehicle according to a fourth embodiment of the present invention.
Figure 17:
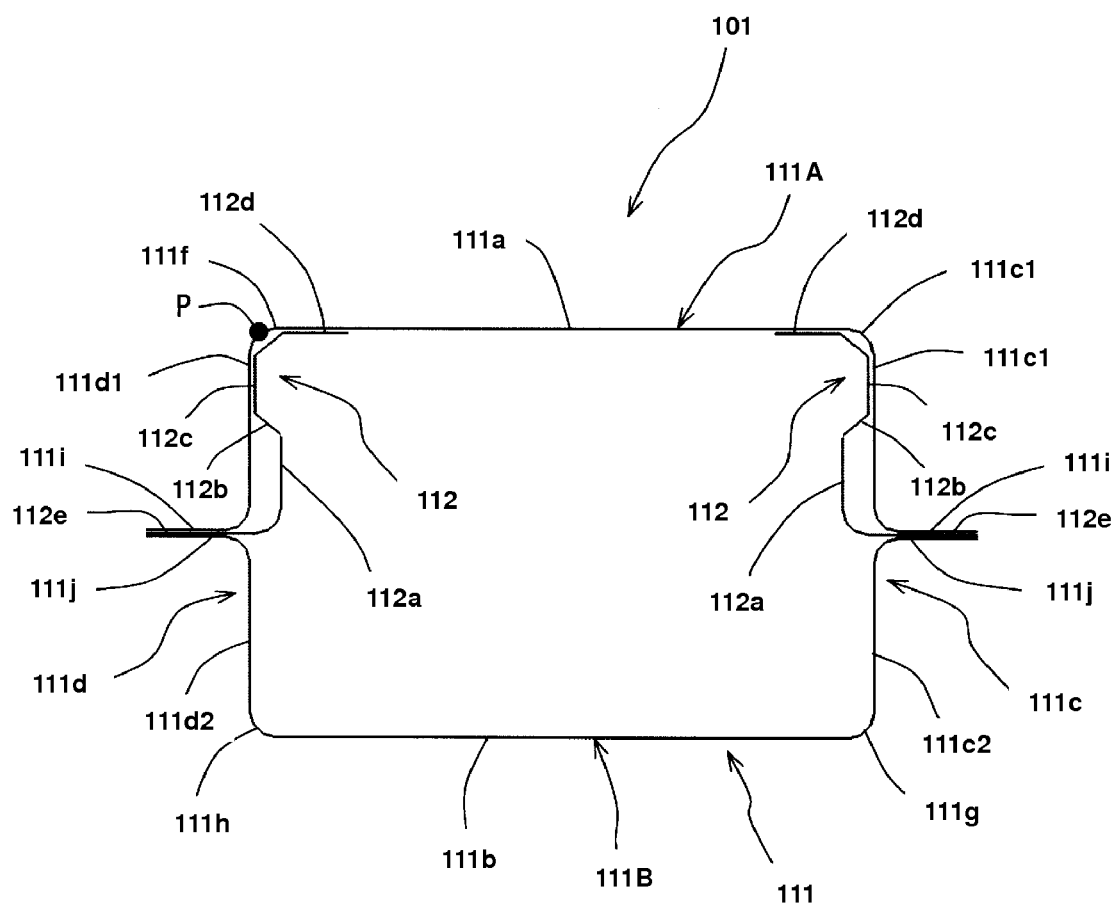
FIG. 17 is a sectional view of a frame for a vehicle along a sectional direction which is perpendicular to a longitudinal direction of the frame.

A fourth embodiment shown in FIGS. 16 through 28 will be described. FIG. 16 is a perspective view showing a frame structure for a vehicle according to a fourth embodiment of the present invention. FIG. 17 is a sectional view of a frame 101 for a vehicle along a sectional direction which is perpendicular to a longitudinal direction of the frame. As shown in FIG. 16, the frame 101 according to the present embodiment is comprised of first and second panel members 111A, 111B, and comprises a frame body 111 which has first through fourth face portions 111a-111d and a pair of reinforcing members 112 which extends in the longitudinal direction of the frame 101. Herein, the frame body 111 is illustrated by one-dotted broken lines in its transparent state in FIG. 16.

The first and second panel members 111A, 111B have a U-shaped cross section, and comprise the first and second face portions (central face portions) 111a, 111b, side face portions 111c1, 111d1, 111c2, 111d2 which are continues from the first and second face portions 111a, 111b, and flanges 111i, 111j which project outward at their both end portions. These panel members 111A, 111B are arranged so as to face to each other, and their flanges 111i, 111j are joined together, thereby forming a rectangular tube-shaped frame body 111. Herein, in case the first and second panel members 111A, 111B are joined together, the side face portions 111c1, 111d1, 111c2, 111d2 are arranged between the first and second face portions 111a, 111b. The third face portion 111c is formed by combination of the side face portion 111c1 of the first panel member 111A and the side face portion 111c2 of the second panel member 111B. The fourth face portion 111d is formed by combination of the side face portion 111d1 of the first panel member 111A and the side face portion 111d2 of the second panel member 111B. (Herein, the above-described face portions 111c, hid are "third face portions" in clams)

Corner portions 111e-111h are formed between the first through fourth face portions 111a-111d. The reinforcing members 112 are arranged in inside areas including the corner portions 111e, 111f, respectively. The reinforcing member 112 extends in the longitudinal direction of and over the almost entire length of the frame 101, and it also extends in its sectional direction over an area including the corner portions 111e, 111f, the side face portions 111c1, 111d1, and the flanges 111i, 111j of the first panel member 111A. The reinforcing member 112 comprises a base portion 112a which is away from the frame body 111 and plural convex portions 112b which project from the base portion 112a and have flat face portions 112c at their its tips. The reinforcing member 112 further comprises flat-shaped flange portions 112d, 112e at its both ends in the sectional direction. The flat face portions 112c of the projection portion 112b are joined to the third and fourth face portions 111c, 111d near the corner portions 111e, 111f. The flange portions 112d are joined to the first face portion 111a, and the flange portions 112e are arranged between the flanges 111i, 111j and joined to them.

Figure 18:
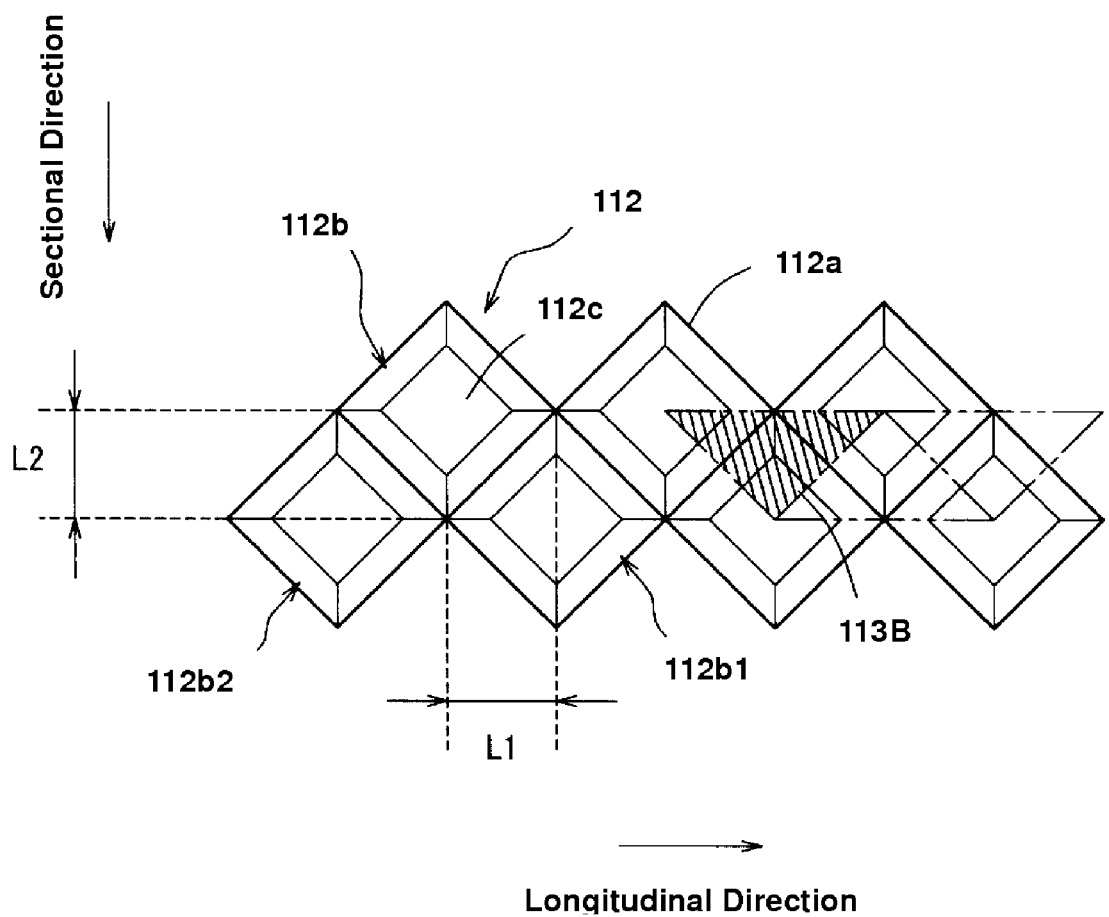
FIG. 18 is an elevation view explaining an arrangement of convex portions of a reinforcing member.

FIG. 18 is an elevation view explaining an arrangement of the convex portions 112b of the reinforcing member 112. The plural convex portions 112b, 112b . . . of the reinforcing member 112 have the flat face portion 112c which is of a truncated pyramid shape and arranged in zigzags both in the longitudinal direction and the sectional direction of the frame 101 as shown in FIGS. 16 and 18. Further, according to the present embodiment, adjacent convex portions 112b1 (112b2) located in the longitudinal direction of the frame partially overlap with each other having an overlap length shown by L1, and adjacent convex portions 112b2 (112b1) located in the sectional direction of the frame partially overlap with each other having an overlap length shown by L2. Thus, the above-described zigzag arrangement of the convex portions 112b, 112b . . . makes a situation where the base portion 112a does not extend continuously straightly in the longitudinal direction or the sectional direction.

Next, bending resistance characteristics and impact energy absorption characteristics in case the frame 101 is bent by a load applied will be described referring to FIGS. 19 through 24. The inventors of the present invention conducted CAE (Computer Aided Engineering) simulation analysis of changes of the frame 101 in case a load F is applied to the frame 101 for developing the frame 101 shown in FIG. 16.

Figure 19A:
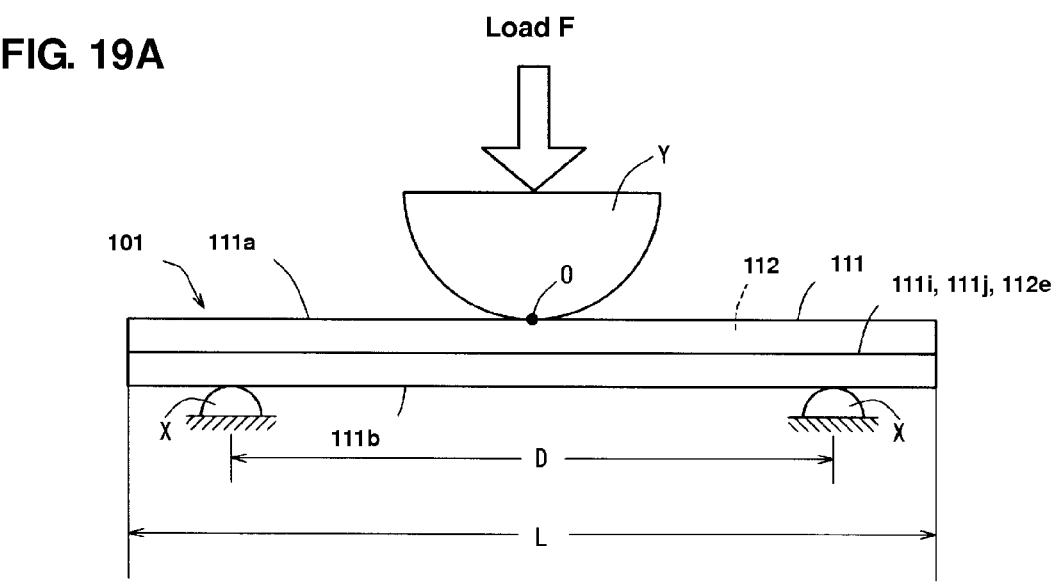
FIG. 19A is a diagram explaining an analysis method of bending resistance characteristics and impact energy absorption characteristics of the frame for a vehicle.
Figure 19B:
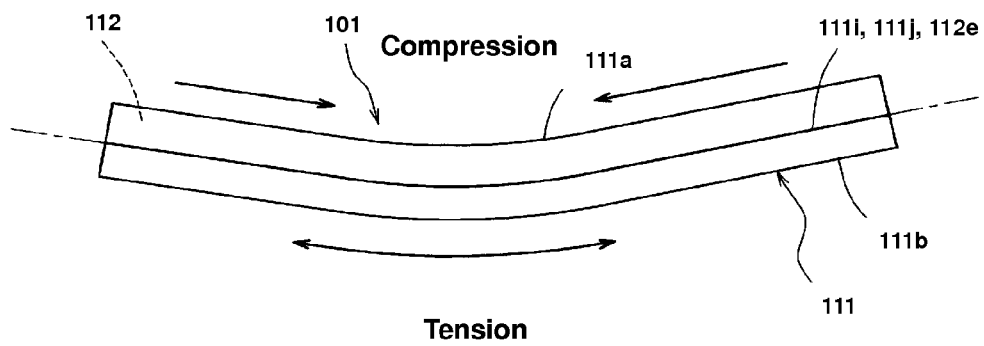
FIG. 19B is a diagram showing a bending state of the frame for a vehicle.

FIG. 19A is a diagram explaining an analysis method of bending resistance characteristics and impact energy absorption characteristics of the frame 101, which is substantially the same as FIG. 4A. In this analysis, as shown in FIG. 19A, the frame 101 having a specified length L was supported at fixed points X, X which are way from each other by a specified distance D which is shorter than the length L, and a pressing member Y was lowered from above to its center O which was located at the middle of the fixed points X, X, thereby applying the load F which is equivalent to an impact load at the vehicle collision. FIG. 4 shows a state where the upper face is set to be the first face portion 111a of the frame body 111, and the load F is applied from above in the sectional direction to the surface of the first face portion 111a. Herein, the maximum load ($F'_{max}$") which can be applied before the frame 101 starts bending and the impact energy (the amount of the impact energy absorption) which can be absorbed through bending were calculated, which were considered as parameters to evaluate the bending resistance characteristics and the impact energy absorption characteristics. Herein, in case a long pipe like the frame 101 bends, it curves in its longitudinal direction first as shown in FIG. 19B, which is substantially the same as FIG. 4B. Then, in this curve state, a bending inside of the pipe receives a compressive force, while a bending outside of the pipe receives a tensional force. In the case shown in FIG. 19A, 19B, the bending inside receiving the compressive force is the first face portion 111a, and the bending outside receiving the tensional force is the second face portion 111b.

Figure 20:
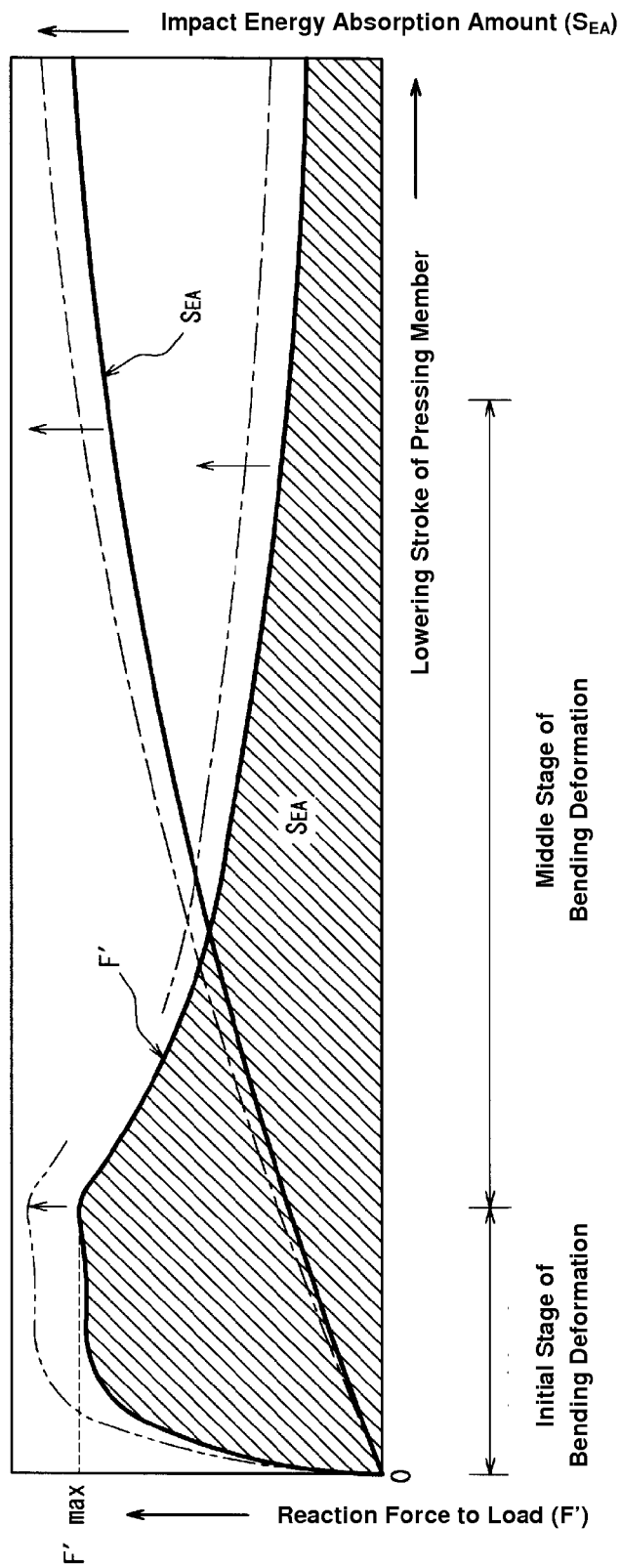
FIG. 20 is a graph showing a relationship of a reaction force to a load applied to the frame for a vehicle and a lowering stroke of a pressing member, and a relationship of the amount of impact energy absorption and the lowering stroke of the pressing member.

FIG. 20 is a graph showing a relationship of a reaction force F' to the load F applied to the frame 101 and a lowering stroke of the pressing member Y, and a relationship of the amount of impact energy absorption and the lowering stroke of the pressing member Y. The present inventors, in the simulation shown in FIG. 19, made a graph showing a relationship of the reaction force F' of the frame 101 to the load F and a stroke of the pressing member Y (hereinafter, referred to as "lowering stroke") which changes depending on the curve and bending of the frame 101. The graph of FIG. 20 shows a tendency that a peak in a value of the reaction force F' appears midway of increase of the lowering stroke of the pressing member Y, and the value of the reaction force F' decreases gradually according to the increase of the lowering stroke. Thus, according to the graph of FIG. 20, gradually increasing the load F causes a gradual increase of the reaction force F' in accordance with the increase of the load F in a state before an appearance of the above-described peak. Meanwhile, in a state after the appearance of the peak, a quick progress of the bending of the frame 101 has started, so that the reaction force F' to the load F decreases. Herein, the value of the peak of the reaction force F' shown in FIG. 20 is the maximum load $F'_{max}$ which can be applied before the bending progresses quickly, which shows the degree of bending resistance. Further, the amount the impact energy absorbable by the bending of the frame 101 can be obtained from an area $S_{EA}$ which is enclosed by a coordinate axis of the lowering stroke of the pressing member Y and the graph of the reaction force F' according to the graph shown in FIG. 20. In FIG. 20, a graph showing the lowering stroke of the pressing member Y and the area $S_{EA}$ is also shown.

Hereinafter, the change of the frame 101 bent by the applied load F will be described referring to the simulation analysis results shown in FIGS. 21 through 23. FIGS. 21A, 21B and 21C are diagrams showing the simulation results of deformations of the frame for a vehicle in case the load F is applied vertically toward the center O of the first face portion 111a of the frame 101. FIGS. 22A, 22B and 22C are diagrams showing simulation results of deformations of the reinforcing member 112. FIGS. 23A, 23B and 23C are diagrams showing shapes of the closed cross section at the bending portion. Herein, the process of the bending deformation progress of the frame 101 is shown by the order of FIG. 21A, 21B and 21C, and FIGS. 22A-22C and FIGS. 23A-23C correspond to FIGS. 21A-21C. In these figures, the degree of deformation at each portion is illustrated by light and shade (graduation), and the deeper shade shows the greater deformation amount.

The present inventors calculated the deformation amount of each portion of the frame 101 in case the load F was applied as shown in FIG. 19A in evaluating the bending resistance characteristics and the impact energy absorption characteristics of the fame 101 shown in FIG. 16. It is apparent from FIGS. 21 through 23 that the bending portion appeared at the center O which the load F acted on right after the load F was applied to the frame 101, so that the outer-face deformation occurred at this bending portion mainly. For example, at the bending portion, some concaves occurred at the first face portion 111a, the both-side corner portions 111e, 111f and the flanges 111i, 111j, and the outer-face deformation occurred at the third and fourth face portions 111c, 111d (that is, the side face portions 111c, 111d deform outward, respectively) (see a deformation portion a shown in the figures). Further, at the same time as the outer-face deformation of the frame body 111, bending portions also occurred at the reinforcing member 112, and outer-face deformations occurred there, as shown in FIGS. 22A-22C (see a deformation portion β shown in the figures).

Herein, according to the frame 101 of the present embodiment, respective apexes P of the corner portions 111e, 111f (see FIG. 23) are restrained from deforming greatly outward, and also the great outer-face deformations of the third and fourth face portions 111c, 111d are restrained. Meanwhile, inward concaves occur newly at the second face portion 111b opposite to the first face portion 111a as shown in FIGS. 23A-23C.

The present inventors found from the analysis results shown in FIGS. 21 through 23 that the outer-face deformation at the bending portion at the initial stage of the bending deformation could be properly restrained by the flange portions 112e of the reinforcing member 112 and the flanges 111i, 111j of the frame body 111. In FIGS. 21 through 23, the flanges 111i, 111j and the flange portions 112e restrains the apexes P of the corner portions 111e, 111f from deforming outward greatly, and also restrains the outward great outer-face deformation of the third and fourth face portions 111c, 111d.

Figure 24:
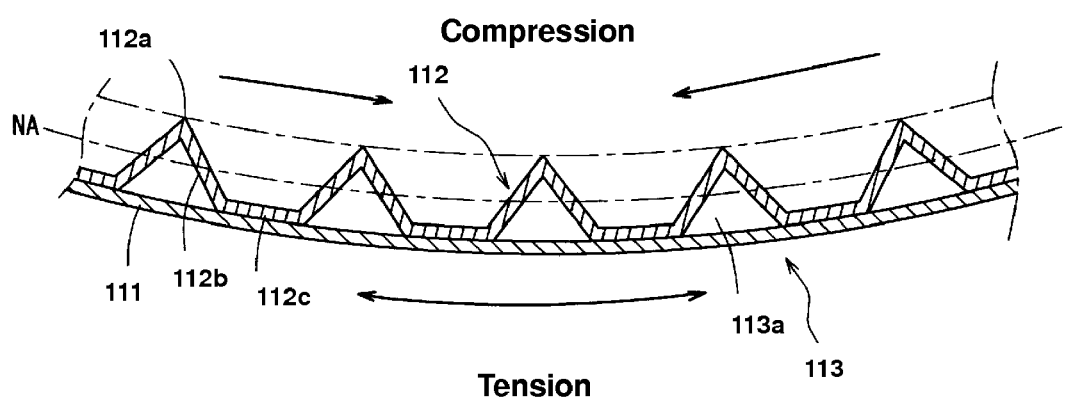
FIG. 24 is a sectional view explaining a function of a structure body comprising a frame body and the reinforcing member.

According to the present embodiment, since the flange portion 112e of the reinforcing member 112 is arranged between the flanges 1111i, 111j of the frame body 111 and joined to them, the connection of the frame body 111 and the reinforcing member 112 becomes firm, so that the outer-face deformation at the bending portion cab be restrained more effectively by cooperation of them. Thus, the bending resistance characteristics can be improved. Accordingly, the maximum load $F'_{max}$ shown in FIG. 20 can be increased as shown by a two-dotted broken line, so that the bending resistance characteristics at the initial stage of the bending deformation before the bending deformation of the frame 101 progresses quickly (see FIG. 20) can be increased. The frame body 111 and the reinforcing member 112 form a structure body 113 having plural closed cross sections 113a in both the sectional and longitudinal directions of the frame 101 as shown in FIG. 24. The frame body 111 and the base portion 112a are arranged away from a center axis (face) NA, so that the structure body 113 has an increased second moment of area. Herein, in case the outer-face deformation occurs at the bending portion, the deformation as shown in FIG. 24 occurs at the portion corresponding to the bending portion in the length and sectional directions of the structure body 113. Herein, the high bending resistance can be provided by the increased second moment of area of the structure body 113.

The present inventors found from the analysis results shown in FIGS. 21 through 23 that the outer-face deformation could be properly restrained by the structure body 113 with the increased second moment of area in case of the occurrence of the outer-face deformation at the bending portion. Further, by connecting the plural convex portions 112b to the frame body 111, plural imaginary areas 113A (see hatching portions in FIG. 18) which are partitioned by lines connecting respective connection portions are formed at the structure body 113. The present inventors found that the load F was received at the connecting portions of the imaginary areas 113A through cooperation of the frame body 111 and the reinforcing member 112, so that the ouster-face deformation at the bending portion was restrained more effectively. Further, they found that since the outer-face deformation occurred newly at the second face portion 111b, the outer-face deformations at the corner portions 111e, 111f and their surrounding portions were restrained, and thereby the load F could be received also at the second face portion 111b receiving the tensional force, so that the bending resistance at the entire closed cross section of the bending portion could be improved.

As described above, by arranging the reinforcing member 112 with the plural convex portions 112b in the area including the corner portions 111e, 111f of the first face portion 111a which receives the compressive force in case of the bending deformation of the frame body 111 and by arranging the plural convex portions 112b in the longitudinal and sectional directions of the frame 101, the outer-face deformation at the bending portion at the initial stage of the bending deformation can be restrained effectively.

Further, the present inventors found that the third and fourth face portions 111c, 111d and the reinforcing member 112 deformed substantially uniformly at their connecting portions at the bending portion and its surrounding portion at the middle stage (see FIG. 20) of the bending deformation of the frame 101 after the peak of the reaction force F' (the maximum load $F'_{max}$) occurred. In this case, since the plural convex portions 112b are connected to the third and fourth face portions 111c, 111d, the third and fourth face portions 111c, 111d and the reinforcing member 112 can contribute to the impact energy absorption of the load F over the wide range around the bending portion. As a result, the area $S_{EA}$ at the middle stage of the bending deformation can be enlarged, so that the impact energy absorption characteristics of the frame 101 can be improved. Further, in this case, since the bending resistance characteristics and the impact energy absorption characteristics of the frame 101 can be improved, restraining the frame body 111 and the reinforcing member 112 from being improperly thick, the performance-weight efficiency (the maximum load $F'_{max}$/the entire weight of the frame 101, the area $S_{EA}$/the entire weight of the frame 101) in the bending resistance characteristics and the impact energy absorption characteristics can be improved.

Further, by adopting the structure, as shown in FIG. 18, in which the adjacent convex portions located in the longitudinal direction of the frame partially overlap with each other having the overlap length L1 and the adjacent convex portions located in the sectional direction of the frame partially overlap with each other having the overlap length L2, so that the base portion 112a does not extend continuously straightly in the longitudinal direction or the sectional direction, it can be restrained that any bending lines (bending causes) which extend in the longitudinal direction or the sectional direction occur at the base portion 112a in case the load F acts on the frame 101. Further, since the reinforcing member 112 has the flange portion 112d which is joined to the first face portion 111a receiving the compressive force in case the bending deformation occurs, the reinforcing member 112 can be surely prevented from coming off the frame body 11 in case of the bending deformation of the frame 101. Thus, the deformation restraint function and the impact energy absorption improvement function of the structure body 113 comprising the frame body 111 and the reinforcing member 112 can be stable. Moreover, since the plural convex portions 112b of the reinforcing member 112 have the tip portion joined to the frame body 111 which is of the truncated pyramid shape, in case the convex portions 112b are welded to the frame body 111, the flat portion 112c of the tip portion of the convex portions 112b can be a welding area. Thus, the joint of these members can be properly stable.

Next, the manufacturing method of the frame 101 according to the present embodiment will be described referring to FIGS. 25 through 28. First, the two reinforcing members 112, 112 are joined to the first panel member 111A shown in FIG.

Figure 25:
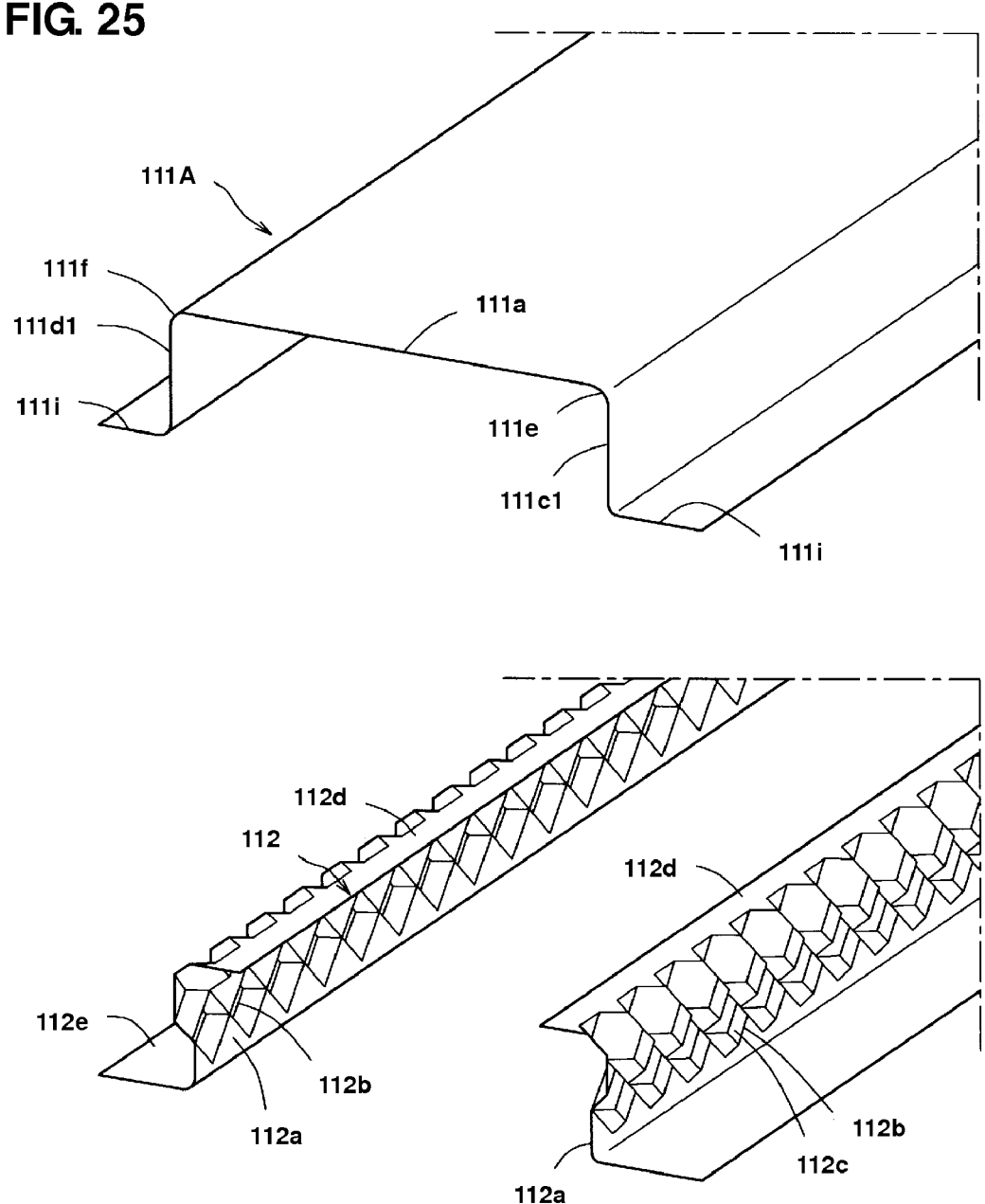
FIG. 25 is an exploded perspective view explaining a step of a manufacturing method of the frame for a vehicle.

25. Specifically, as shown in FIG. 25, an inner periphery of the first face portion 111a of the first panel member 111A and the flange portion 112d of the reinforcing member 112 are arranged so as to face to each other, and the flange 111i of the first panel member 111A and the flange portion 112e of the reinforcing member 112 are arranged so as to face to each other. Then, these are placed so as to overlap with each other, respectively, so that the reinforcing member 112 contacts the first panel member 111A. After this, the inner periphery of the first face portion 111a and the flange portion 112d are joined at a connecting portion Z1 illustrated by a bold solid line in FIG. 26. The both side face portions 111c1, 111d1 of the first panel member 111A and the respective tip end portions 112c of the plural convex portions 112b are joined at connecting portions Z2 illustrated by an arrow x in FIG. 26. Herein, the joint of the inner periphery of the first face portion 111a and the flange portion 112d is conducted along their longitudinal directions by a spot welding or a lazar welding. The joint of the side face portions 111c1, 111d1 and the tip end portions 112c of the convex portions 112b is conducted by the spot welding.

Figure 27:
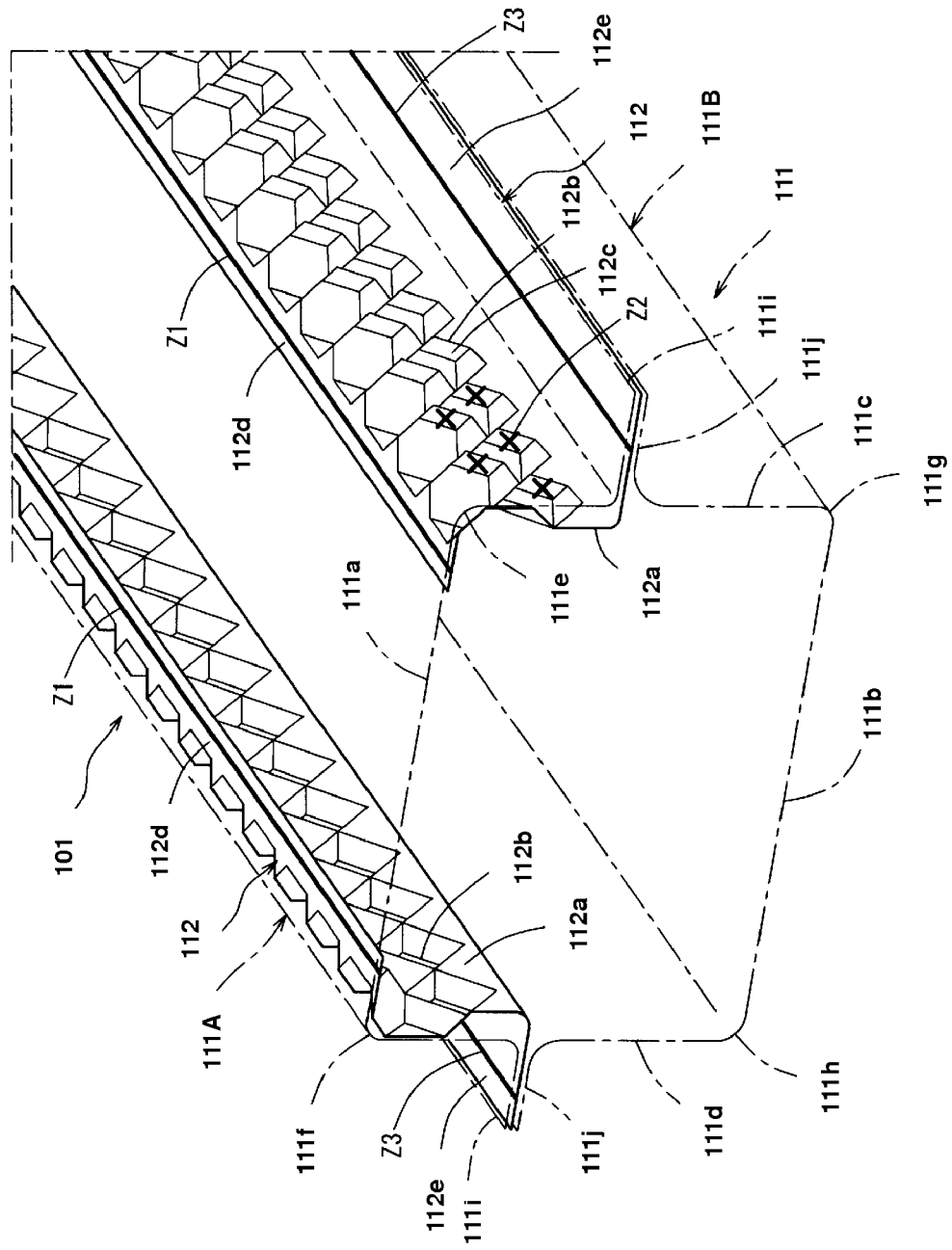
FIG. 27 is an exploded perspective view explaining further another step of the manufacturing method of the frame for a vehicle.
Figure 28:
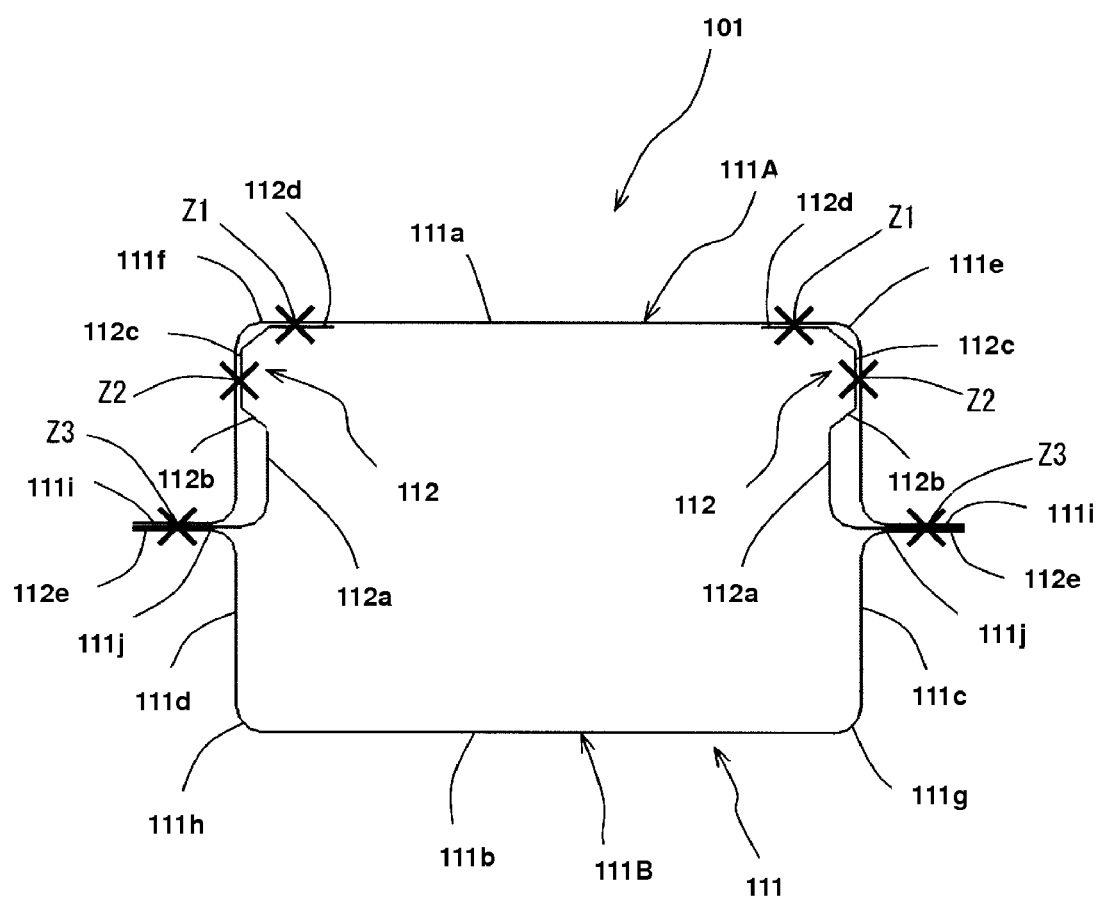
FIG. 28 is a sectional view explaining the manufacturing method of the frame for a vehicle.

Subsequently, the second panel member 111B is joined to the assembly of the first panel member 111A and the reinforcing members 112, 112. Specifically, as shown in FIG. 26, the flange 111j of the second panel member 111B is placed so as to face to an overlap portion of the flange 111i of the first panel member 111A and the flange portion 112e of the reinforcing member 112. Then, as shown in FIG. 27, the respective flanges 111i, 111j and the flange portion 112e are positioned so as to overlap, and the second panel member 111B is placed so as to contact the above-described assembly. After this, three sheets of flanges 111i, 111j and the flange portion 112e are joined at connecting portions Z3 illustrated by a bolt solid line in FIG. 27 or by arrows x in FIG. 28. Thereby, the rectangular pipe-shaped frame body 111 is formed, so that the frame 101 for a vehicle equipped with the reinforcing member 112 is complete. Herein, the joint of the flanges 111i, 111j and the flange portion 112e is conducted along their longitudinal directions by the spot welding or the lazar welding.

As described above, the manufacturing method of the frame 101 for a vehicle according to the present embodiment comprises a step of joining in advance the reinforcing members 112 to the inner periphery of the first panel member 111A via the convex portions 112b, and a step of joining the flange portions 111i, 112e to the flange 111j of the second panel member 111B. Thereby, the convex portions 112b of the reinforcing members 112 can be easily joined to the inner periphery of the frame body 111 by using the known method, such as the spot welding or the lazar welding. Herein, in case the reinforcing member 112 is joined to the first panel member 111A, the inner periphery of the first face portion 111a and the flange portion 111d may be joined together first, and then the side face portions 111c1, 111d1 and the convex portions 112b may be joined together. In this case, the connection portion Z1 performs a temporary connection for the joint of the side face portions 111c1, 111d1 and the convex portions 112b.

While the flanges (flange portion) 111i, 111j, 112e are joined together by the one-time welding in the present embodiment, the present invention should not be limited to this. For example, in the step of joining the first panel member 111A and the reinforcing member 112 prior to the joint of the second panel member 111B to the above-described assembly, the flange 111i and the flange portion 112e may be joined in advance, and then the flange 111j and the flange portion 112e may be joined. Further, while the respective members are joined by the welding according to the present embodiment, they may be joined by an adhesive agent.

Embodiment 5

Figure 29:
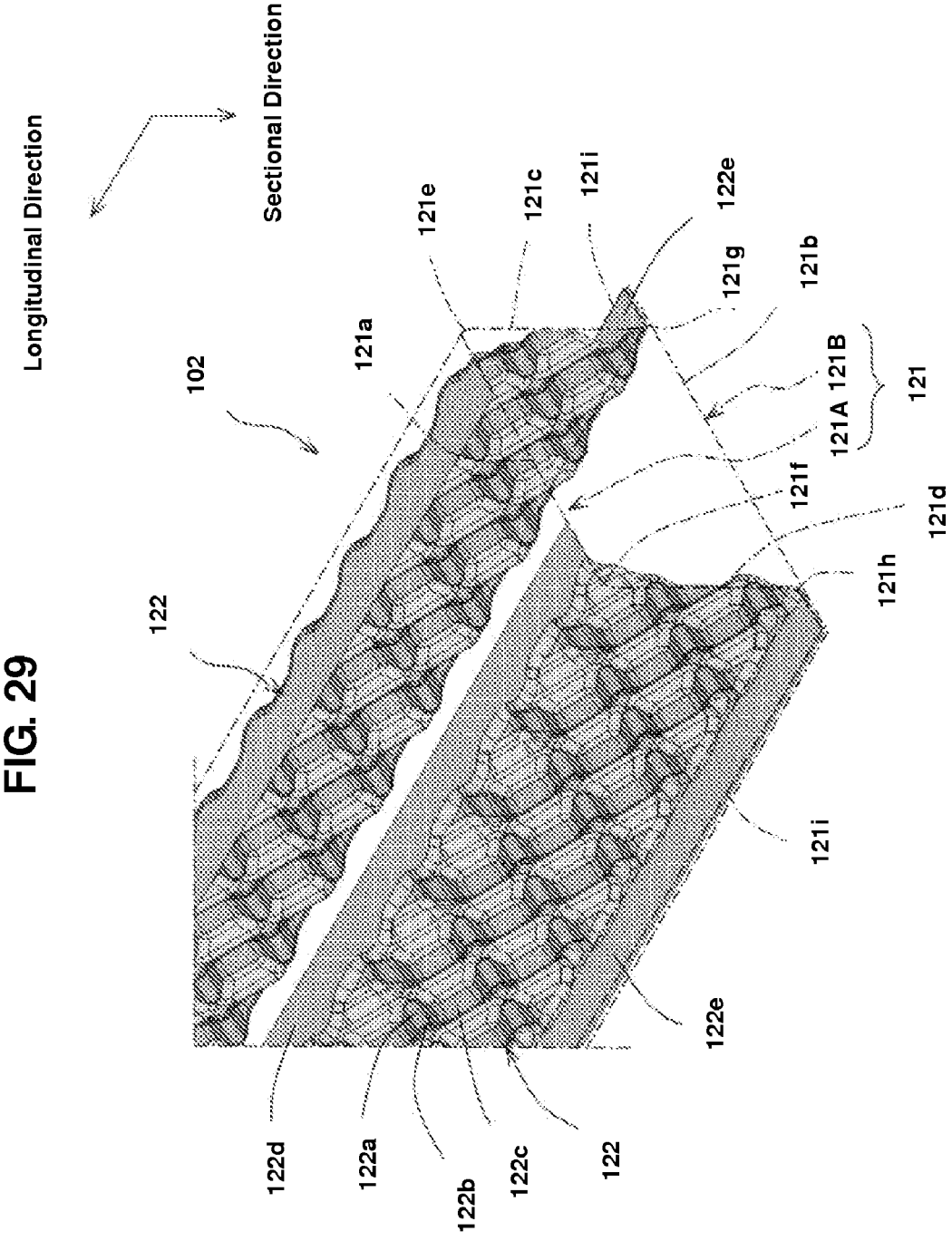
FIG. 29 is a perspective view showing a frame structure for a vehicle according to a fifth embodiment of the present invention.

In the present invention, a frame body 121 may be formed by a first panel member 121A having the U-shaped cross section and a flat-shaped second panel member 121B, like a frame 102 for a vehicle shown in FIG. 29. Herein, both ends of a reinforcing member 122 may be placed between flanges 121i and both end portions of the second panel member 121B and joined to them. The first panel member 121A comprises a pair of flanges 121i, 121i at the both end portions. The first and second panel members 121A, 121B are arranged so as to face to each other, and the flanges 121i, 121i and the both end portions of the second panel member 121B are joined together, thereby forming the rectangular-shaped frame body 121.

The first panel member 121A of the present embodiment comprises a first face portion (central face portion) 121a, third and fourth face portions (side face portions) 121c, 121d ("third face portion" in claims) which are continuous from both sides of the first face portion 121a, and the flanges 121i. Corner portions 121e, 121f are formed between the first face portion 121a and the third and fourth face portions 121a, 121d. Further, the second panel member 121B comprises a second face portion 121b, and corner portions 121g, 121h are formed by the joint of the first and second panel members 121A, 121B. The third and fourth face portions 121c, 121d are arranged between the first and second face portions 121a, 121b in case the first and second panel members 121A, 121B are joined. Two reinforcing members 122 of the present embodiment are arranged so as to extend from the corner portions 121e, 121f to the corner portions 121g, 121h in the sectional direction and cover the inner face of the third and fourth face portions 121c, 121d. This reinforcing member 122 comprises a base portion 122a which is away from the frame body 121 and the third and fourth face portions 121c, 121d, and plural convex portions 122b which project from the base portion 122a and are of a truncated pyramid shape. The reinforcing member 122 further comprises flat-face shaped flange portions 122d, 122e at its both end portions in the sectional direction. Respective flat face portions 122c of the convex portions 122b are joined to the third and fourth face portions 121c, 121d. The flange portion 122d is joined to the first face portion 121a of the frame body 121, and the flange portion 122e is placed between the flanges 122i, 122j and joined to them.

Figure 30:
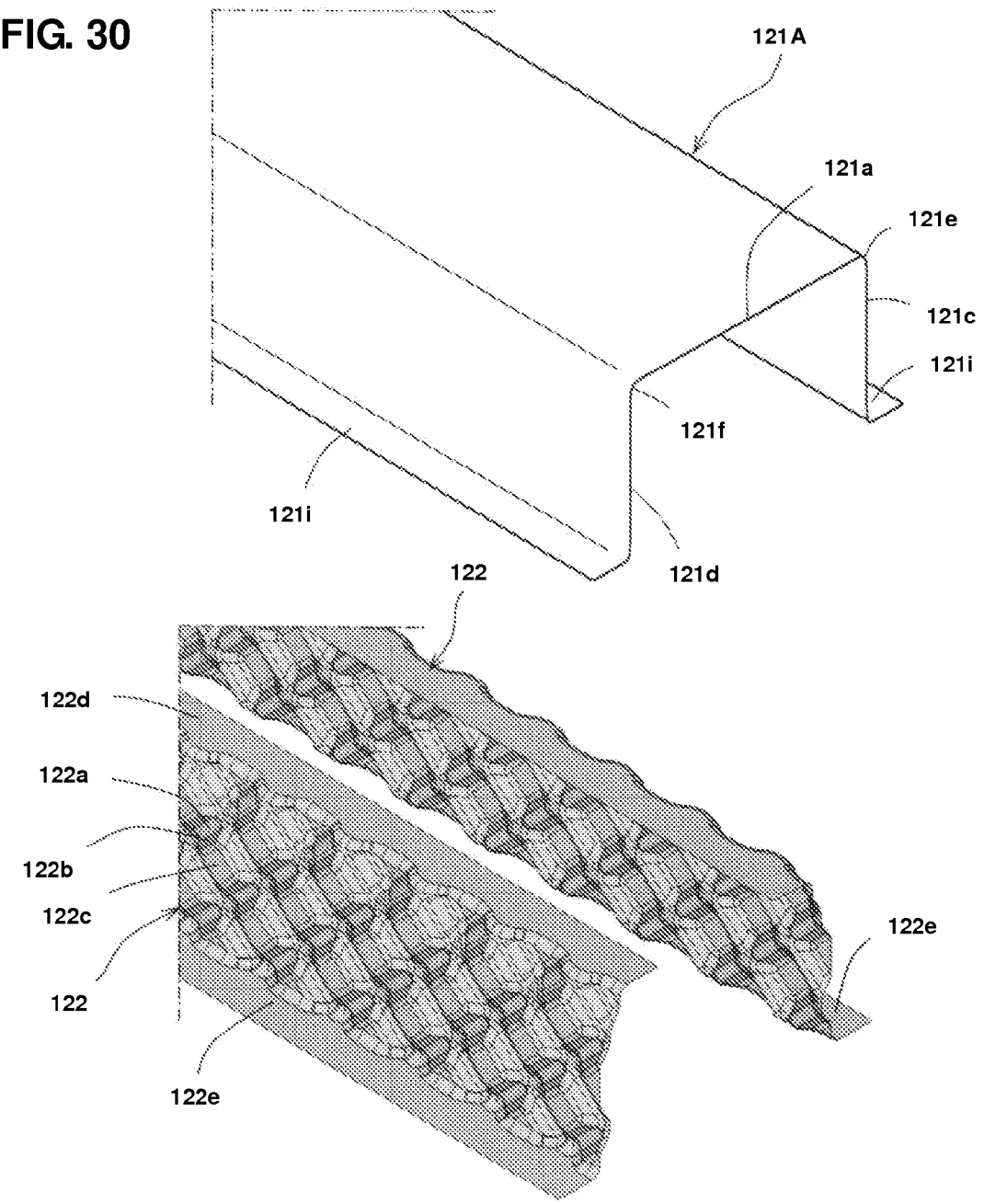
FIG. 30 is an exploded perspective view explaining a step of a manufacturing method of the frame for a vehicle.

Next, the manufacturing method of the frame 102 according to the present embodiment will be described referring to FIGS. 30 through 33. First, the two reinforcing members 122, 122 are joined to the first panel member 121A shown in FIG. 30. Specifically, as shown in FIG. 30, an inner periphery of the first face portion 121a of the first panel member 121A and the flange portion 122d of the reinforcing member 122 are arranged so as to face to each other, and the flange 121i of the first panel member 121A and the flange portion 122e of the reinforcing member 122 are arranged so as to face to each other. Then, these are placed so as to overlap with each other, respectively, so that the reinforcing member 122 contacts the first panel member 121A. After this, the inner periphery of the first face portion 121a and the flange portion 122d are joined at a connecting portion Z1 illustrated by a bold solid line in FIG. 31. The third and fourth side face portions 121c, 121d of the first panel member 121A and the respective tip end portions 122c of the plural convex portions 122b are joined at connecting portions Z5 illustrated by an arrow x in FIG. 31.

Herein, the joint of the inner periphery of the first face portion 121a and the flange portion 122d is conducted along their longitudinal directions by a spot welding or a lazar welding. The joint of the third and fourth face portions 121c, 121d and the tip end portions 122c of the convex portions 122b is conducted by the spot welding.

Figure 31:
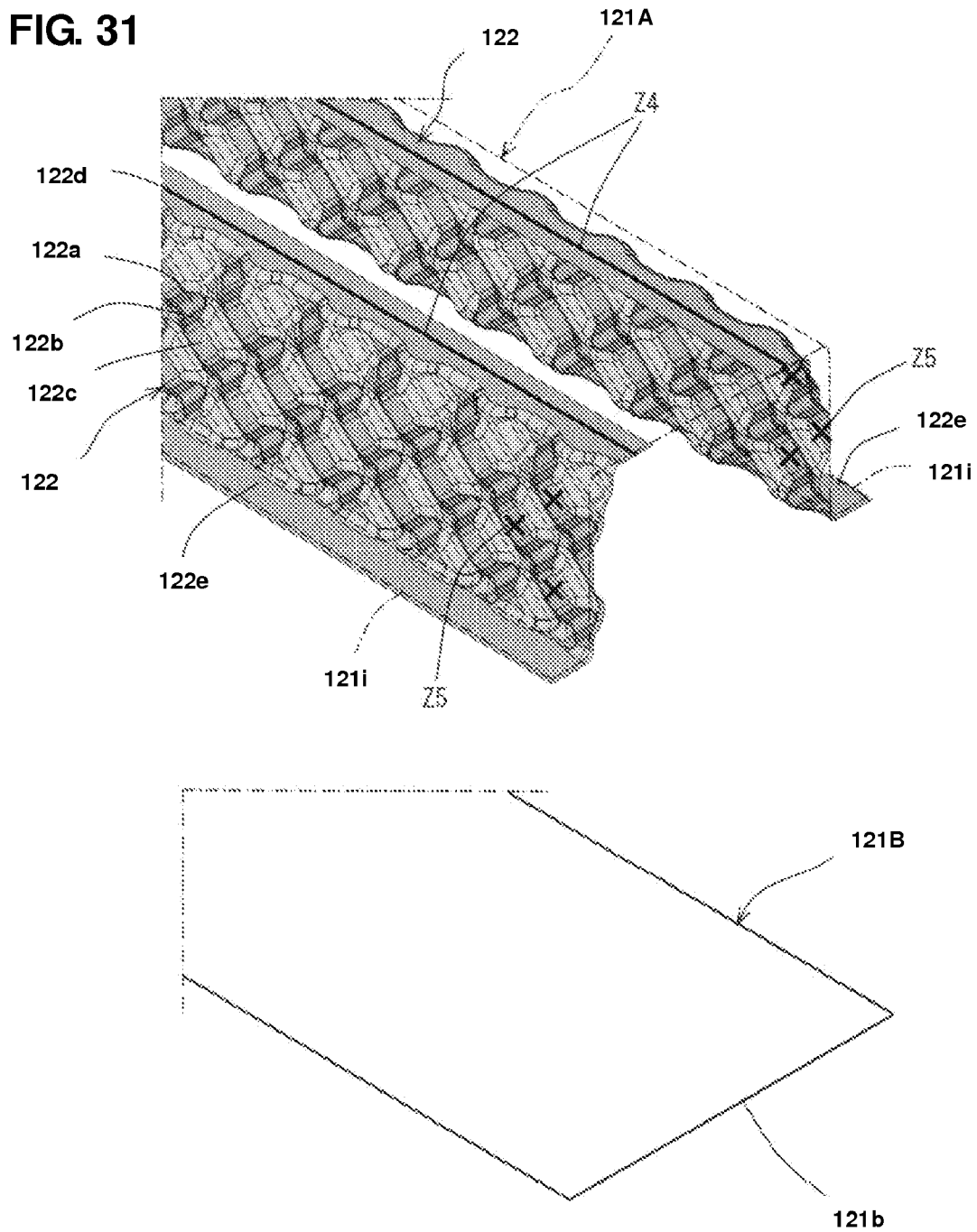
FIG. 31 is an exploded perspective view explaining another step of the manufacturing method of the frame for a vehicle.
Figure 32:
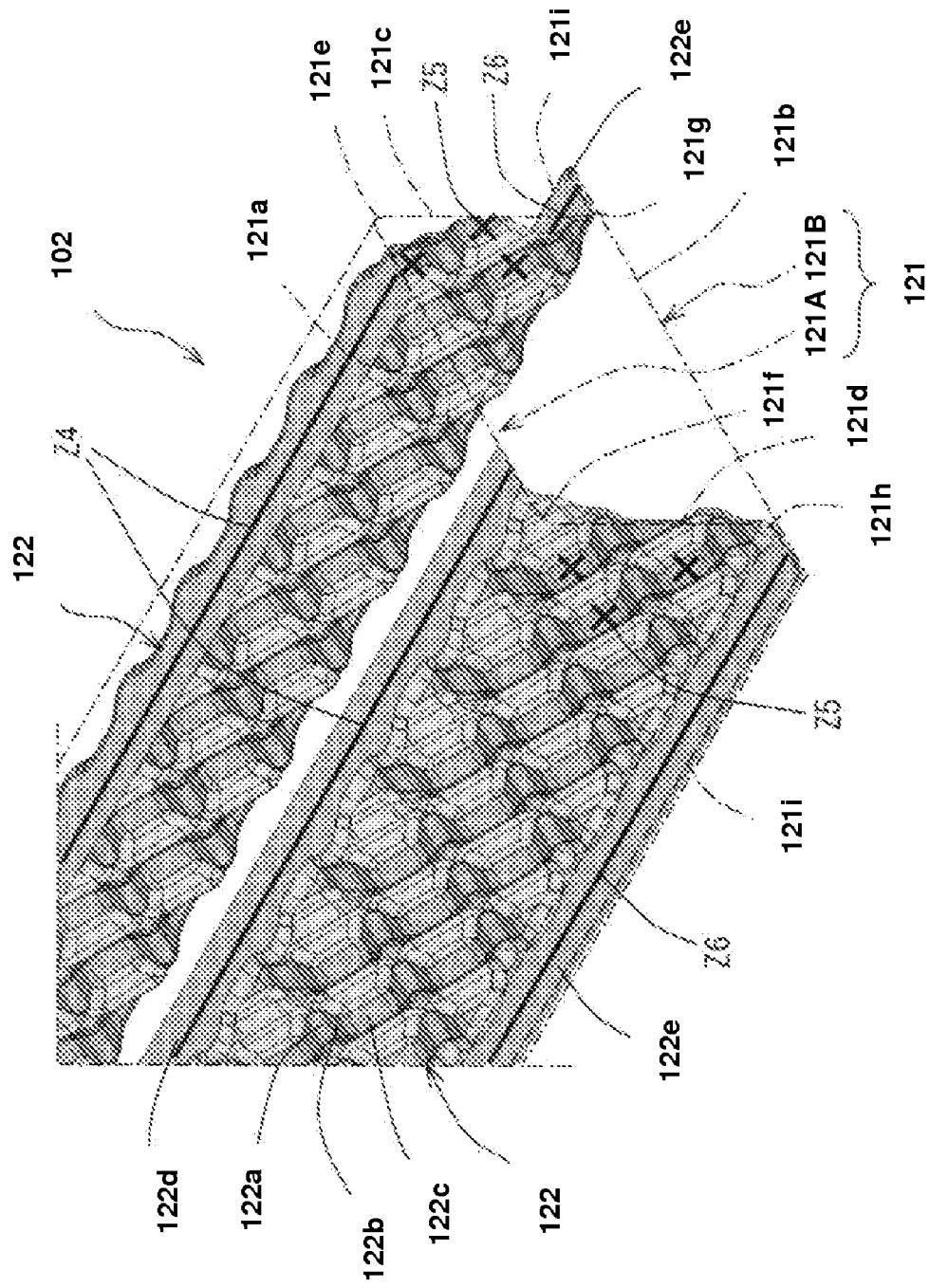
FIG. 32 is an exploded perspective view explaining further another step of the manufacturing method of the frame for a vehicle.
Figure 33:
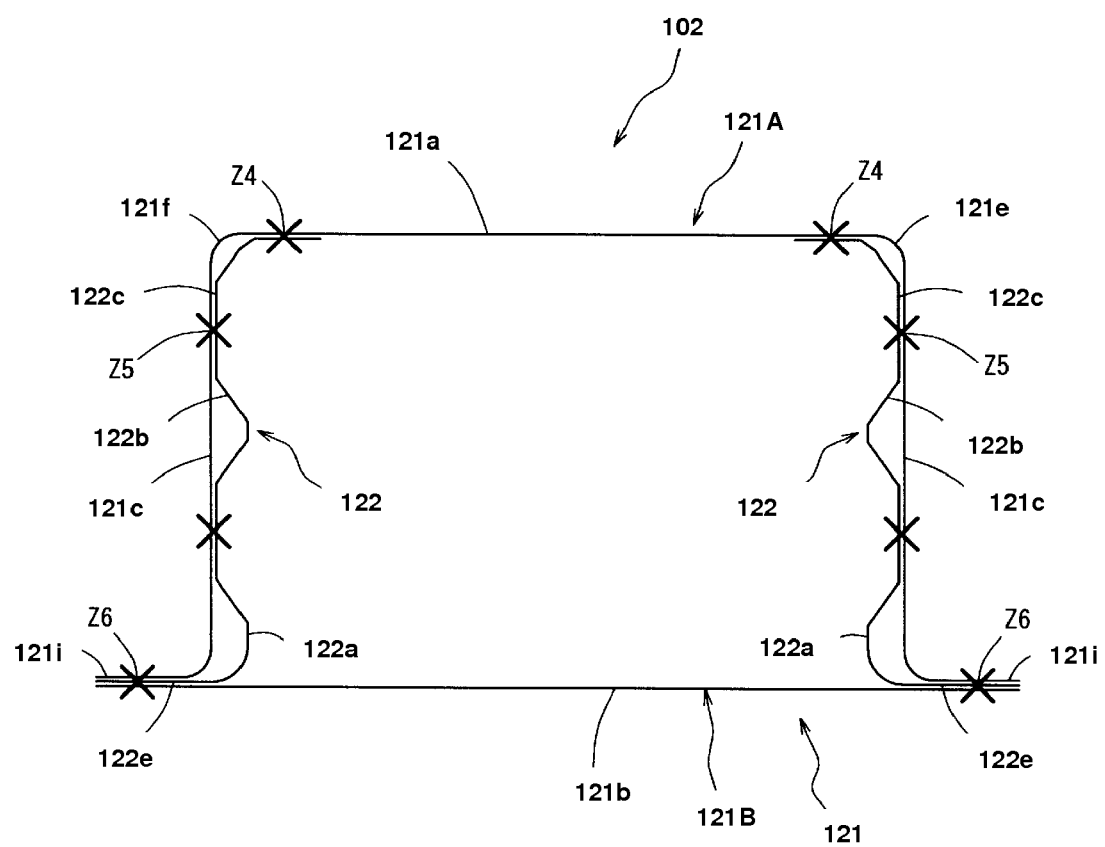
FIG. 33 is a sectional view explaining the manufacturing method of the frame for a vehicle.
Figure 34:
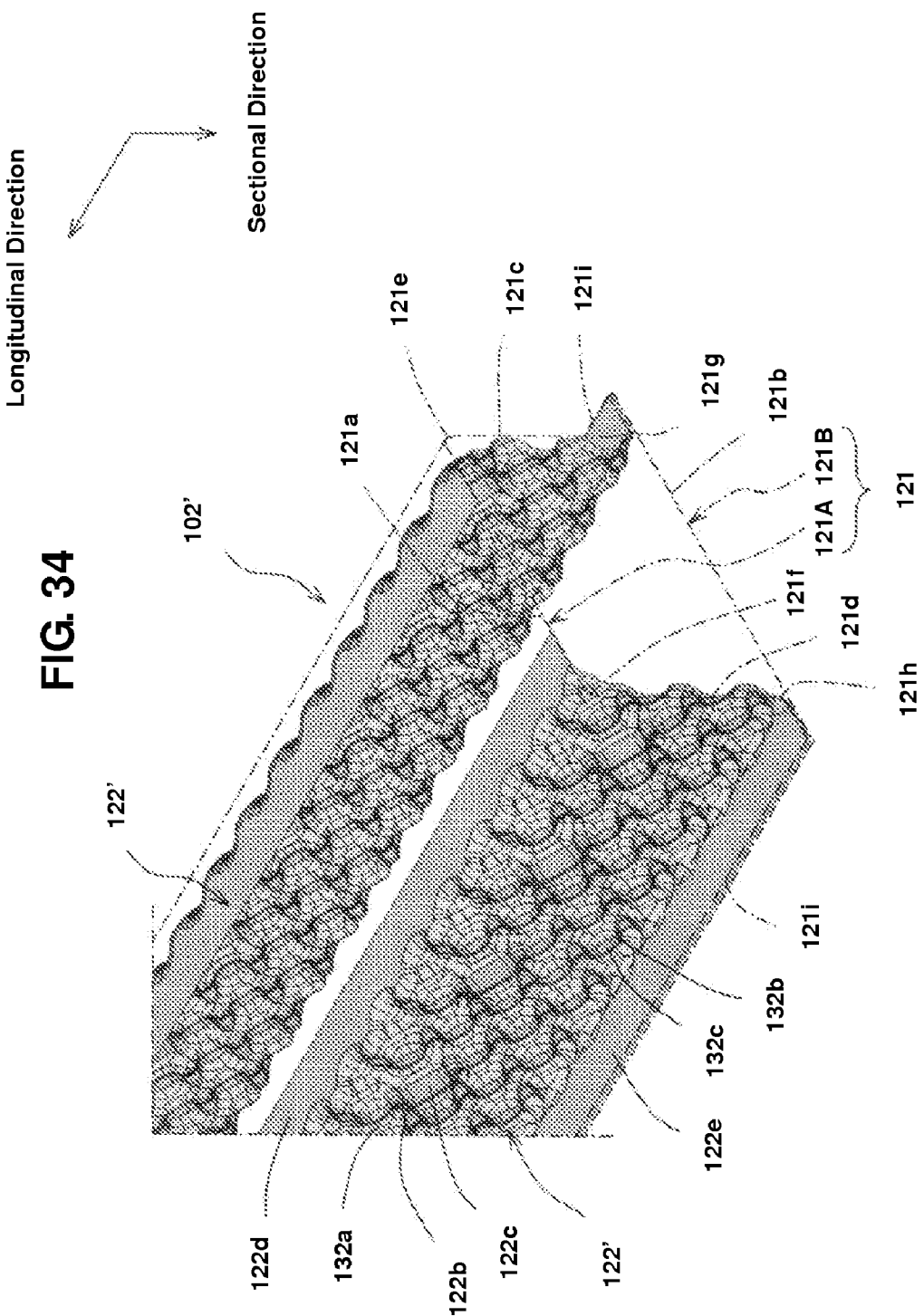
FIG. 34 is a perspective view showing a frame structure for a vehicle according to a sixth embodiment of the present invention.

Subsequently, the second panel member 121B is joined to the assembly of the first panel member 121A and the reinforcing members 122, 122. Specifically, as shown in FIG. 31, the both end portions of the second panel member 111B are placed so as to face to an overlap portion of the flange 121i of the first panel member 121A and the flange portion 122e of the reinforcing member 122. Then, as shown in FIG. 32, the respective flanges 121i, 122e and the end portions of the second panel member 121B are positioned so as to overlap, and the second panel member 121B is placed so as to contact the above-described assembly. After this, three sheets of flange (flange portion) 121i, 122e and the end portions of the second panel member 121B are joined at connecting portions Z6 illustrated by a bolt solid line in FIG. 33 or by arrows x in FIG. 34. Thereby, the rectangular pipe-shaped frame body 121 is formed, so that the frame 102 for a vehicle equipped with the reinforcing members 122 is complete. Herein, the joint of the flange (flange portion) 121i, 122e and the end portions of the second panel member 121B is conducted along their longitudinal directions by the spot welding or the lazar welding. As described above, the manufacturing method of the frame 102 for a vehicle according to the present embodiment comprises a step of joining in advance the reinforcing members 122 to the inner periphery of the first panel member 121A via the convex portions 122b, and a step of joining the flange (flange portion) 121i, 122e to the both end portions of the second panel member 121B. Thereby, the convex portions 122b of the reinforcing members 122 can be easily joined to the inner periphery of the frame body 121. Herein, the flange 121i and the flange portion 122e may be joined together first, and then the end portion of the second panel member 121B and the flange portion 122e may be joined together.

Embodiment 6

While the convex portions of the reinforcing member of the above-described embodiment are of the truncated pyramid shape, the shape of the convex portions should not be limited to this. For example, convex portions 132b may be of a truncated cone shape so as to have a circular flat face portion 132c like a reinforcing member 122' of a frame 102' shown in FIG. 34. The same structures/elements shown in FIG. 34 as the fifth embodiment shown in FIG. 29 are denoted by the same reference numerals, and their discretions are omitted here.

Figure 35:
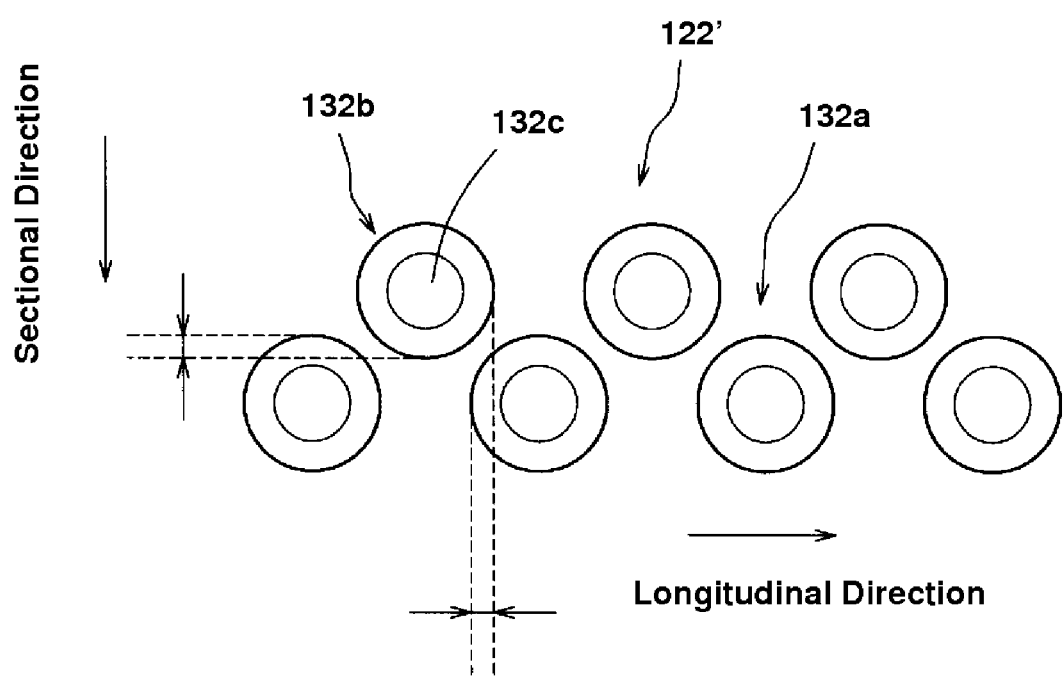
FIG. 35 is an elevation view explaining an arrangement of convex portions of a reinforcing member.

According to the present embodiment, while the many convex portions 132b which is of the truncated cone shape are formed at the reinforcing member 122', a line of convex portions 122b which is of the truncated pyramid shape is formed in the longitudinal direction. In this case, the joint of the convex portions 122d is conducted by the welding, and the joint of the convex portions 132b is conducted by another means than the welding, such as the adhesive agent. According to the present embodiment as well, the convex portions 132b, 132b, . . . are arranged in zigzag, as shown in FIG. 35, so that the adjacent convex portions located in the longitudinal direction of the frame partially overlap with each other having some overlap in the sectional direction, and the adjacent convex portions located in the sectional direction of the frame partially overlap with each other having some overlap in the sectional direction. Thus, the above-described zigzag arrangement of the convex portions 132b, 132b, . . . makes a situation where the base portion 132a does not extend continuously straightly in the longitudinal direction or the sectional direction.

The convex portions 132b which is of the truncated cone shape of the present embodiment can provide a greater gap between the convex portions 132b as shown in FIG. 35, compared to the convex portions 132b which is of the truncated pyramid shape. Herein, by forming the base portion 132a between the convex portions, the structure body 113 comprised of the frame body 121 and the reinforcing member 122' has the flat shape portion on the side of the base portions 132a, so that the rigidity of the structure body 113 can be increased. Accordingly, the outer-face deformation at the bending portion at the initial stage of the bending deformation can be restrained more effectively. Herein, choice of the shape of the flat face portion of the convex portions, the truncated pyramid shape or the truncated cone shape, may be properly made based on the joint method of the convex portions to the frame body, the rigidity of the structure body 113 to be required, or the like.

Embodiment 7

The present invention should not be limited to the structure in which both the base portion and the convex portions of the reinforcing members are arranged in the area including the corners of the frame body. It may be fine that the base portion and the convex portions are formed at least at the third and fourth face portions of the frame body. For example, convex portions 142b of a reinforcing member 142 may be arranged so as not to extend to corner portions 141e, 141f, like a frame 104 for a vehicle shown in FIG. 36. A frame body 141 of the present embodiment is, like the fifth or sixth embodiment, is comprised of a first panel member 141A having the U-shaped cross section and a flat-shaped second panel member 141B. The frame body 141 comprises first through fourth face portions 141a-141d, corner portions 141e-141h, and flanges 141i. The reinforcing member 142 comprises a base portion 142a, flat face portions 142c, and flange portions 142d, 142e. Herein, while the convex portion 142b is formed in the truncated cone shape, it may be formed in the truncated pyramid shape, or two kinds of the convex portions having these shapes may be provided.

Embodiment 8

Figure 36:
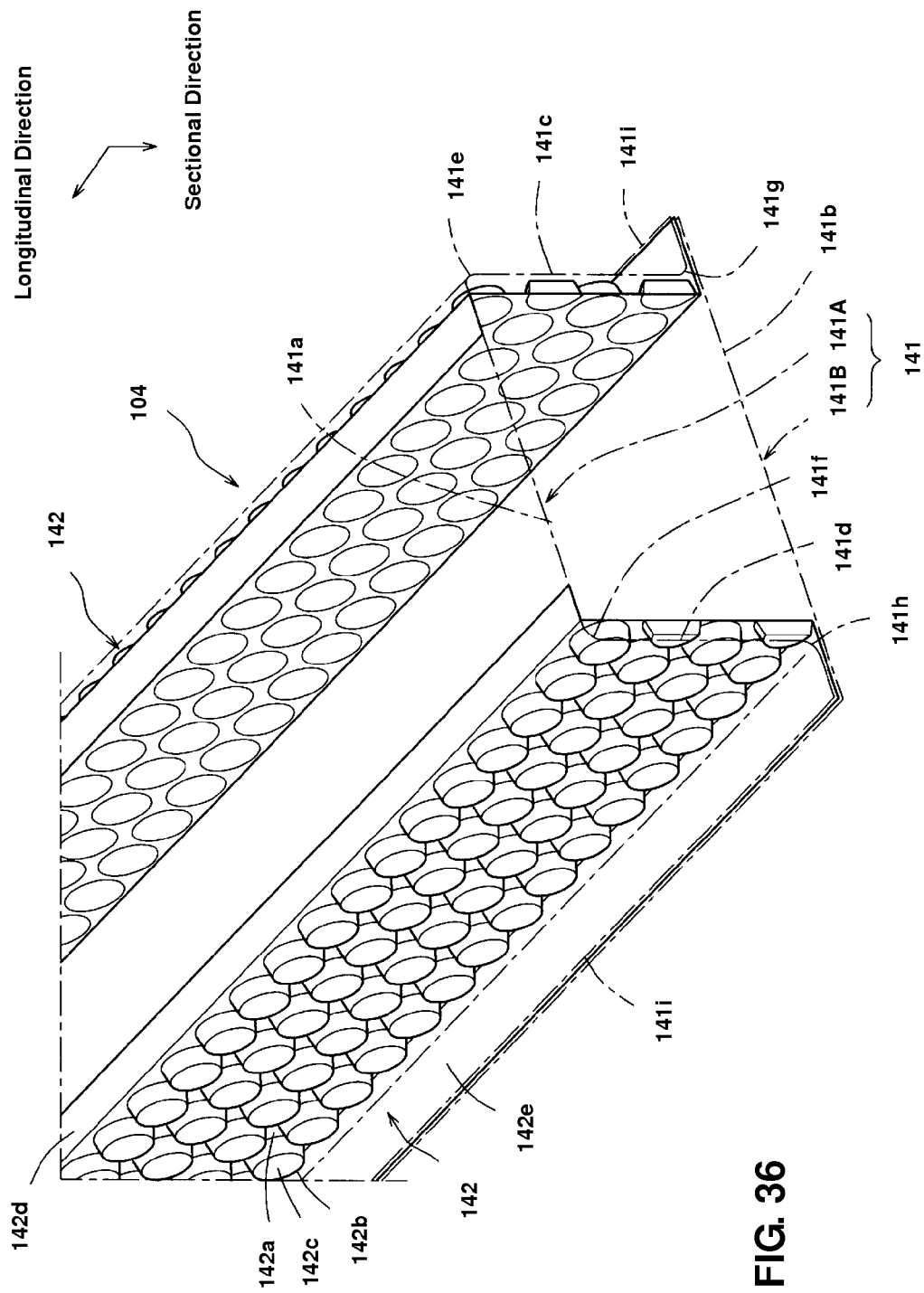
FIG. 36 is a perspective view showing a frame structure for a vehicle according to a seventh embodiment of the present invention.

The present invention should not be limited to the polygon or circle which is the shape of the flat face portion of the convex portion. For example, a flat face portion 152c of convex portions 152b of the reinforcing member 142' may have a cross shape like a frame 104' shown in FIG. 37. The same structures/elements shown in FIG. 37 as the seventh embodiment shown in FIG. 36 are denoted by the same reference numerals, and their discretions are omitted here.

Figure 37:
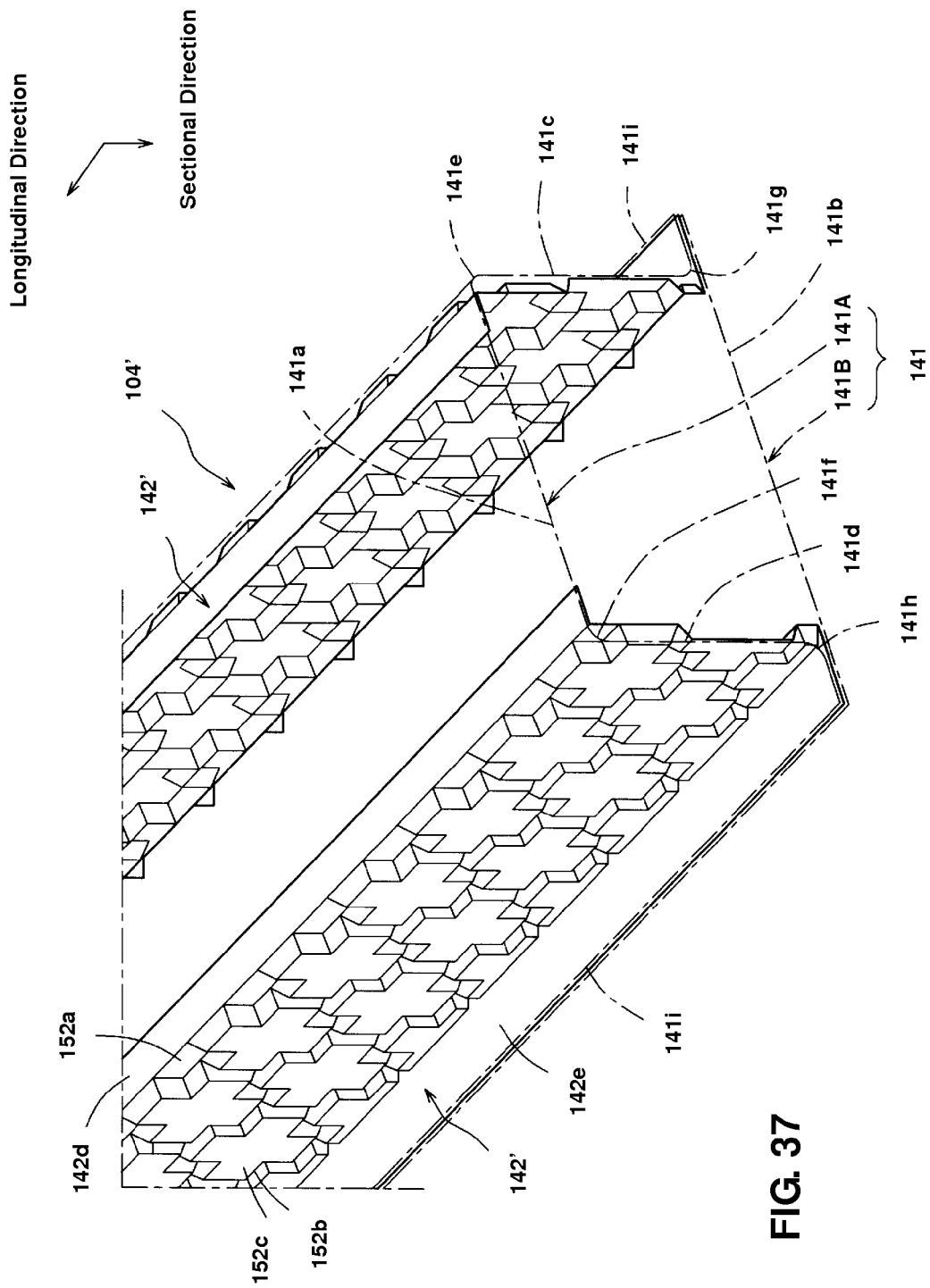
FIG. 37 is a perspective view showing a frame structure for a vehicle according to an eighth embodiment of the present invention.
Figure 38:
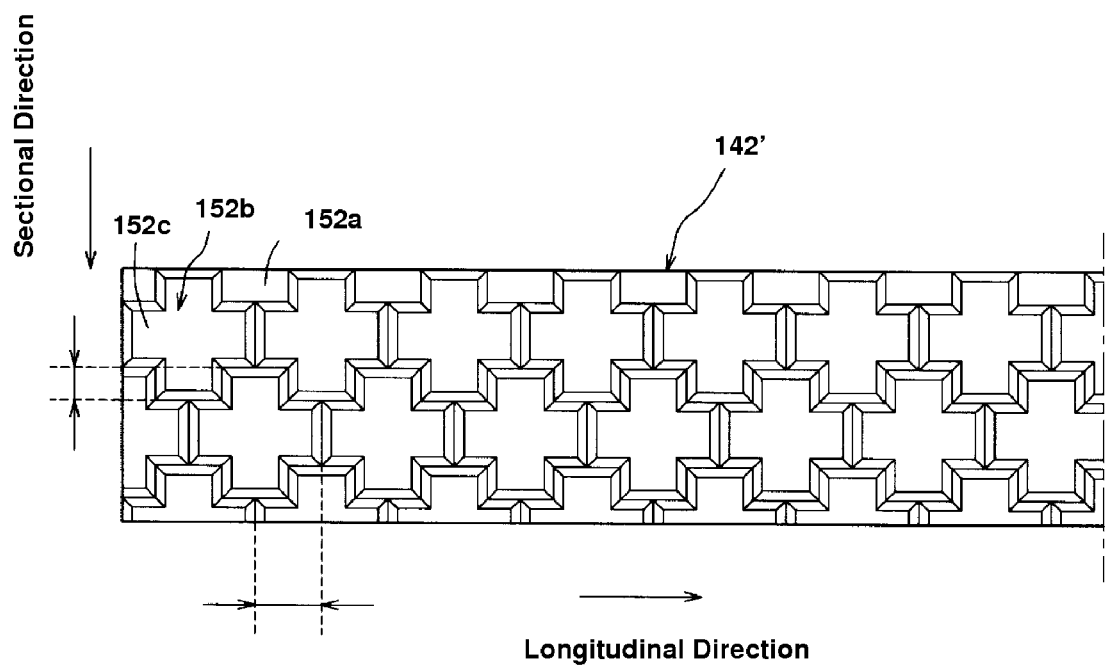
FIG. 38 is an elevation view explaining an arrangement of convex portions of a reinforcing member.

According to the present embodiment as well, the convex portions 152b, 152b, . . . are arranged in zigzag, as shown in FIG. 37, so that the adjacent convex portions located in the longitudinal direction of the frame partially overlap with each other having some overlap in the sectional direction, and the adjacent convex portions located in the sectional direction of the frame partially overlap with each other having some overlap in the sectional direction. Thus, the above-described zigzag arrangement of the convex portions 152b, 152b, . . . makes a situation where the base portion 152a does not extend continuously straightly in the longitudinal direction or the sectional direction.

Embodiment 9

Figure 39:
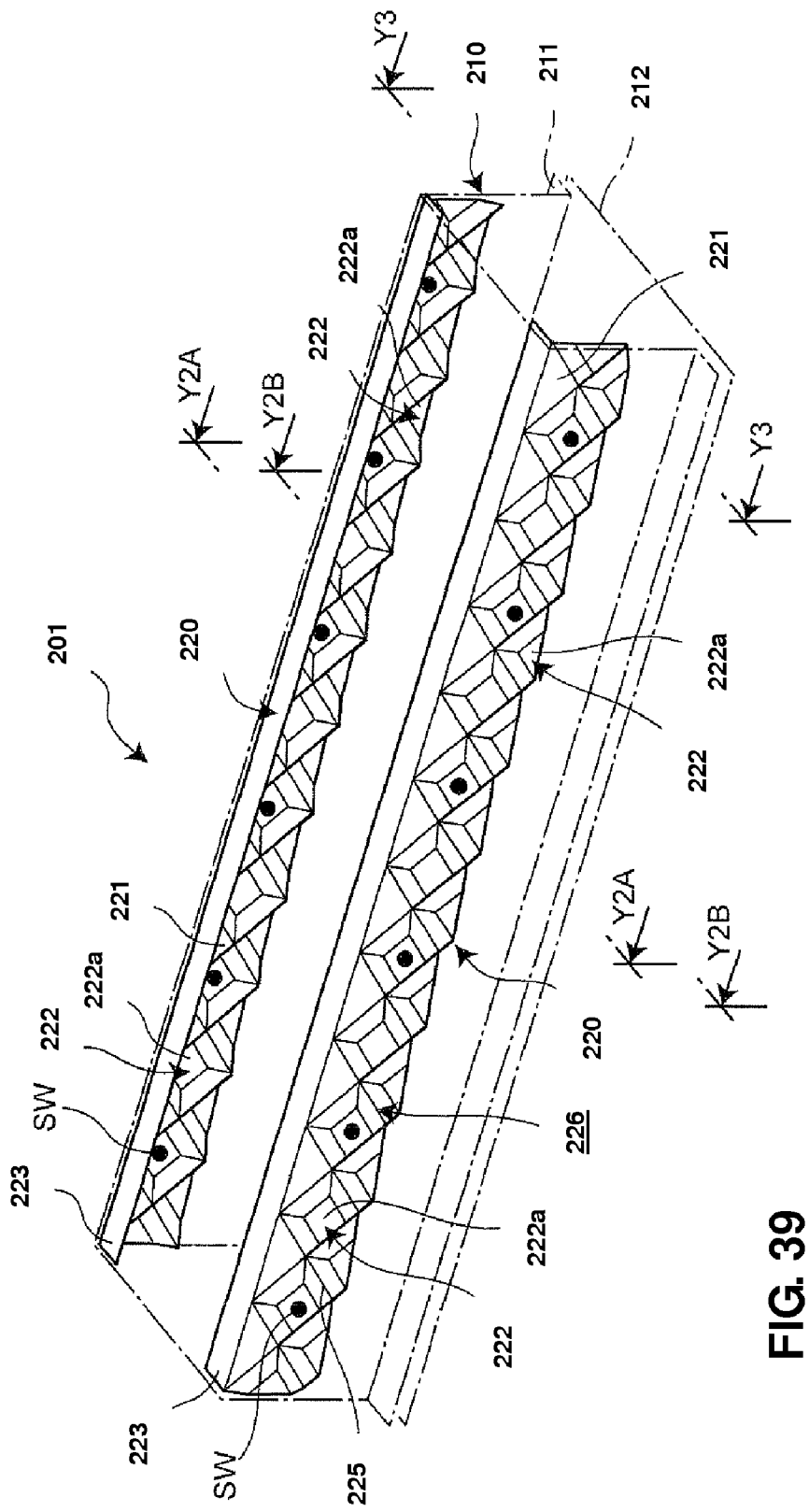
FIG. 39 is a perspective view showing a frame of a frame structure for a vehicle according to a ninth embodiment of the present invention.
Figure 40A:
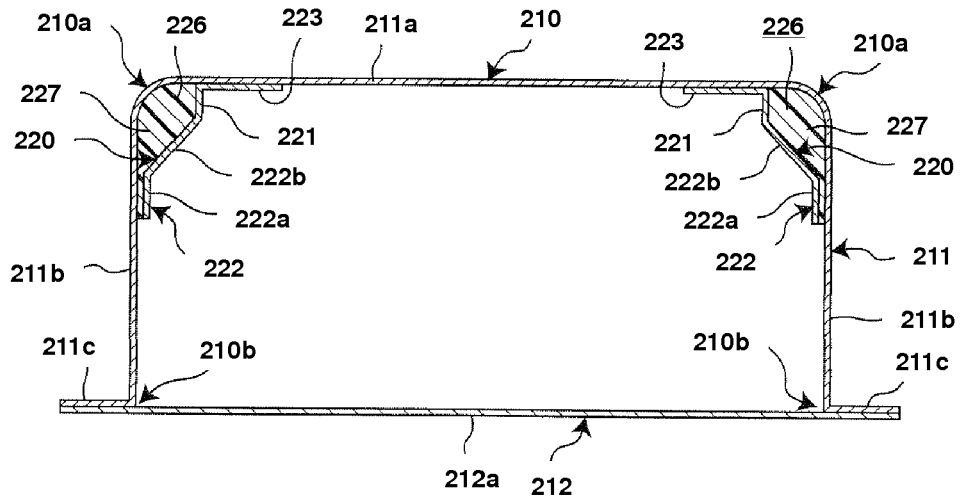
FIG. 40A is a sectional view of the frame taken along line Y2A-Y2A of FIG. 39.
Figure 40B:
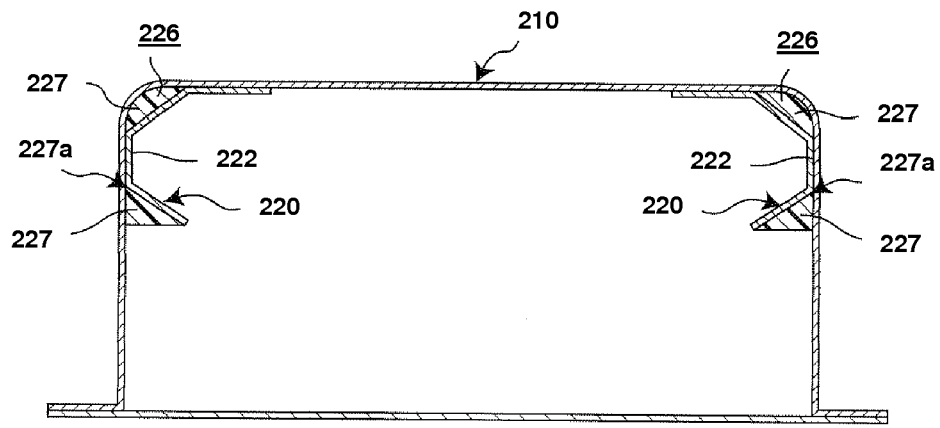
FIG. 40B is a sectional view of the frame taken along line Y2B-Y2B of FIG. 39.
Figure 41:
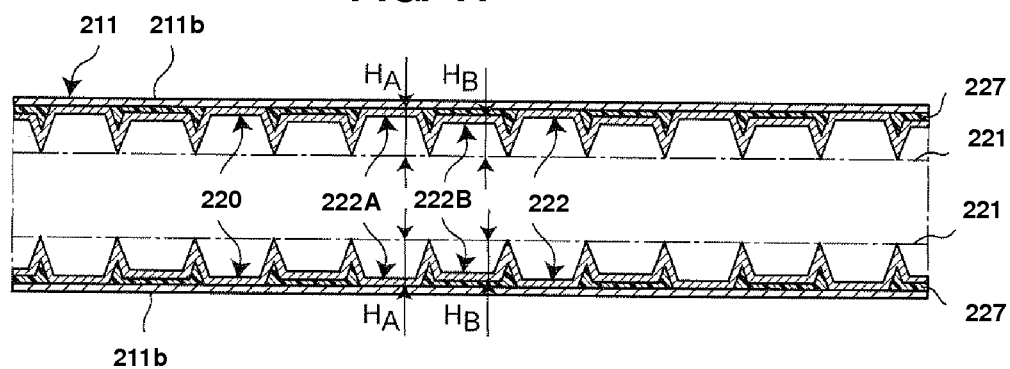
FIG. 41 is a sectional view of the frame taken along line Y3-Y3 of FIG. 40.

FIG. 39 is a perspective view showing a frame of a frame structure for a vehicle according to a ninth embodiment of the present invention. FIG. 40A is a sectional view of the frame taken along line Y2A-Y2A of FIG. 39; FIG. 40B is a sectional view of the frame taken along line Y2B-Y2B of FIG. 39. FIG. 41 is a sectional view of the frame taken along line Y3-Y3 of FIG. 40. Herein, in FIG. 39 and FIG. 46 which will be described later, illustration of an adhesive agent to adhere a reinforcing member to a frame body is omitted, and the frame body is illustrated by one-dotted broken lines in its transparent state.

A frame 201 of a frame structure according to the ninth embodiment, as shown in FIGS. 39 through 41, comprises a tube-shaped frame body 210 which has the rectangular cross section and a reinforcing member 220 which is arranged inside the frame body 210 along its longitudinal direction to reinforce the frame body 210. The frame body 210 comprises a first plate-shaped member 211 which is made of a metal-made plate material, such as a steel plate, through pressing and has a U-shaped cross section, and a second plate-shaped member 212 which is made of a metal-made plate material, such as a steel plate. The first plate-shaped member 211 comprises a bottom face portion 211a ("first face portion" in claims) which is of a flat shape, side face portions 211b ("third face portion" in claims) which extend substantially vertically from both sides of the bottom face portion 211a, and flanges 211c which extend outward from the side face portions 211b. The second plate-shaped member 212 comprises a flat face portion 212a ("second face portion" in claims).

The first plate-shaped member 211 and the second flat-shaped member 212 are placed so that the flanges 211c of the first flat-shaped member 211 and the flat face portion 212a of the second plate-shaped member 212 overlap, and they are joined together by the spot welding. Thus, the frame body 210 is formed so as to have a rectangular cross section. Corner portions 210a are formed between the bottom face portion 211a and the side face portions 211b of the first plate-shaped member 211, and corner portions 210b are formed between the side face portions 211b of the first plate-shaped member 211 and the flat face portion 212a of the second plate-shaped member 212. Each of the reinforcing members 220 arranged inside the frame body 210 is made of a metal-made plate material, such as a steel plate, through pressing, and they are attached to the side face portions 211b on the both sides of the first plate-shaped member 211 along the longitudinal direction of the frame body 210, respectively, so as to over the inner periphery of the frame body 210 in the rear including the corner portions 210a. Herein, a zinc-plating steel plate may be used as the reinforcing member 220.

Figure 42:
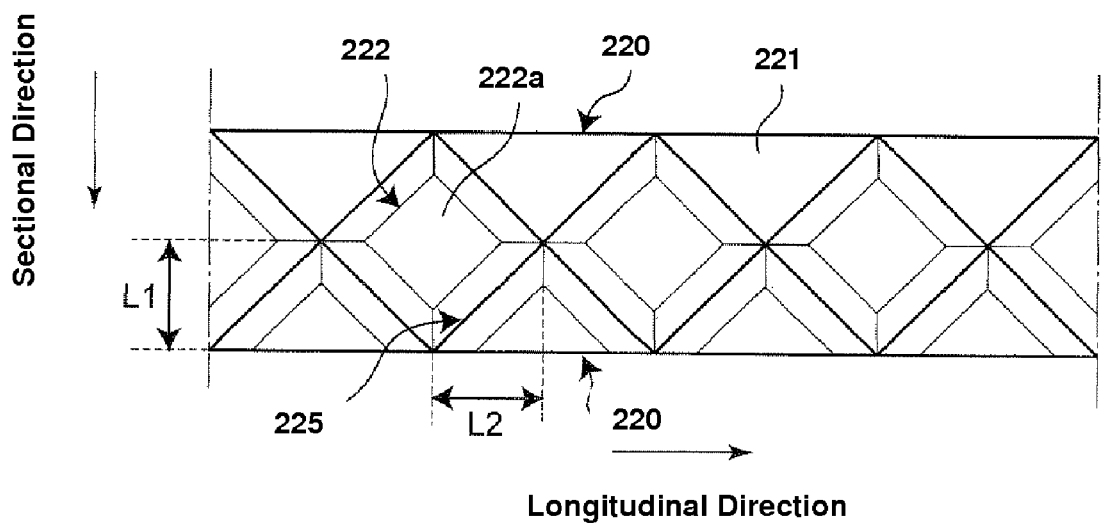
FIG. 42 is an explanatory diagram of convex portions of a reinforcing member.

The reinforcing member 220 comprises a base portion 221 which is away from the side face portion 211b of the first plate-shaped member 211 and extends along the side face portion 211b, and plural convex portions 222 which project toward the side face portion 211b from the base portion 221 and of a truncated pyramid shape. FIG. 42 is an explanatory diagram of the convex portions of the reinforcing member, an elevation view showing a major part of the reinforcing member. As shown in FIG. 42, a top face portion 222a of the convex portion 222 has a shape of square. The plural convex portions 222 are arranged in zigzag so as to extend in the longitudinal direction and the sectional direction. Adjacent convex portions 222 located in the longitudinal direction of the frame body 210 partially overlap with each other having an overlap length shown by L1, and adjacent convex portions 222 located in the sectional direction of the frame partially overlap with each other having an overlap length shown by L2.

Further, groove portions 225 which are formed by the base portions 221 and side face portions 222b of the convex portions 222 are formed between the adjacent convex portions 222. The groove portions 225 are arranged so as to be reticulate, having some slant angle, 45 degrees in the present embodiment, relative to the longitudinal direction of the frame body 210. That is, the plural convex portions 222 are arranged so as not to make a situation where the groove portions 225 extend continuously straightly in the longitudinal direction or the sectional direction of the frame body 210. According to the present embodiment, part of the plural convex portions 222 which are located at positions illustrated by a dark mark (●) denoted by SW in FIG. 39 are joined to the side face portions 211b of the first plate-shaped member 211 of the frame member 210 by temporary welding. Further, the other part of the plural convex portions 222 are adhered to the side face portions 211b by an adhesive agent 227. In FIG. 41, the convex portions 222 joined to the side face portions 211b are denoted by reference numeral 222A, and the convex portions 222 adhered to the side face portions 211b by the adhesive agent 227 are denoted by reference numeral 222B. As shown in FIG. 41, the convex portions 222A, 222B have the heights $H_A$, $H_B$ which are measured from the base portion 221. Herein, the height $H_B$ of the convex portion 222B is lower than the height $H_A$ of the convex portion 222A. The adhesive agent 227 is a thermosetting foaming agent which may foam when being heated to a specified temperature. As shown in FIGS. 40 and 41, a sheet type of the adhesive agent 227, and this adhesive agent 227 is attached to the reinforcing member 220 before foaming. When it is heated up to the specified temperature, the adhesive agent is filled in spaces between the frame body 210 and the reinforcing member 220, that is, in a reticulate space 226 having some slant angle of 45 degrees relative to the longitudinal direction of the frame body 210 which is formed by the groove portions 225.

Figure 43A:
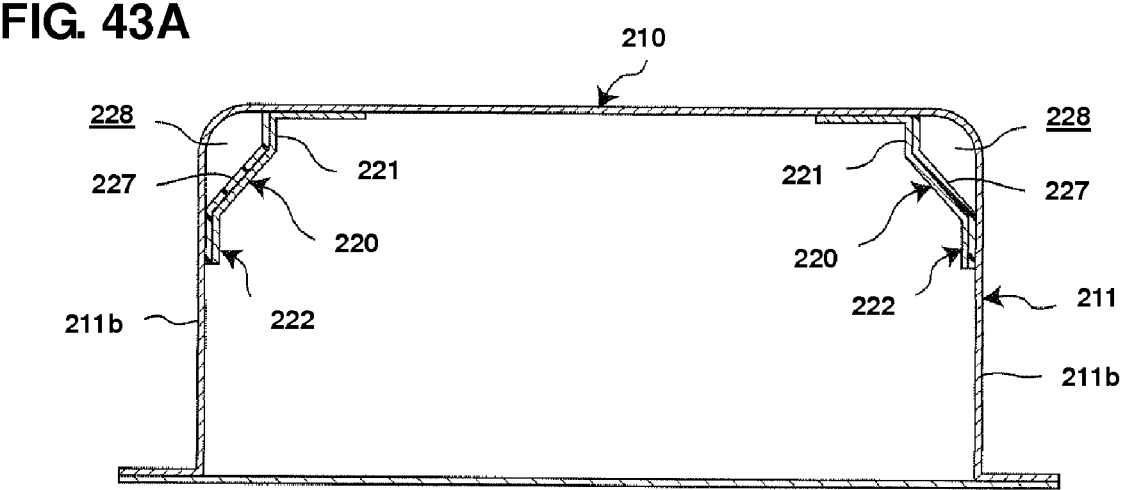
FIGS. 43A, 43B are sectional views of the frame prior to foaming of an adhesive agent provided at the reinforcing member.
Figure 43B:
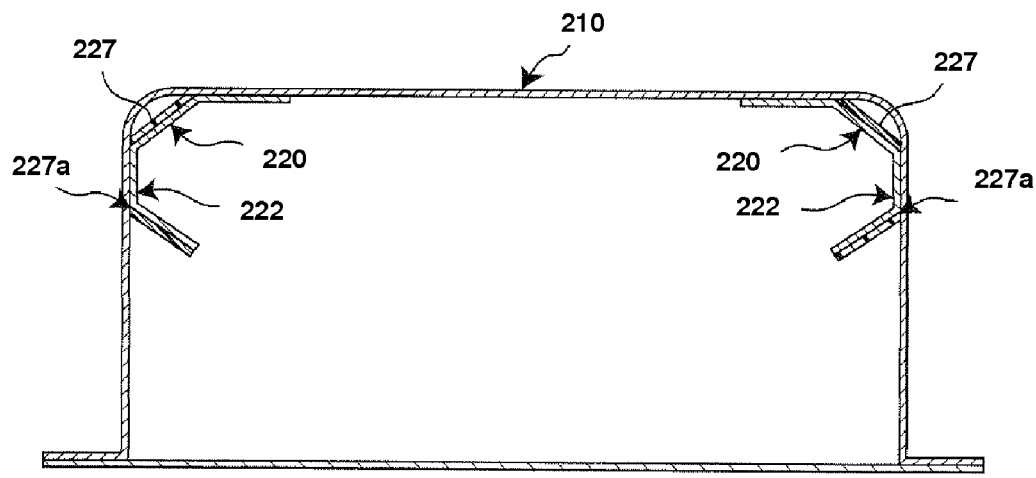

FIGS. 43A, 43B are sectional views of the frame prior to foaming of the adhesive agent provided at the reinforcing member, which correspond to FIGS. 40A, 40B. As shown in FIGS. 43A, 43B, the sheet-shaped adhesive agent 227 are placed onto the reinforcing member 220 before its foaming. The adhesive agent 227 has openings 227a (through holes) at its specific positions which correspond to the convex portions 222 joined to the side face portion 211b of the first plate-shaped member 211 of the frame body 210. These openings 227a are of a square shape which corresponds to the top face portions 222a of the convex portions 222. As described above, the sheet-shaped adhesive agent 227 is placed onto the reinforcing member 220, so that a reticulate gap 228 which continuously extends in the longitudinal direction of the frame body 210 is formed between the adhesive agent and the frame body 210 by the groove portions 225 before its foaming. According to the present embodiment, the adhesive agent 227 is placed onto the reinforcing member 210, and the reinforcing member 220 is arranged inside the frame body 210 so that the convex portions 222 of the reinforcing member 220 pass through the openings 227a and contact the side face portion 211b. Then, the convex portions 222 and the side face portion 211b are joined by the temporary welding. After this, the adhesive agent is made foam in a heating/drying step. Accordingly, the adhesive agent 227 is filled in the space between the frame body 210 and the reinforcing member 220, that is, in the reticulate space 226 formed by the groove portions 225, so that the reinforcing member 220 are adhered to the frame body firmly by the adhesive agent 227. Further, the reinforcing member 220 has a flat-face-shaped flange portion 223 at its upper end portion. This flange portion 223 is attached to the bottom face portion 211a of the first plate-shaped member 211 of the frame body 210. The frame 201 described above is arranged so that the bottom face portion 211a of the first plate-shaped member 211 faces to the direction of the load acting on. Accordingly, in case the load acts from the outside, the compressive force acts on the bottom face portion 211a of the first plate-shaped member 211 to generate a compressive stress, and the tensional force acts on the flat face portion 212a of the second plate-shaped member 212.

Figure 44:
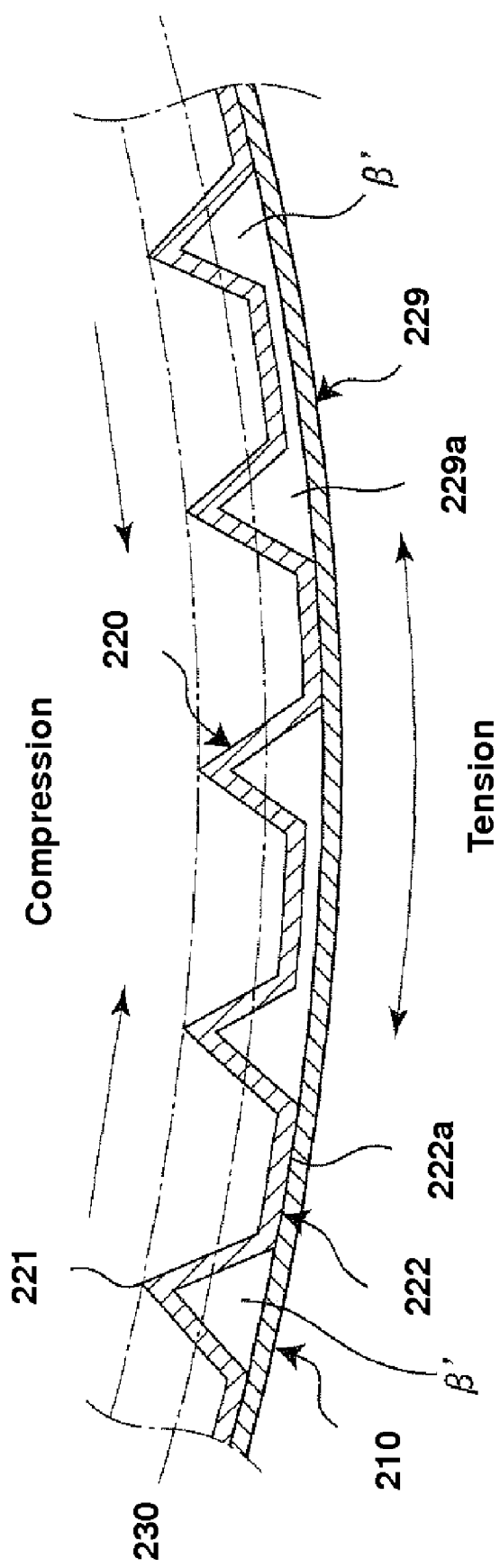
FIG. 44 is a sectional view explaining a function of a structure body comprising a frame body and the reinforcing member.

According to the frame structure for a vehicle according to the ninth embodiment of the present invention, the reinforcing member 220 provided inside the frame body 210 comprises the base portion 221 and the plural convex portions 222, and the plural convex portions 222 are arranged so that the groove portions 225 formed between the adjacent convex portions 222 are reticulate, having some slant angle relative to the longitudinal direction of the frame body 210. Thereby, the outer-face deformation of the frame body 210 can be restrained by the reticulate space portion 226, so that the bending resistance of the frame body 210 can be increased. FIG. 44 is a sectional view of a major portion of the frame with the reinforcing member shown in FIG. 41, which explains the structure body comprising the frame body and the reinforcing member. As shown in FIG. 44, the frame body 210 and the reinforcing member 220 attached to the side face portion 211b of the first plate-shaped member 211 forms a structure body 229 which has a closed cross section 229a between the frame body 210 and the reinforcing member 220. According to this structure body 229, since the frame body 210 and the reinforcing member are arranged away from a bending central axis 230 as shown in FIG. 44, the second moment of area of the frame body 210 can be increased. Herein, while the section in the longitudinal direction of the frame body 210 is explained in FIG. 44, the structure body which has the closed cross section between the frame body 210 and the reinforcing member 220 in the sectional direction of the frame body 210 as well is formed, so that the second moment of area of the frame body 210 can be further increased. In case the load acts on the frame 201 from the outside and thereby the frame 201 bends, the side face portion 211b of the first plate-shaped member 211 may deform outward so as to have the outer-face deformation. Herein, the structure body 229 having the closed cross section 229a can properly increase the rigidity of the side face portion 211b of the frame body 210 and thereby restrain its outer-face deformation. Consequently, the bending resistance of the frame body 210 can be properly increased.

Further, according to the frame structure for a vehicle according to the ninth embodiment of the present invention, the adhesive agent 227 is filled in the reticulate space 226 which is formed between the frame body 210 and the reinforcing member 220 by the groove portions 225. Thereby, since the portion corresponding to the space 226 between the frame body 210 and the reinforcing member 220 is restrained by the frame body 210 via the adhesive agent 227, any discontinuous portions which may case the outer-face deformation of the frame body 210, for example, which is dented by β' in FIG. 44, can be properly diminished, so that the bending resistance can be further increased. Thus, according to the frame structure for a vehicle according to the ninth embodiment of the present invention, the outer-face deformation of the frame body 210 can be restrained by the reticulate space 226 formed between the frame body 210 and the reinforcing member 220, having some slant angle relative to the longitudinal direction of the frame body 210. Further, since the portion corresponding to the space 226 between the frame body 210 and the reinforcing member 220 is restrained by the frame body 210 via the adhesive agent 227, any portions which may case the outer-face deformation of the frame body 210, so that the bending resistance of the frame body 210 can be increased.

Further, since the adhesive agent 227 which is formed in the sheet shape having a specified thickness is attached onto the reinforcing member 220 in the state in which the plural convex portions 222 joined to the side face portion 211b of the first plate-shaped member 211 of the frame body 210 pass through the plural openings 227a of the adhesive agent 227, the attachment of the sheet-shaped adhesive agent 227 on the reinforcing member 220 can be made easier without requiring any coating. Further, since the convex portions 222 of the reinforcing member 220 and the frame body 210 can be joined together through the openings 227a of the sheet-shaped adhesive agent 227, the reinforcing member 220 can be arranged precisely at the specified position. Moreover, since the adhesive agent 227 is the thermosetting foaming agent which may foam when heated to the specified temperature, the frame body 210 and the reinforcing member 220 can be joined together surely by making the agent 227 foam between the frame body 210 and the reinforcing member 222 in a heating/drying step. Further, since the reticulate gap 228 which continuously extends in the longitudinal direction of the frame body 210 is formed between the adhesive agent and the frame body 210 by the groove portions 225 before its foaming, in case the electrodeposition coating is conducted after the joining of the frame body 210 and part of the convex portions 220 of the reinforcing member 20, the electrodeposition liquid can be made flow into a space between the frame body 210 and the reinforcing member 220 smoothly and properly. Accordingly, the corrosion resistance can be improved. Also, since the height of the convex portions 222B which are other than the convex portions 222A joined to the side face portion 211b of the reinforcing member 220 is lower than the height of the convex portions 222A, and the convex portions 222B are adhered to the side face portion 211b by the adhesive agent 227, the joint force of the reinforcing member 220 and the frame body 210 can be increased.

Figure 45:
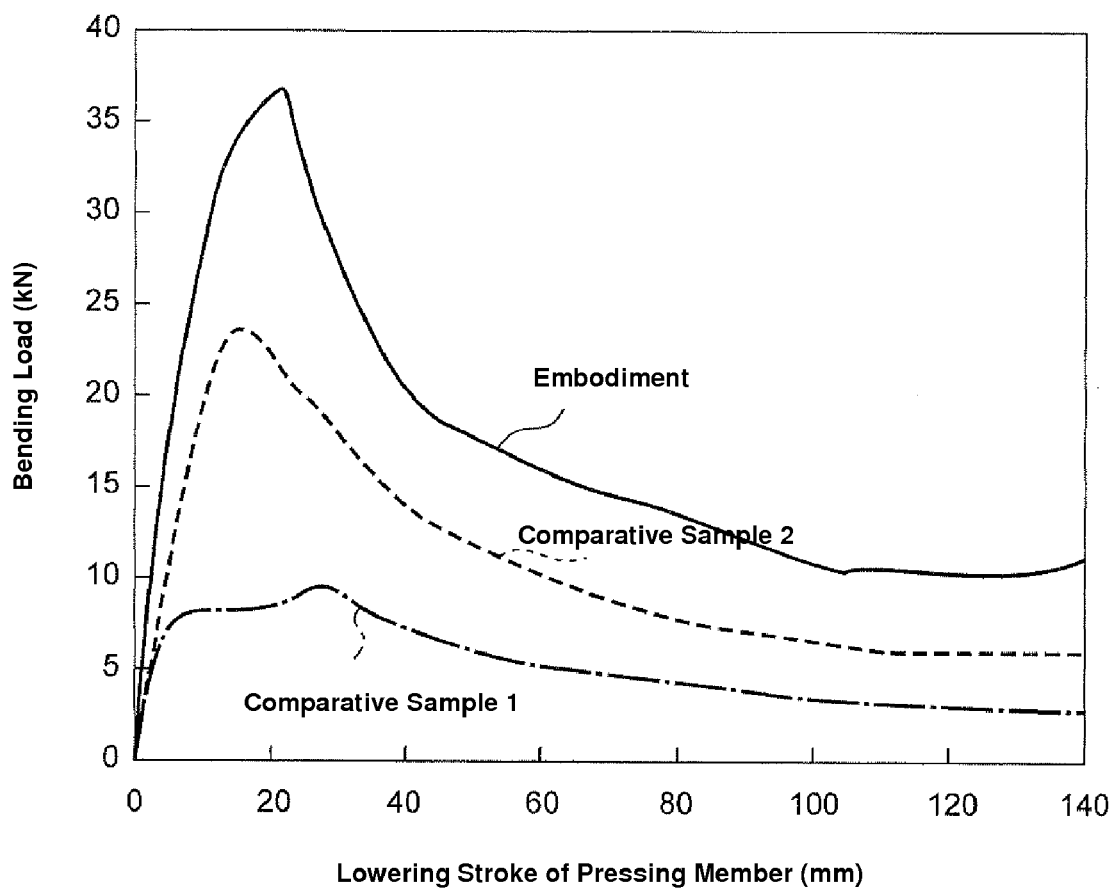
FIG. 45 is a graph showing measuring results of a bending load relative to a lowering stroke of a pressing member which applies a load to the frame.

A bending test of measuring the bending load in case of applying the load from the outside was conducted to the frame 201 of the present embodiment. Herein, the pressing member was lowered at a constant speed so as to press down the central portion of the frame 201, and the bending load relative to the lower stroke of the pressing member was measured. Further, as comparative samples, a frame comprising only the frame body 210 without a reinforcing member (comparative sample 1) and a frame comprising the frame body 210 and the reinforcing member which is joined to the frame body only by the temporary wielding without the adhesive agent (comparative sample 2) were prepared, and the measuring test was conducted also to these comparative samples 1, 2. FIG. 45 is a graph showing measuring results of the bending load relative to the lowering stroke of the pressing member which applies the load to the frame. In FIG. 45, the lateral axis shows the lowering stroke of the pressing member, and the vertical axis shows the bending load. A solid line shows the measuring results of the frame 201 according to the present embodiment, a one-dotted broken line shows the comparative sample 1, and a broken line shows the comparative sample 2.

As shown in FIG. 45, the maximum value of the bending load was about 37 kN for the present embodiment, about 24 kN for the comparative sample 1, and about 10 kN for the comparative sample 2. Thus, the present embodiment showed the greater maximum value of the bending load compared to the comparative samples 1 and 2. Accordingly, the adhesive agent 227 filled in the space between the frame body 210 and the reinforcing member 220 of the frame 201 could increase the bending resistance of the frame body. Herein, the reason for the comparative sample 2 having showed the greater maximum value of the bending load than the comparative sample 1 may be that the rigidity of the side face portion 211b of the frame body 210 was increased by the structure body 229 having the closed cross section 229a and thereby the outer-face deformation of the side face portion 211b could be restrained. Further, the reason for the present embodiment having showed the greater maximum value of the bending load than the comparative sample 2 may be that the reinforcing member 220 was continuously joined to the frame body 210 by the adhesive agent 227, and thereby any portions which may case the outer-face deformation of the frame body 210 could be properly diminished.

Embodiment 10

Figure 46:
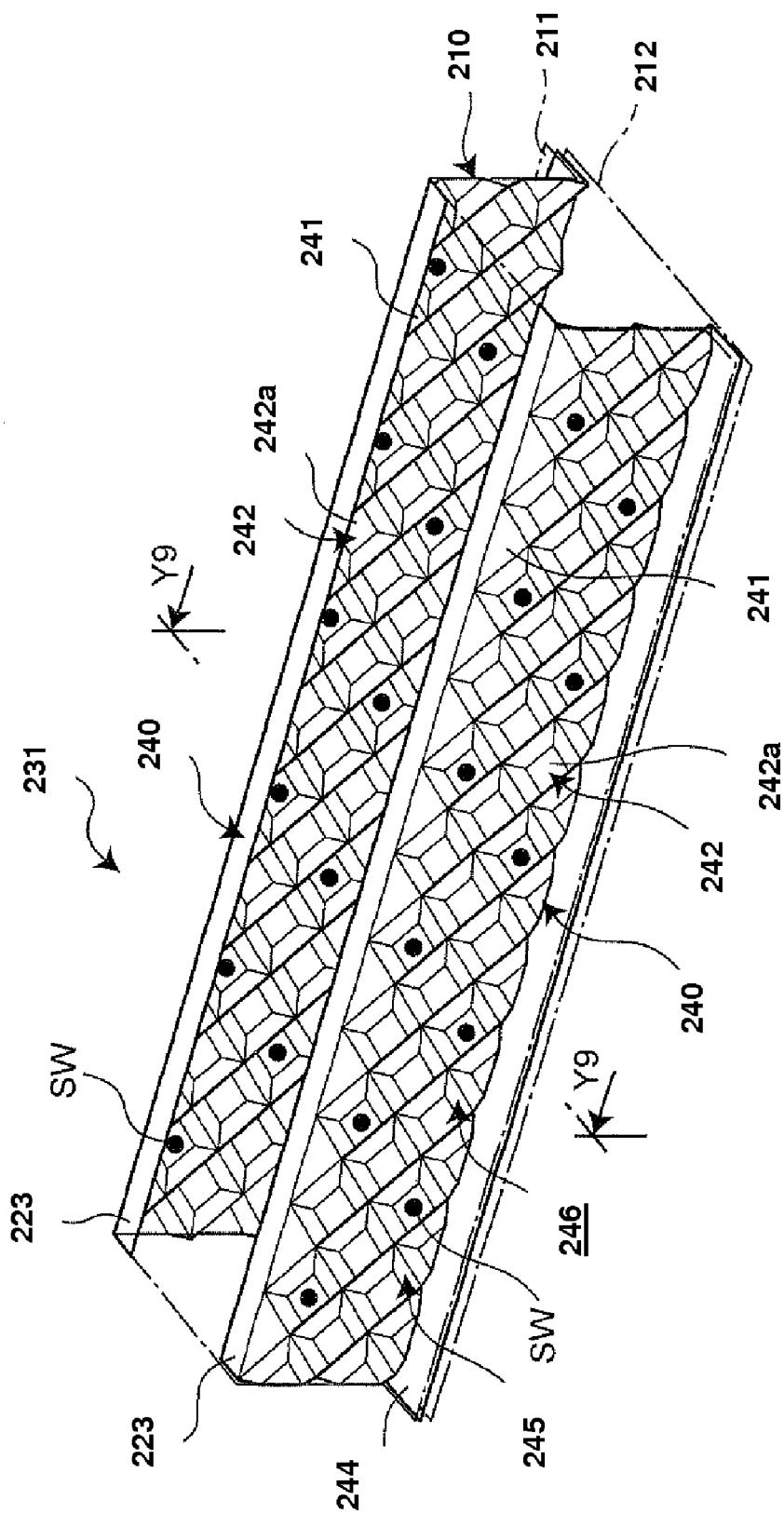
FIG. 46 is a perspective view showing a frame of a frame structure for a vehicle according to a tenth embodiment of the present invention.
Figure 47:
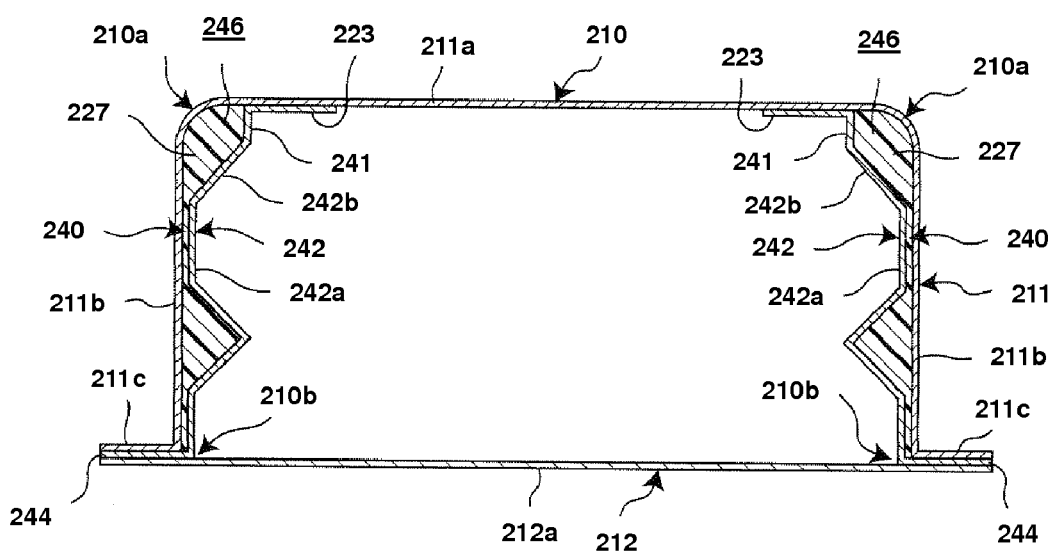
FIG. 47 is a sectional view of the frame taken along line Y9-Y9 of FIG. 46.

FIG. 46 is a perspective view showing a frame of a frame structure for a vehicle according to a tenth embodiment of the present invention. FIG. 47 is a sectional view of the frame taken along line Y9-Y9 of FIG. 46. In the frame for a vehicle of the tenth embodiment, the reinforcing member 220 of the above-described ninth embodiment extends from the upper corner portion 210a to the lower corner portion 210b of the frame body 210. Herein, the same components as those of the frame 201 of the ninth embodiment are denoted by the same reference characters, and their descriptions are omitted.

As shown in FIG. 46, according to a frame 231 of the tenth embodiment, like the frame 201 of the ninth embodiment, a reinforcing member 240 is arranged inside the frame body 210 along the longitudinal direction of the frame body 210. The reinforcing member 240 comprises a base portion 241 which extends along and away from a side face portion 21b ("third face portion" in claims) of a first plate-shaped member 211, and plural convex portions 242 which project from the base portion 241 toward the side face portion 211b and of the truncated pyramid shape. The plural convex portions 242 are arranged in zigzag so as to extend in the longitudinal direction and the sectional direction. Groove portions 245 which are formed by the base portions 241 and side face portions 242b of the convex portions 242 are formed between the adjacent convex portions 242. The groove portions 245 are arranged so as to be reticulate, having some slant angle, 45 degrees in the present embodiment, relative to the longitudinal direction of the frame body 210. Thereby, a reticulate space 246 having some slant angle of 45 degrees relative to the longitudinal direction of the frame body 210 is formed between the frame body 210 and the reinforcing member 220. Part of the plural convex portions 242 are joined to the side face portions 211b by temporary welding, and the other part of the plural convex portions 242 are adhered to the side face portions 211b by an adhesive agent 227.

The adhesive agent 227 is, like the case of the frame 201, formed in the sheet shape having a specified thickness and has square opening 227a at specified positions which correspond to top face portions 242a of the convex portions 242. This adhesive agent 227 is placed onto the reinforcing member 240 so that the convex portions 242 of the reinforcing member 240 pass through its openings 227a b. Thus, a reticulate gap which extends continuously in the longitudinal direction of the frame body 210 is formed between the adhesive agent 227 and the frame body 210 so as to correspond to the groove portions 245. Then, the convex portions 242 and the side face portion 211b are joined by the temporary welding. After this, the adhesive agent 227 is made foam in the heating/drying step. Accordingly, the adhesive agent 227 is filled in the space between the frame body 210 and the reinforcing member 240, so that the reinforcing member 240 are adhered to the frame body 210 firmly by the adhesive agent 227. Herein, the reinforcing member 240 of the present frame 231 extends from an upper corner portion 210a to a lower corner portion 210b of the frame body 210. Further, the reinforcing member 240 further comprises flat-face shaped flange portions 244 at its both end portions in the sectional direction, and the flange portions 244 are placed between flange 211c of the first plate-shaped member 211 and a flat face portion 212a ("second face portion" in claims) of a second plate-shaped member 212, and joined to them. Accordingly, the reinforcing member 240 can be surely prevented from coming off the frame body 210 in case the load acts from the outside.

Thus, according to the frame 231 of the present embodiment as well, the outer-face deformation of the frame body 210 can be restrained by the reticulate space 246 formed between the frame body 210 and the reinforcing member 240, having some slant angle relative to the longitudinal direction of the frame body 210. Further, since the portion corresponding to the space 246 between the frame body 210 and the reinforcing member 240 is restrained by the frame body 210 via the adhesive agent 227, any portions which may case the outer-face deformation of the frame body 210, so that the bending resistance of the frame body 210 can be increased.

The present should not be limited to the above-described embodiments, and any other modifications or improvements can be applied within the scope of a sprit of the present invention.

What is claimed is:

1. A frame structure for a vehicle, comprising:
   a pipe-shaped frame body provided to receive a load acting from the outside, the frame body having a first face portion on which a compressive force acts in case of the load acting, a second face portion on which a tensional force acts in case of the load acting, and a third face portion which is located between the first face portion and the second face portion and connects to the first face portion to form a corner portion therebetween; and
   a reinforcing member provided inside the frame body to extend in a longitudinal direction of the frame body, the reinforcing member having a base portion which extends along and away from the third face portion of the frame body, and plural convex portions which project from the base portion toward the third face portion of the frame member and have flat face portions at tips thereof, the flat face portions of the plural convex portions being joined to the third face portion of the frame body, the convex portions having plural convexities which are arranged to extend both in the longitudinal direction of the frame body and in a sectional direction of the frame body which is perpendicular to the longitudinal direction of the frame body,
   wherein said plural convex portions of the reinforcing member are arranged in zigzags such that the adjacent convex portions located in the longitudinal direction of the frame body partially overlap with each other having a specified longitudinal-direction overlap length, and the adjacent convex portions located in the sectional direction of the frame body partially overlap with each other having a specified sectional-direction overlap length.

2. The frame structure for a vehicle of claim 1, wherein said reinforcing member is provided so as to cover a specified area inside the frame body which includes at least said corner portion formed between the first face portion and the third face portion of the frame body.

3. The frame structure for a vehicle of claim 1, wherein said frame body is comprised of a pair of members which has a U-shaped cross section with a flange, or a flat plate and a member which has a U-shaped cross section with a flange, said reinforcing member further comprises a flange portion which extends along said flange of the member having the U-shaped cross section so as to be arranged between the flanges of the pair of members, or an end portion of the flat plate and the flange of the member, and the flange portion of the reinforcing member and the flanges of the pair of members, or the flange portion of the reinforcing member, the end portion of the flat plate, and the flange of the member are joined together.

4. The frame structure for a vehicle of claim 1, wherein an adhesive agent is filled in a space formed between the reinforcing member and the third face portion of the frame body.

5. The frame structure for a vehicle of claim 4, wherein said adhesive agent is a thermosetting foaming agent.

6. The frame structure for a vehicle of claim 5, wherein said thermosetting foaming agent is made of a sheet-shaped agent originally before foaming through heating, which has plural openings at specific positions thereof which correspond to said plural convex portions of the reinforcing member, the sheet-shaped agent being attached onto the reinforcing member before foaming so as to be arranged in the space between the reinforcing member and the third face portion of the frame body which are joined together.

7. The frame structure for a vehicle of claim 1, wherein said plural convex portions of the reinforcing member having the flat face portions is of a truncated pyramid shape.

* * * * *